(12) United States Patent
Constantz et al.

(10) Patent No.: US 7,914,685 B2
(45) Date of Patent: *Mar. 29, 2011

(54) ROCKS AND AGGREGATE, AND METHODS OF MAKING AND USING THE SAME

(75) Inventors: Brent Constantz, Portola Valley, CA (US); Andrew Youngs, Los Gatos, CA (US); James O'Neil, Palo Alto, CA (US); Kasra Farsad, San Jose, CA (US); Joshua Patterson, Freedom, CA (US); John Stagnaro, San Jose, CA (US); Ryan Thatcher, Sunnyvale, CA (US); Chris Camire, San Jose, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/794,198

(22) Filed: Jun. 4, 2010

(65) Prior Publication Data

US 2010/0247410 A1 Sep. 30, 2010

Related U.S. Application Data

(60) Division of application No. 12/475,378, filed on May 29, 2009, now Pat. No. 7,753,618, said application No. 12/475,378 and a continuation-in-part of application No. 12/344,019, filed on Dec. 24, 2008, and a continuation-in-part of application No. 12/163,205, filed on Jun. 27, 2008, now Pat. No. 7,744,761.

(60) Provisional application No. 61/056,972, filed on May 29, 2008, provisional application No. 61/101,629, filed on Sep. 30, 2008, provisional application No. 61/101,631, filed on Sep. 30, 2008, provisional application No. 61/081,299, filed on Jul. 16, 2008, (Continued)

(51) Int. Cl.
*C02F 1/52* (2006.01)
(52) U.S. Cl. .......... 210/702; 210/737; 210/749; 95/149; 95/156; 95/241; 423/220; 423/419.1; 423/420.2; 423/430; 106/463; 106/464; 106/738; 106/817
(58) Field of Classification Search .................. 106/461, 106/462, 713, 738, 739, 811–819, 463, 464; 423/220, 223, 232, 419.1, 420.2, 430, 431, 423/437.1, 438, 439, 441; 588/249, 252, 588/313, 400, 404; 210/652, 702, 710, 714, 210/717, 718, 723, 724, 726, 737, 749; 95/149, 95/156, 241

See application file for complete search history.

(56) References Cited

U.S. PATENT DOCUMENTS 1,678,345 A 7/1928 Mattison
(Continued)

FOREIGN PATENT DOCUMENTS

AU 2007100157 A4 4/2007
(Continued)

OTHER PUBLICATIONS

Aker, "Aker Clean Carbon, Carbon Capture Solutions Provider" Aker Clean Carbon Presentation for UN's IPCC; Jan. 24, 2008; 8pp.

(Continued)

*Primary Examiner* — Joseph W Drodge

(57) ABSTRACT

Compositions comprising synthetic rock, e.g., aggregate, and methods of producing and using them are provided. The rock, e.g., aggregate, contains $CO_2$ and/or other components of an industrial waste stream. The $CO_2$ may be in the form of divalent cation carbonates, e.g., magnesium and calcium carbonates. Aspects of the invention include contacting a $CO_2$ containing gaseous stream with a water to dissolve $CO_2$, and placing the water under precipitation conditions sufficient to produce a carbonate containing precipitate product, e.g., a divalent cation carbonate.

20 Claims, 27 Drawing Sheets

Related U.S. Application Data provisional application No. 61/117,541, filed on Nov. 24, 2008, provisional application No. 61/117,543, filed on Nov. 24, 2008, provisional application No. 61/107,645, filed on Oct. 22, 2008, provisional application No. 61/149,633, filed on Feb. 3, 2009, provisional application No. 61/158,992, filed on Mar. 10, 2009, provisional application No. 61/168,166, filed on Apr. 9, 2009, provisional application No. 61/170,086, filed on Apr. 16, 2009, provisional application No. 61/178,475, filed on May 14, 2009, provisional application No. 61/096,035, filed on Sep. 11, 2008, provisional application No. 61/116,141, filed on Nov. 19, 2008, provisional application No. 61/117,542, filed on Nov. 24, 2008, provisional application No. 61/148,353, filed on Jan. 29, 2009, provisional application No. 61/149,640, filed on Feb. 3, 2009, provisional application No. 61/181,250, filed on May 26, 2009, provisional application No. 61/101,626, filed on Sep. 30, 2008, provisional application No. 61/073,319, filed on Jun. 17, 2008, provisional application No. 61/017,405, filed on Dec. 28, 2007, provisional application No. 61/057,173, filed on May 29, 2008, provisional application No. 61/082,766, filed on Jul. 22, 2008, provisional application No. 61/088,347, filed on Aug. 13, 2008, provisional application No. 61/088,340, filed on Aug. 12, 2008, provisional application No. 61/121,872, filed on Dec. 11, 2008, provisional application No. 60/937,786, filed on Jun. 28, 2007, provisional application No. 61/017,392, filed on Dec. 28, 2007, provisional application No. 61/073,326, filed on Jun. 17, 2008.

(56) References Cited

U.S. PATENT DOCUMENTS

| | | | |
|---|---|---|---|
| 1,865,833 A | 7/1932 | Chesny | |
| 1,897,725 A | 2/1933 | Gaus et al. | |
| 2,304,391 A | 12/1942 | Zimmerman | |
| 2,329,940 A | 9/1943 | Ponzer | |
| 2,383,674 A | 8/1945 | Osborne | |
| 2,458,039 A | 1/1949 | Wait | |
| 2,606,839 A | 8/1952 | Evans | |
| 2,934,419 A | 4/1960 | Cook | |
| 2,967,807 A | 1/1961 | Osborne et al. | |
| 3,046,152 A | 7/1962 | Tsuneyoshi | |
| 3,120,426 A | 2/1964 | Crawford, Jr. | |
| 3,179,579 A | 4/1965 | Gustave et al. | |
| 3,196,092 A | 7/1965 | Beer | |
| 3,202,522 A | 8/1965 | Yang et al. | |
| 3,350,292 A | 10/1967 | Weinberger et al. | |
| 3,374,164 A | 3/1968 | Balej et al. | |
| 3,420,775 A | 1/1969 | Cadwallader | |
| 3,463,814 A | 8/1969 | Blanco et al. | |
| 3,466,169 A | 9/1969 | Nowak et al. | |
| 3,511,595 A | 5/1970 | Fuchs | |
| 3,511,712 A | 5/1970 | Giner | |
| 3,525,675 A | 8/1970 | Gaudin | |
| 3,558,769 A | 1/1971 | Globus | |
| 3,574,530 A | 4/1971 | Suriani et al. | |
| 3,627,479 A | 12/1971 | Yee | |
| 3,627,480 A | 12/1971 | Birchall | |
| 3,630,762 A | 12/1971 | Olton et al. | |
| 3,686,372 A | 8/1972 | Hiatt et al. | |
| 3,725,267 A | 4/1973 | Gelblum | |
| 3,861,928 A | 1/1975 | Slater et al. | |
| 3,864,236 A | 2/1975 | Lindstrom | |
| 3,904,496 A | 9/1975 | Harke et al. | |
| 3,917,795 A | 11/1975 | Pelczarski et al. | |
| 3,925,534 A | 12/1975 | Singleton et al. | |
| 3,953,568 A | 4/1976 | Seko et al. | |
| 3,963,592 A | 6/1976 | Lindstrom | |
| 3,970,528 A | 7/1976 | Zirngiebl et al. | |
| 4,026,716 A | 5/1977 | Urschel, III et al. | |
| 4,036,749 A | 7/1977 | Anderson | |
| 4,069,063 A * | 1/1978 | Ball | 106/713 |
| 4,080,270 A | 3/1978 | O'Leary et al. | |
| 4,106,296 A | 8/1978 | Leonard, Jr. et al. | |
| 4,107,022 A | 8/1978 | Strempel et al. | |
| 4,128,462 A | 12/1978 | Ghiringhelli et al. | |
| 4,140,510 A | 2/1979 | Scholze et al. | |
| 4,147,599 A | 4/1979 | O'Leary et al. | |
| 4,164,537 A | 8/1979 | Drostholm et al. | |
| 4,188,291 A | 2/1980 | Anderson | |
| 4,217,186 A | 8/1980 | McRae | |
| 4,242,185 A | 12/1980 | McRae | |
| 4,246,075 A | 1/1981 | Hilbertz | |
| 4,253,922 A | 3/1981 | Welch | |
| 4,264,367 A | 4/1981 | Schutz | |
| 4,308,298 A | 12/1981 | Chen | |
| 4,335,788 A | 6/1982 | Murphey et al. | |
| 4,361,475 A | 11/1982 | Moeglich | |
| 4,370,307 A | 1/1983 | Judd | |
| 4,376,101 A | 3/1983 | Sartori et al. | |
| 4,410,606 A | 10/1983 | Loutfy et al. | |
| 4,450,009 A | 5/1984 | Childs et al. | |
| 4,477,573 A | 10/1984 | Taufen | |
| 4,561,945 A | 12/1985 | Coker et al. | |
| 4,588,443 A | 5/1986 | Bache | |
| 4,620,969 A | 11/1986 | Wilkinson | |
| 4,716,027 A | 12/1987 | Morrison | |
| 4,804,449 A | 2/1989 | Sweeney | |
| 4,818,367 A | 4/1989 | Winkler | |
| 4,838,941 A | 6/1989 | Hill | |
| 4,899,544 A | 2/1990 | Boyd | |
| 4,915,914 A | 4/1990 | Morrison | |
| 4,931,264 A | 6/1990 | Rochelle et al. | |
| 5,037,286 A | 8/1991 | Roberts | |
| 5,100,633 A | 3/1992 | Morrison | |
| 5,230,734 A | 7/1993 | Kumasaka et al. | |
| 5,244,304 A | 9/1993 | Weill et al. | |
| 5,246,551 A | 9/1993 | Pletcher et al. | |
| 5,282,935 A | 2/1994 | Cawlfield et al. | |
| 5,362,688 A | 11/1994 | Porta et al. | |
| 5,364,611 A | 11/1994 | Iijima et al. | |
| 5,366,513 A | 11/1994 | Goldmann et al. | |
| 5,388,456 A | 2/1995 | Kettel | |
| 5,470,671 A | 11/1995 | Fletcher et al. | |
| 5,520,898 A | 5/1996 | Pinnavaia et al. | |
| 5,531,821 A | 7/1996 | Wu | |
| 5,531,865 A | 7/1996 | Cole | |
| 5,536,310 A | 7/1996 | Brook et al. | |
| 5,547,027 A | 8/1996 | Chan et al. | |
| 5,569,558 A | 10/1996 | Takeuchi et al. | |
| 5,584,923 A | 12/1996 | Wu | |
| 5,584,926 A | 12/1996 | Borgholm et al. | |
| 5,595,641 A | 1/1997 | Traini et al. | |
| 5,614,078 A | 3/1997 | Lubin et al. | |
| 5,624,493 A | 4/1997 | Wagh et al. | |
| 5,690,729 A | 11/1997 | Jones, Jr. | |
| 5,702,585 A | 12/1997 | Hillrichs et al. | |
| 5,766,338 A | 6/1998 | Weber | |
| 5,766,339 A | 6/1998 | Babu et al. | |
| 5,776,328 A | 7/1998 | Traini et al. | |
| 5,785,868 A | 7/1998 | Li et al. | |
| 5,803,894 A | 9/1998 | Kao et al. | |
| 5,846,669 A | 12/1998 | Smotkin et al. | |
| 5,849,075 A | 12/1998 | Hopkins et al. | |
| 5,855,666 A | 1/1999 | Kao et al. | |
| 5,855,759 A | 1/1999 | Keating et al. | |
| 5,897,704 A | 4/1999 | Baglin | |
| 5,925,255 A | 7/1999 | Mukhopadhyay | |
| 5,965,201 A * | 10/1999 | Jones, Jr. | 427/243 |
| 6,024,848 A | 2/2000 | Dufner et al. | |
| 6,059,974 A | 5/2000 | Scheurman, III | |
| 6,071,336 A | 6/2000 | Fairchild et al. | |
| 6,080,297 A | 6/2000 | Ayers | |
| 6,090,197 A | 7/2000 | Vivian et al. | |
| 6,129,832 A | 10/2000 | Fuhr et al. | |
| 6,180,012 B1 | 1/2001 | Rongved | |
| 6,190,428 B1 | 2/2001 | Rolison et al. | |

| Patent/Publication | Date | Inventor |
|---|---|---|
| 6,200,381 B1 | 3/2001 | Rechichi |
| 6,200,543 B1 | 3/2001 | Allebach et al. |
| 6,217,728 B1 | 4/2001 | Lehmann et al. |
| 6,235,186 B1 | 5/2001 | Tanaka et al. |
| 6,248,166 B1 | 6/2001 | Solsvik |
| 6,251,356 B1 | 6/2001 | Mathur |
| 6,264,736 B1 * | 7/2001 | Knopf et al. .................. 106/682 |
| 6,264,740 B1 | 7/2001 | McNulty, Jr. |
| 6,280,505 B1 | 8/2001 | Torkildsen et al. |
| 6,309,570 B1 * | 10/2001 | Fellabaum .................. 264/40.1 |
| 6,352,576 B1 | 3/2002 | Spencer et al. |
| 6,375,825 B1 | 4/2002 | Mauldin et al. |
| 6,387,174 B2 * | 5/2002 | Knopf et al. .................. 106/738 |
| 6,387,212 B1 | 5/2002 | Christian |
| 6,402,831 B1 | 6/2002 | Sawara et al. |
| 6,416,574 B1 | 7/2002 | Steelhammer et al. |
| 6,444,107 B2 | 9/2002 | Hartel et al. |
| 6,475,460 B1 | 11/2002 | Max |
| 6,495,013 B2 | 12/2002 | Mazur et al. |
| 6,517,631 B1 | 2/2003 | Bland |
| 6,518,217 B2 | 2/2003 | Xing et al. |
| 6,537,456 B2 | 3/2003 | Mukhopadhyay |
| 6,602,630 B1 | 8/2003 | Gopal |
| 6,623,555 B1 | 9/2003 | Haverinen et al. |
| 6,638,413 B1 | 10/2003 | Weinberg et al. |
| 6,648,949 B1 | 11/2003 | Der et al. |
| 6,712,946 B2 | 3/2004 | Genders et al. |
| 6,755,905 B2 | 6/2004 | Oates et al. |
| 6,776,972 B2 | 8/2004 | Vohra et al. |
| 6,786,963 B2 | 9/2004 | Matherly et al. |
| 6,841,512 B1 | 1/2005 | Fetcenko et al. |
| 6,890,419 B2 | 5/2005 | Reichman et al. |
| 6,890,497 B2 | 5/2005 | Rau et al. |
| 6,908,507 B2 | 6/2005 | Lalande et al. |
| 6,936,573 B2 | 8/2005 | Wertz et al. |
| 7,037,434 B2 | 5/2006 | Myers et al. |
| 7,040,400 B2 | 5/2006 | de Rouffignac et al. |
| 7,132,090 B2 | 11/2006 | Dziedzic et al. |
| 7,135,604 B2 | 11/2006 | Ding et al. |
| 7,198,722 B2 | 4/2007 | Hussain |
| 7,255,842 B1 | 8/2007 | Yeh et al. |
| 7,261,912 B2 | 8/2007 | Zeigler |
| 7,282,189 B2 | 10/2007 | Zauderer |
| 7,285,166 B2 | 10/2007 | Luke et al. |
| 7,314,847 B1 | 1/2008 | Siriwardane |
| 7,347,896 B2 | 3/2008 | Harrison |
| 7,390,444 B2 | 6/2008 | Ramme et al. |
| 7,427,449 B2 | 9/2008 | Delaney et al. |
| 7,440,871 B2 | 10/2008 | McConnell et al. |
| 7,452,449 B2 | 11/2008 | Weinberg et al. |
| 7,455,854 B2 | 11/2008 | Gower et al. |
| 7,595,001 B2 | 9/2009 | Arakel et al. |
| 7,674,443 B1 | 3/2010 | Davis |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2003/0017088 A1 | 1/2003 | Downs et al. |
| 2003/0123930 A1 | 7/2003 | Jacobs et al. |
| 2003/0126899 A1 | 7/2003 | Wolken |
| 2003/0188668 A1 | 10/2003 | Bland |
| 2003/0213937 A1 | 11/2003 | Yaniv |
| 2003/0229572 A1 | 12/2003 | Raines et al. |
| 2004/0014845 A1 | 1/2004 | Takamura et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0111968 A1 | 6/2004 | Day et al. |
| 2004/0126293 A1 * | 7/2004 | Geerlings et al. ............. 423/228 |
| 2004/0139891 A1 | 7/2004 | Merkley et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0118081 A1 | 6/2005 | Harris et al. |
| 2005/0129606 A1 | 6/2005 | Mitsuhashi et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0255174 A1 | 11/2005 | Shelley et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1 | 8/2006 | Jones |
| 2006/0195002 A1 | 8/2006 | Grandjean et al. |
| 2006/0196836 A1 | 9/2006 | Arakel et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0092427 A1 | 4/2007 | Anthony et al. |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0240570 A1 | 10/2007 | Jadhav et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0059206 A1 | 3/2008 | Jenkins |
| 2008/0112868 A1 | 5/2008 | Blencoe et al. |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0223727 A1 | 9/2008 | Oloman et al. |
| 2008/0236143 A1 | 10/2008 | Lo |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0081093 A1 | 3/2009 | Comrie |
| 2009/0081096 A1 * | 3/2009 | Pellegrin ....................... 423/232 |
| 2009/0090277 A1 | 4/2009 | Joshi et al. |
| 2009/0143211 A1 | 6/2009 | Riman et al. |
| 2009/0169452 A1 | 7/2009 | Constantz et al. |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0024686 A1 | 2/2010 | Constantz et al. |
| 2010/0063902 A1 | 3/2010 | Constantz et al. |

| | | | |
|---|---|---|---|
| 2010/0077691 A1 | 4/2010 | Constantz et al. | |
| 2010/0077922 A1 | 4/2010 | Constantz et al. | |
| 2010/0083880 A1 | 4/2010 | Constantz et al. | |
| 2010/0084280 A1 | 4/2010 | Gilliam et al. | |
| 2010/0089142 A1 | 4/2010 | Sukhija et al. | |
| 2010/0111810 A1 | 5/2010 | Constantz et al. | |
| 2010/0116683 A1 | 5/2010 | Gilliam | |

FOREIGN PATENT DOCUMENTS

| | | |
|---|---|---|
| AU | 2008256636 B2 | 12/2008 |
| CA | 1335974 A1 | 6/1995 |
| CA | 2646462 A1 | 9/2007 |
| DE | 2653649 A1 | 6/1978 |
| DE | 3146326 A1 | 6/1983 |
| DE | 3638317 A1 | 6/1987 |
| DE | 19512163 | 10/1995 |
| DE | 19523324 A1 | 3/1996 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| GB | 911386 A | 11/1962 |
| GB | 1392907 | 5/1975 |
| GB | 2032441 | 5/1980 |
| GB | 2210035 A | 6/1989 |
| GB | 2371810 A | 8/2002 |
| JP | 51102357 A1 | 9/1976 |
| JP | 59100280 | 6/1984 |
| JP | 63-312988 A2 | 12/1988 |
| JP | 03-020491 A2 | 1/1991 |
| JP | 03-170363 A | 7/1991 |
| JP | 7061842 A | 3/1995 |
| JP | 10305212 A | 11/1998 |
| JP | 2002-273163 A | 9/2002 |
| JP | 2003041388 | 2/2003 |
| JP | 2004-174370 | 6/2004 |
| JP | 2005-052762 | 3/2005 |
| JP | 2006-076825 | 3/2006 |
| NL | 7607470 A | 1/1978 |
| WO | WO 93/16216 A1 | 8/1993 |
| WO | WO 94/18119 | 8/1994 |
| WO | WO 96/34997 A1 | 11/1996 |
| WO | WO 99/13967 A1 | 3/1999 |
| WO | WO 2006/009600 A2 | 1/2000 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/078836 A2 | 8/2005 |
| WO | WO 2005/086843 A2 | 9/2005 |
| WO | WO 2005/108297 A2 | 11/2005 |
| WO | WO 2006/034339 A1 | 3/2006 |
| WO | WO 2006/036396 A2 | 4/2006 |
| WO | WO 2006/099599 A2 | 9/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A2 | 11/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2010/006242 A1 | 1/2010 |
| WO | WO 2010/030826 A1 | 3/2010 |
| WO | WO 2010/039903 A1 | 4/2010 |
| WO | WO 2010/039909 A1 | 4/2010 |

OTHER PUBLICATIONS

Alexander, G. et al., "Evaluation of reaction variables in the dissolution of serpentine for mineral carbonation"; Elsevier; ScienceDirect Fuel 86 (2007) 273-281.

Allen, L.M. 1992. Boron and Sulfur Isotopic Fractionation in the Coal Combustion System. A Thesis Submitted to the Faculty of the Department of Hydrology and Water Resources. The University of Arizona.

Avery, G.B. et al. 2006. Carbon isotopic characterization of dissolved organic carbon in rainwater. Terrestrial and marine influences. *Science Direct*. 40(39): 7539-7545. Retrieved from the internet on May 20, 2010.

Back, M. et al.,"Reactivity of Alkaline Lignite Fly Ashes Towards CO in Water." Environmental Science & Technology. vol. 42, No. 12 (2008) pp. 4520-4526.

Baer, D.S., et al. 2002. Sensitive absorption measurements in the near-infrared region using off-axis integrated-cavity-output spectroscopy. *Appl. Phys. B*. 5 pages.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

Biello, D. Cement from CO2: A Concrete Cure for Global Warming? *Scientific American* Aug. 7, 2008., pp. 1-3 [online] [retrieved on Dec. 29, 2009] <URL: http://www.scientificamerican.com/article.cfm>.

Biennier, L., et al. 2004. Multiplex integrated cavity output spectroscopy of cold PAH cations. *Chemical Physics Letters*. 387: 287-294.

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

Bottomley, D.J. et al. 1999. The origin and evolution of Canadian Shield brines: evaporation or freezing of seawater? New lithium isotope and geochemical evidence from the Slave craton. *Chemical Geology*. 155: 295-320.

Cannell, M.G.R. 2003. "Carbon sequestration and biomass energy offset: theoretical, potential and achievable capacities globally, in Europe and the UK." Biomass and Bioenergy. 24: 97-116.

Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.

Cerling, T.E. 1984. The stable isotopic composition of modern soil carbonate and its relationship to climate. *Earth and Planetary Science Letters*. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

CICCS "Aims and Research"; www.nottingham.ac.uk/carbonmanagement/ccs_aims.php 2pp Aug. 3, 2007.

Criss, R.E. 1995. Stable Isotope Distribution: Variations from Temperature, Organic and Water-Rock Interactions. Washington University, St. Lous, Department of Earch and Planetary Sciences. *American Geophysical Union*. pp. 292-307.

Dickens, A. et al. 2004. Reburial of fossil organic carbon in marine sediments. *Nature*. 427: 336-339. Retrieved from the internet on May 20, 2010.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Ehleringer, J.R., et al. 2002. Stable Isotopes. vol. 2, The Earth System: biological and ecological dimensions of global environmental change. pp. 544-550. Edited by Professor Harold A. Mooney and Dr. Joseph G. Canadell in Encyclopedia of Global Environment Change. John Wiley & Sons, Ltd. Chichester.

"Electrochemical cell", Wikipedia (2009), http:en.wikipedia.org/wiki/Electrochemical_Cell, Nov. 24, 2009, 5 pp.

Elswick, E.R., et al. 2007. Sulfur and carbon isotope geochemistry of coal and derived coal-combustion by-products: An example from an Eastern Kentucky mine and power plant. *Applied Geochemistry*. 22: 2065-2077.

Fallick, A.E., et al. 1991. A Stable Isotope Study of the Magnesite Deposits Associated with the Alpine-Type Ultramafic Rocks of Yugoslavia. *Economic Geology*. 86: 847-861.

Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research*. 70(3): 565-585.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting http://www.electrosynthesis.com/news/mwatts.html (accessed Feb. 5, 2009).

Goldberg et al. Jun. 2009. "CO2 Mineral Sequestration Studies in US"; National Energy Technology Laboratory; goldberg@netl.doe.gov; 10pp.

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; www.greencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al. Mar. 18, 2006. "Preliminary Investigation of Carbon Sequestration Potential in Brine from Pennsylvanis's Oriskany Sandstone Formation in Indiana County, PA"; The Energy Institute and the Department of Energy & Geo-Environmental Engineering. College of Engineering Research Symposium, Session 3C. 16pp.

Holdgate, G.R., et al. 2009. Eocene-Miocene carbon-isotope and floral record from brown coal seams in the Gippsland Basin of southest Australia. *Global and Planetary Change*. 65: 89-103.

Holze, S. et al. 1994. Hydrogen Consuming Anodes for Energy Saving in Sodium Sulphate Electrolysis. *Chem. Eng. Technol.* 17: 382-389.

Horkel, K., et al. 2009. Stable isotopic composition of cryptocrystalline magnesite from deposits in Turkey and Austria. *Geophysical Research Abstracts*. 11. (abstract only).

Horner, G. et al. 2004. Isotope selective analysis of CO2 with tunable diode laser (TDL) spectroscopy in the NIR. *The Analyst*. 129: 772-778.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huijgen, W.J.J., et al. 2005. Mineral CO2 Sequestration by Steel Slag Carbonation. *Environ. Sci. Technol.* 39: 9676-9682.

Huijgen, W.J.J., et al. 2006. Energy Consumption and Net CO2 Sequestration of Aqueous Mineral Carbonation. *Ind. Eng. Chem. Res.* 45: 9184-9194.

Huntzinger, D.N. et al. 2009. A life-cycle assessment of Portland cement manufacturing: comparing the traditional process with alternative technologies. *Journal of Cleaner Production*. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 3, 2010 of EP08867440.3.

International Search Report dated May 6, 2010 of EP09716193.9.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.
International Search Report dated Dec. 14, 2009 of PCT/US09/061748.
International Search Report dated Jan. 4, 2010 of PCT/US09/062795.
International Search Report dated Jan. 13, 2010 of PCT/US09/059135.
International Search Report dated Feb. 2, 2010 of PCT/US09/059141.
International Search Report dated Feb. 24, 2010 of PCT/US09/067764.
International Search Report dated Mar. 10, 2010 of PCT/US10/022935.
International Search Report dated May 21, 2010 of PCT/US09/064117.
"Isotopic Signature", Wikipedia (2010), http://en.wikipedia.org/wiki/Isotopic_signature, Apr. 14, 2009, 3 pp.
Justnes, H. et al. "Pozzolanic, Amorphous Silica Produced from the Mineral Olivine." Proceedings of the Seventh CANMET/ACI International Conference on Fly Ash, Silica Fume, Slag And Natural Pozzolans in Concrete, 2001. SP-199-44. pp. 769-781.
Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.
Lackner, K. "Carbonate Chemistry for Sequestering Fossil Carbon"; Annual Review Energy Environ. 2002 27:193-232.
Lackner, K.S. et al. "Carbon Dioxide Disposal in Carbonate Minerals." Energy. 1995. 20(11): 1153-1170.
Levy, D. "Burnt biomass causes short-term global cooling, long-term warming." http://news-service.stanford.edu/news/2004/august4/biomass-84.html. 3 pages.
Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.
Mazrou, S., et al. 1997. Sodium hydroxide and hydrochloric acid generation from sodium chloride and rock salt by electro-electrodialysis. *Journal of Applied Electrochemistry* 27: 558-567.
McCrea, J.M. 1950. On the Isotopic Chemistry of Carbonates and a Paleotemperature Scale. *The Journal of Chemical Physics*. 18(6): 849-857.
Melezhik, V.A., et al. 2001. Palaeoproterozoic magnesite: lithological and isotopic evidence for playa/sabkha environments. *Sedimentology*. 48: 379-397.
Mihalcea, R.M., et al. 1998. Diode-laser absorption measurements of $CO_2$ near 2.0 μm at elevated temperatures. *Applied Optics*. 37(36): 8341-8347.
Miljevic, N., et al. 2007. Potential Use of Environmental Isotopes in Pollutant Migration Studies. *Environmental Isotopes in Pollutant Studies*. 58: 251-262.
Montes-Hernandez, G. et al.,"Mineral sequestration of $CO_2$ by aqueous carbonation of coal combustion fly-ash." Journal of Hazardous Materials vol. 161 (2009). pp. 1347-1354.
Mook, W.G., et al. 1968. Isotopic Equilibrium between Shells and Their Environment. *Science*. 159(3817): 874-875.
Mook, W.G., et al. 1974. Carbon Isotope Fractionation Between Dissolved Bicarbonate and Gaseous Carbon Dioxide. 22:169-176.
Mottana, A. et al. 1979. Der grosse Mineralienfuhrer, BLV Verlagsgesellschaft mbH, Munchen, XP002577921, p. 194. (In German with English Translation).
Nayak, V.S. "Nonelectrolytic Production of Caustic Soda and Hydrochloric Acid from Sodium Chloride"; Ind. Eng. Chem. Res. 1996. 35: 3808-3811.
Noda, H., et al. 1990. Electrochemical Reduction of Carbon Dioxide at Various Metal Electrodes in Aqueous Potassim Hydrogen Carbonate Solution. *The Chemical Society of Japan*. 63: 2459-2462.
O'Connor et al., "Carbon Dioxide Sequestration By Direct Mineral Carbonation: Results From Recent Studies And Curent Status"; Albany Research Center, Albany Oregon; Office of Fossil Energy, US Dept. of Energy; 1st Annual DOE Carbon Sequestration Conference, Washington DC, May 2001 12pp.

O'Connor, W.K. et al. "Carbon dioxide sequestration: Aqueous mineral carbonation studies using olivine and serpentine." 2001. Albany Research Center, National Engery Technology Laboratory: Mineral Carbonation Workshop, Pittsburgh, PA.
O'Neil, J.R., et al. 1971. C13 and O18 compositions in some freshwater carbonates associated with ultramafic rocks and serpentines: western United State*. *Geochimica et Cosmochimica Acta*. 35: 687-697.
Park, A., et al. 2004. $CO_2$ mineral sequestration: physically activated dissolution of serpentine and pH swing process. *Chemical Engineering Science* 59 (22-23): 5241-5247.
Philp, R.P. 2007. The emergence of stable isotopes in environmental and forensic geochemistry studies: a review. *Environ Chem Lett*. 5:57-66.
Portier et al. 2005. Modelling $CO_2$ solubility in pure water and NaCl-type waters from 0 to 300° C. and from 1 to 300 bar Application to the Utsira Formation at Sleipner. *Chemical Geology*. 217: 187-199.
Power, I.M., et al. 2007. Biologically induced mineralization of dypingite by cyanobacteria from an alkaline wetland near Atlin, British Columbia, Canada. *Geochemical Transactions*. 8: 16 pages.
Quay, P.D., et al. 1992. Oceanic Uptake of Fossil Fuel $CO$_2$: Carbon-13 Evidence. *Science*. 256 (5053): 74-79.
Rahardianto et al., "High recovery membrane desalting of low-salinity brackish water: Integration of accelerated precipitation softening with membrane RO"; Science Diret; Journal of Membrane Science 289 (2007) 123-137.
Rakib, M. et al. 1999. Behaviour of Nafion® 350 membrane in sodium sulfate electrochemical splitting: continous process modelling and pilot scale tests. Journal of Applied Electrochemistry. 29: 1439-1448.
Rau, G. 2004. Possible use of Fe/$CO_2$ fuel cells for $CO_2$ mitigation plus H2 and electricity production. *Energy Conversion and Management*. 45: 2143-2152.
Raz et al., "Formation of High-Magnesium Calcites via an Amorphous Precursor Phase: Possible Biological Implications"; Advanced Materials; Adv. Mater. (2000) vol. 12, No. 1; 5pp.
Rosenthal, E., "Cement Industry is at Center of Climate Change Debate" New York Times; www.nytimes.com/2007/10/26/business/worldbusiness/26cement.htmlref=todayspaper; 4pp.
Saad, N. et al. 2009. Measurement of Isotopic $CO_2$ in Dissolved Inorganic Carbons of Water Samples from Various Origins Using Wavelength-Scanned Cavity Ring-Down Spectrophotometer. *Geophysical Research Abstracts*. 11. (abstract only).
Sadhwani et al., "Case Studies on environmental impact of seawater desalination" Science Direct; http://www.sciencedirect.com/science?_ob=ArticleURL&_udi=B6TFX-4HMX97J-3&_u... 3pp.
Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.
Schwab, E. 2004. Calciumhydroxid, XP-002577920. Retrieved from the Internet: <URL:http://www.roempp.com/prod/index1.html> (In German with English Translation).
Schouten, S., et al. 2004. Stable Carbon Isotopic Fractionations Associated with Inorganic Carbon Fixation by Anaerobic Ammonium-Oxidizing Bacteria. *Applied and Environmental Microbiology*. 70(6): 3785-3788.
Schroll, E. 2002. Genesis of magnesite deposits in the view of isotope geochemistry. *Boletim Paranaense de Geociencias*. 50: 59-68.
Sheppard, S.M.F., et al. 1970. Fractionation of Carbon and Oxygen Isotopes and Magnesium between Coexisting Metamorphic Calcite and Dolomite. *Contr. Mineral. And Petrol*. 26. 161-198.
Serizawa et al., "Cell-compatible properties of calcium carbonates and hydroxyapatite deposited on ultrathin poly (vinly alcohol)-coated polyethylene films"; J. Biomater. Sci. Polymer Edn., vol. 14, No. 7 (2003) pp. 653-663.
Sethi, S. et al. 2006. Existing & Emerging Concentrate Minimization & Disposal Practices for Membrane Systems. *Florida Water Resources Journal*. pp. 38, 40, 42, 44, 46, 48.

Shell Global Solutions, 2003. "ADIP-X and Sulfinol-X—new regenerable acid-gas removal processes"; Shell Global Solutions International; OG 130210370903-En(A); www.shellglobalsoultions.com 2 pp (presented at the 12th International Oil, Gas, and Petrochemicals Congress, Tehran, Iran Feb. 24-26, 2003).

Sial, A.N., et al. 2000. Carbon isotope fluctuations in Precambrian carbonate sequences of several localities in Brazil. *An. Acad. Bras. Ci.* 72(4): 539-558.

Stanley, S.M., et al. 2002. Low-magnesium calcite produced by coralline algae in seawater of Late Cretaceous composition. *PNAS.* 99(24): 15323-15326.

Tececo Pty Ltd, "Eco-Cement"; www.tececo.com/simple.eco-cement.php; Dec. 29, 2008; 6pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/126,776, filed May 23, 2008, Constantz, Brent R., et al, Non-Final Office Action dated Feb. 25, 2010; 21 pp.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/163,205, filed Jun. 27, 2008, Constantz, Brent R., et al, Non-Final Office Action dated Mar. 25, 2010.

U.S. Appl. No. 12/344,019, filed Dec. 24, 2008, Constantz, Brent R., et al, Non-Final Office Action dated Nov. 16, 2009.

U.S. Appl. No. 12/344,019, filed Dec. 24, 2008, Constantz, Brent R., et al, Non-Final Office Action dated Mar. 11, 2010.

U.S. Appl. No. 12/375,632, filed Mar. 5, 2009, Kirk, Donald W. et al, Non-Final Office Action dated Mar. 19, 2010.

U.S. Appl. No. 12/375,632, filed Mar. 5, 2009, Kirk, Donald W. et al, Non-Final Office Action dated Sep. 8, 2009.

U.S. Appl. No. 12/475,378, filed May 29, 2009, Constantz Brent. et al, Final Office Action dated May 5, 2010.

U.S. Appl. No. 12/475,378, filed May 29, 2009, Constantz Brent. et al, Non-Final Office Action dated Mar. 17, 2010.

U.S. Appl. No. 12/475,378, filed May 29, 2009, Constantz Brent. et al, Non-Final Office Action dated Mar. 2, 2010.

U.S. Appl. No. 12/486,692, filed Jun. 17, 2009, Constantz Brent. et al, Final Office Action dated May 3, 2010.

U.S. Appl. No. 12/486,692, filed Jun. 17, 2009, Constantz Brent. et al, Non-Final Office Action dated Mar. 23, 2010.

U.S. Appl. No. 12/486,692, filed Jun. 17, 2009, Constantz Brent. et al, Non-Final Office Action dated Mar. 1, 2010.

U.S. Appl. No. 12/501,217, filed Jul. 10, 2009, Constantz Brent. et al, Non-Final Office Action dated Mar. 12, 2010.

U.S. Appl. No. 12/557,492, filed Sep. 10, 2009, Constantz, Brent R., et al. Non-Final Office Action dated May 6, 2010.

U.S. Appl. No. 12/604,383, filed Oct. 22, 2009, Constantz Brent R. et al, Non-Final Office Action dated Apr. 5, 2010.

U.S. Appl. No. 12/571,398, filed Sep. 30, 2009, Constantz Brent R. et al, Non-Final Office Action dated May 3, 2010.

U.S. Appl. No. 12/609,491, filed Oct. 30, 2009, Constantz Brent. et al, Non-Final Office Action dated Mar. 31, 2010.

Vagin, S.P., et al. 1979. Measurement of the Temperature of Gas Media Containing Carbon Dioxide by the Laser-Probing Method. *Plenum.*

Wang, W., et al. 2005. Effects of biodegradation on the carbon isotopic composition of natural gas—A case study in the bamianhe oil field of the Jiyang Depression, Eastern China. *Geochemical Journal.* 39(4): 301-309. (abstract) [online] [retrieved on Feb. 29, 2009] <URL: http://www/jstage.jst.go.jp/article/geochemj/39/4/39_301/_article> ab.

Webber, M.E., et al. 2001. In situ combustion measurements of CO2 by use of a distributed-feedback diode-laser sensor near 2.0 µm. *Applied Optics.* 40(6): 821-828.

Wen-Zhi et al., "Using Electrolytic Method to Promote CO2 Sequestration in Serpentine by Mineral Carbonation"; Journal of China University of Mining and Technology; vol. 36, No. 6; Nov. 2007 (Publication and English Translation).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc.* 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%/20archive/Files/33_1_TORONTO_06-88_0114.PDF>.

Wright, L.L., et al. 1993. "U.S. Carbon Offset Potential Using Biomass Energy Systems." Water, Air, and Soil Pollution. 70: 483-497.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

\* cited by examiner

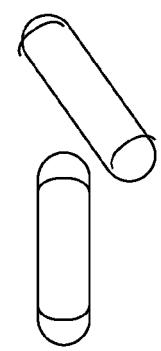
Fig. 3A
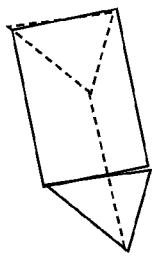
Fig. 3B
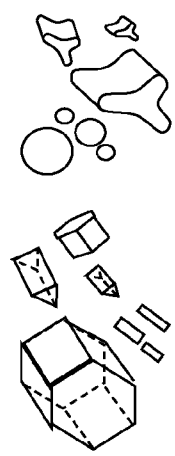
Fig. 3C
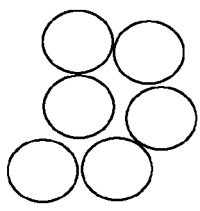
Fig. 3D
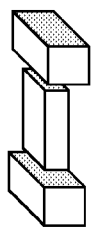
Fig. 3E
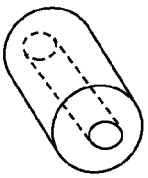
Fig. 3F
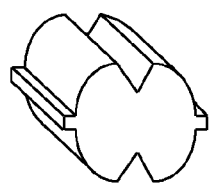
Fig. 3G
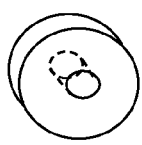
Fig. 3H
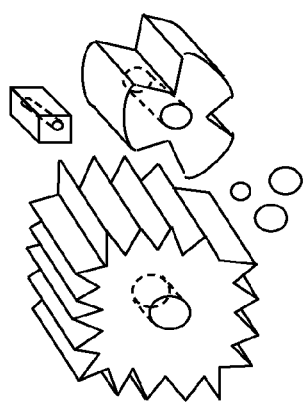
Fig. 3I
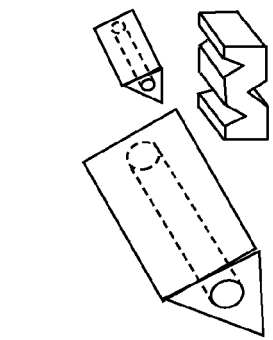
Fig. 3J
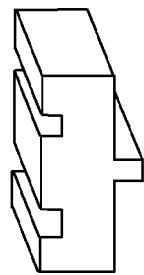
Fig. 3K
Fig. 3L

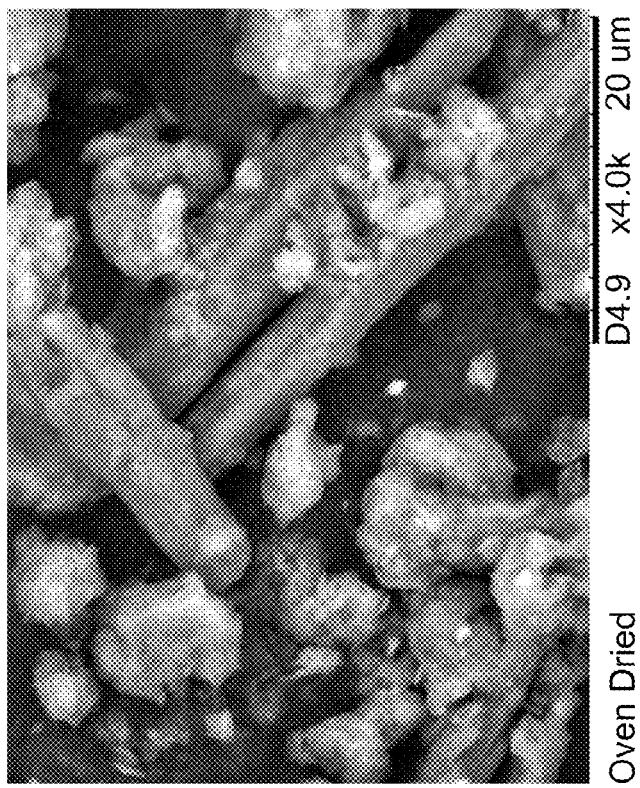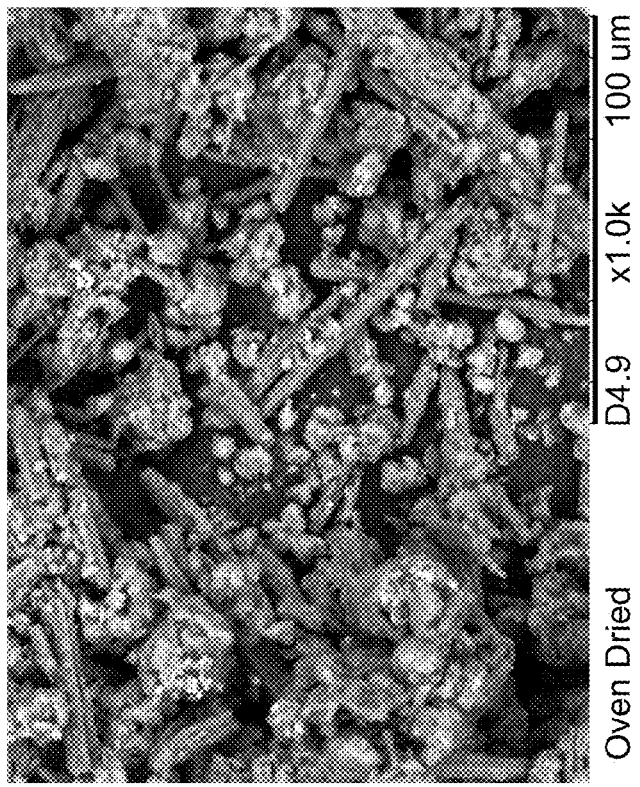
Fig. 8

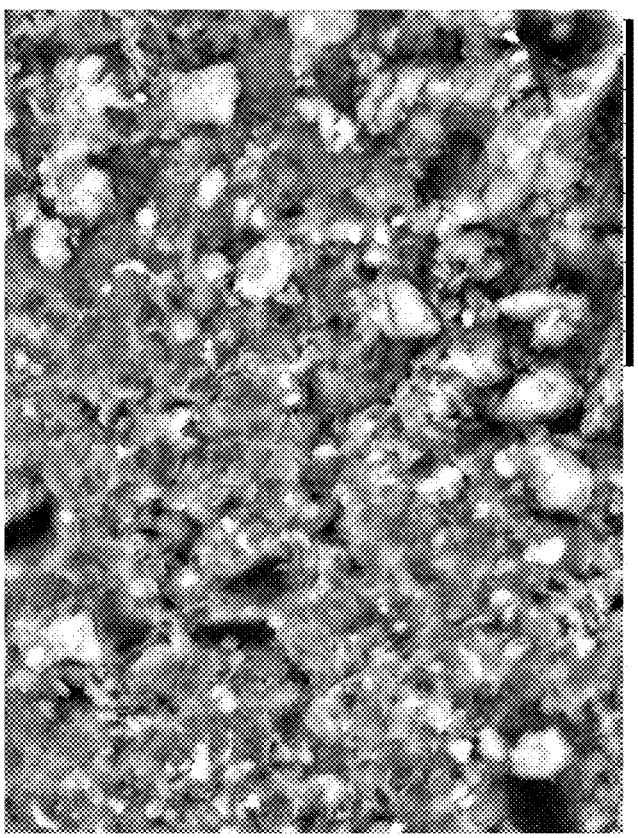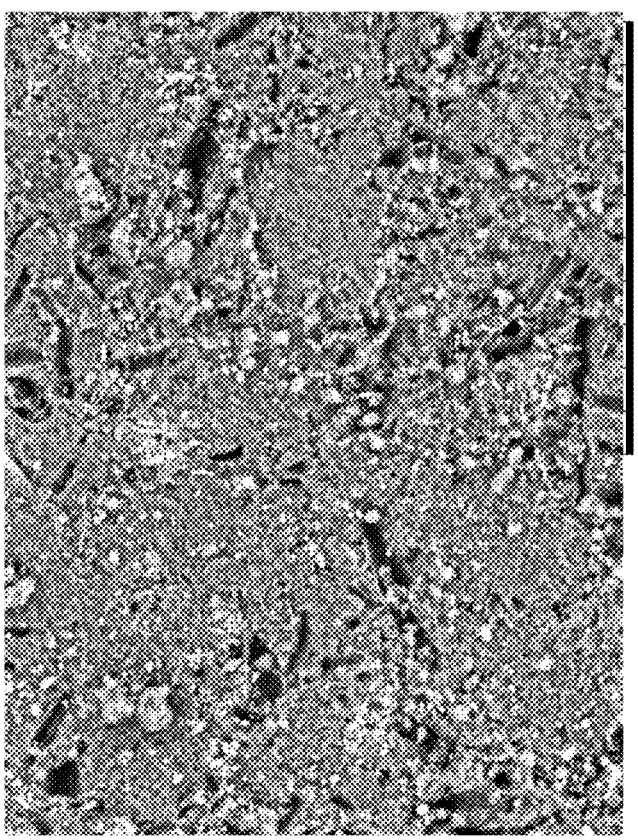
Fig. 12

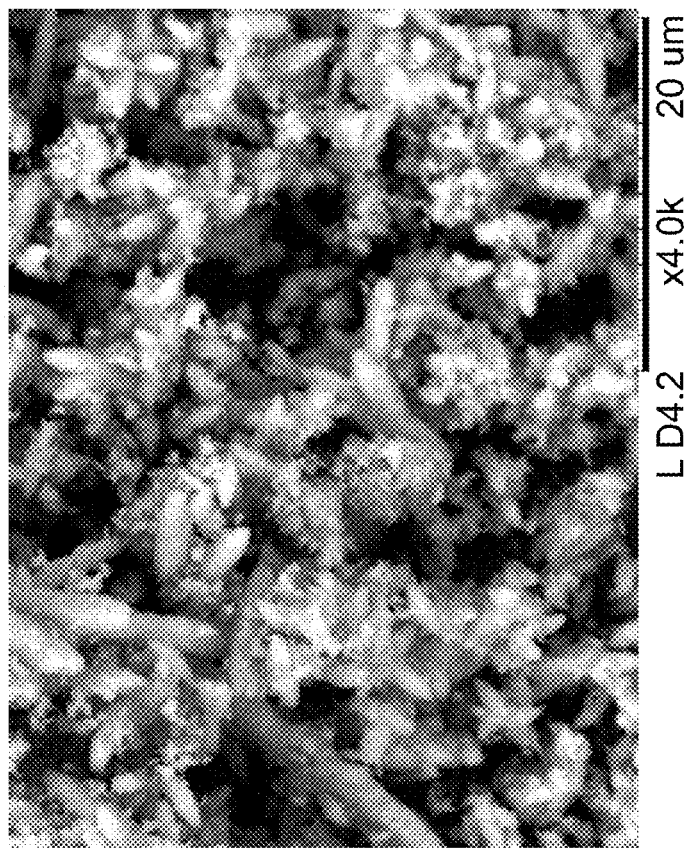
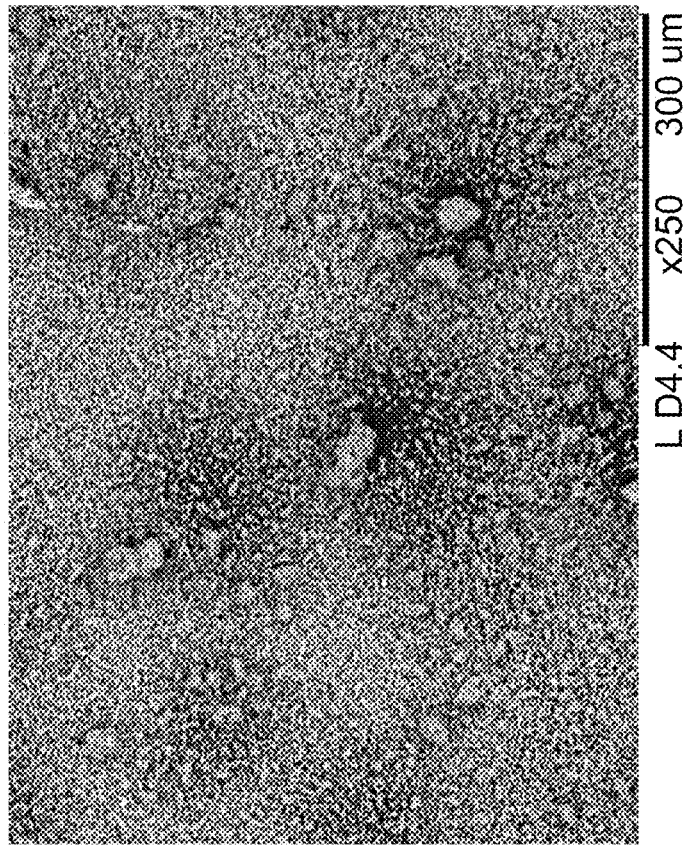
Fig. 22

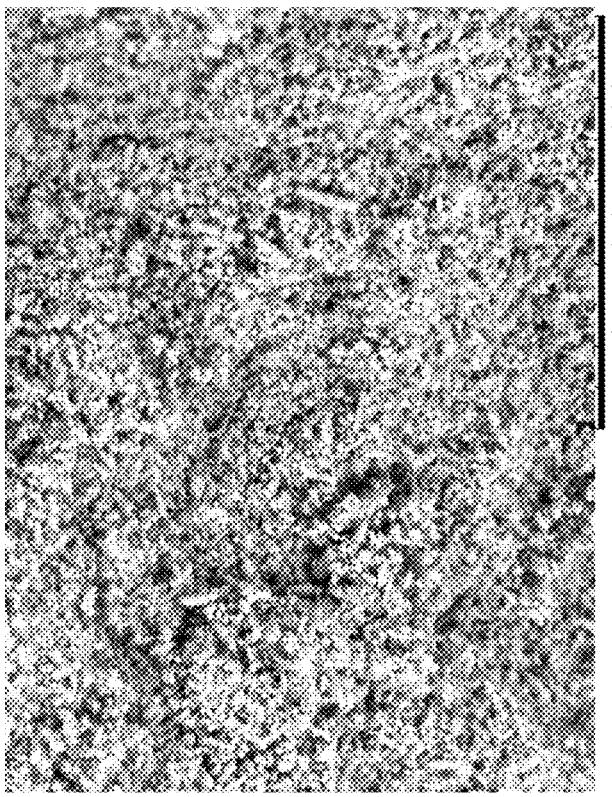
Fig. 26

ROCKS AND AGGREGATE, AND METHODS OF MAKING AND USING THE SAME

CROSS-REFERENCE

This application is a divisional of and claims priority to U.S. patent application Ser. No. 12/475,378, filed May 29, 2009 now U.S. Pat. No. 7,753,618, titled "ROCKS AND AGGREGATE, AND METHODS OF MAKING AND USING THE SAME" which in turn, pursuant to 35 U.S.C. §119 (e), claims priority to the filing dates of U.S. Provisional Patent Application Ser. No. 61/056,972, filed May 29, 2008; U.S. Provisional Patent Application 61/101,629 filed on Sep. 30, 2008; U.S. Provisional Patent Application 61/101,631 filed on Sep. 30, 2008; U.S. Provisional Patent Application Ser. No. 61/081,299 filed on Jul. 16, 2008; U.S. Provisional Patent Application Ser. No. 61/117,541 filed on Nov. 24, 2008; U.S. Provisional Patent Application Ser. No. 61/117,543 filed on Nov. 24, 2008; U.S. Provisional Patent Application No. 61/107,645 filed on Oct. 22, 2008; U.S. Provisional Patent Application No. 61/149,633 filed on Feb. 3, 2009; U.S. Provisional Patent Application No. 61/158,992 filed on Mar. 10, 2009; U.S. Provisional Patent Application No. 61/168,166, filed Apr. 9, 2009; U.S. Provisional Patent Application No. 61/170,086, filed Apr. 16, 2009; U.S. Provisional Patent Application No. 61/178,475, filed May 14, 2009; U.S. Provisional Patent Application No. 61/096,035, filed Sep. 11, 2008; U.S. Provisional Patent Application No. 61/116,141, filed Nov. 19, 2008; U.S. Provisional Patent Application No. 61/117,542, filed Nov. 24, 2008; U.S. Provisional Patent Application No. 61/148,353, filed Jan. 29, 2009; U.S. Provisional Patent Application No. 61/149,640, filed Feb. 3, 2009; and U.S. Provisional Patent Application 61/181,250 filed on May 26, 2009, the disclosures of which applications are herein incorporated by reference. U.S. patent application Ser. No. 12/475,378 is also a continuation-in-part application of U.S. patent application Ser. No. 12/344,019, filed Dec. 24, 2008, which claims the benefit of U.S. Provisional Patent Application No. 61/101,626, filed Sep. 30, 2008; U.S. Provisional Patent Application No. 61/073,319, filed Jun. 17, 2008; U.S. Provisional Patent Application No. 61/017,405, filed Dec. 28, 2007; U.S. Provisional Patent Application No. 61/057,173, filed May 29, 2008; U.S. Provisional Patent Application No. 61/082,766, filed Jul. 22, 2008; U.S. Provisional Patent Application No. 61/088,347, filed Aug. 13, 2008; U.S. Provisional Patent Application No. 61/088,340, filed Aug. 12, 2008; U.S. Provisional Patent Application No. 61/121,872, filed Dec. 11, 2008; International Patent Application No. PCT/US08/088,246, filed Dec. 23, 2008; and International Patent Application No. PCT/US08/088,242, filed Dec. 23, 2008, each of which is incorporated herein by reference in its entirety and to each of which we claim priority under 35 U.S.C. §120. U.S. patent application Ser. No. 12/475,378 is also a continuation-in-part of U.S. patent application Ser. No. 12/163,205, filed Jun. 27, 2008 now U.S. Pat. No. 7,744,761, which claims the benefit of U.S. Provisional Patent Application No. 60/937,786, filed Jun. 28, 2007; U.S. Provisional Patent Application No. 61/017,392, filed Dec. 28, 2007; and U.S. Provisional Patent Application No. 61/073,326, filed 17 Jun. 2008, each of is incorporated herein by reference in its entirety and to each of which we claim priority under 35 U.S.C. §120.

BACKGROUND OF THE INVENTION

Carbon dioxide ($CO_2$) emissions have been identified as a major contributor to the phenomenon of global warming and ocean acidification. $CO_2$ is a by-product of combustion and it creates operational, economic, and environmental problems. It is expected that elevated atmospheric concentrations of $CO_2$ and other greenhouse gases will facilitate greater storage of heat within the atmosphere leading to enhanced surface temperatures and rapid climate change. The impact of climate change will likely be economically expensive and environmentally hazardous. Reducing potential risks of climate change will require sequestration of atmospheric $CO_2$.

SUMMARY OF THE INVENTION

In one aspect the invention provides compositions. In some embodiments, the invention provides an aggregate containing a $CO_2$-sequestering component. The $CO_2$-sequestering component may contain one or more carbonate compounds; in some embodiments carbonate compounds make up at least 50% w/w of the aggregate, or at least 90% w/w of the aggregate, or at least 98% w/w of the aggregate; optionally the aggregate may also contain sulfate and/or sulfite, e.g. where the sulfate/sulfite combined comprise at least 0.1% w/w of the aggregate. In some embodiments the carbonate compounds comprise magnesium carbonate, calcium carbonate, magnesium calcium carbonate, or a combination thereof; in some of these embodiments the molar ratio of calcium to magnesium in the aggregate is from 1/1 Ca/Mg to 1/10 Ca/Mg, or from 150/1 Ca/Mg to 10/1 Ca/Mg, or from 2/1 Ca/Mg to 1/2 Ca/Mg. In some embodiments the invention provides aggregate containing a $CO_2$-sequestering component where the aggregate has a carbon isotopic fractionation ($\delta^{13}C$) value more negative than (less than) −10‰, or more negative than −20‰. In some embodiments the invention provides aggregate containing a $CO_2$-sequestering component where the aggregate has a bulk density of between 75 lb/ft$^3$ and 125 lb/lb/ft$^3$, or between 90 lb/ft$^3$ and 115 lb/lb/ft$^3$. In some embodiments the invention provides a structure containing aggregate containing a $CO_2$-sequestering component, e.g., one of the aggregates described in this paragraph. Some exemplary structures of the invention include a building, a roadway, or a dam. In some embodiments, the structure is a roadway, for example a roadway that sequesters at least 1 ton of $CO_2$ per lane mile of roadway, or a roadway that sequesters at least 100 tons of $CO_2$ per lane mile of roadway, or a roadway that sequesters at least 1000 tons of $CO_2$ per lane mile of roadway.

In some embodiments the invention provides an aggregate containing carbon wherein the carbon has a carbon isotopic fractionation ($\delta^{13}C$) value more negative than (less than) −10‰, or more negative than −20‰, or more negative than −30‰. In some of these embodiments, the aggregate contains carbonate, for example, at least 10% w/w carbonate, or at least 50% w/w carbonate; the aggregate may optionally further contain a sulfate and/or a sulfite, such as a calcium or magnesium sulfate or sulfite, and in some cases the combined sulfate and sulfite comprise at least 0.1% w/w of the aggregate. In some embodiments containing carbonate the carbonate includes calcium carbonate, magnesium carbonate, calcium magnesium carbonate, or a combination thereof; for example, the calcium and magnesium may be present in a calcium:magnesium molar ratio between 200.1 and 1:2. In some embodiments the invention provides an aggregate containing carbon wherein the carbon has a carbon isotopic fractionation ($\delta^{13}C$) value more negative than (less than)-10‰, or more negative than −20‰, or more negative than −30‰ where the aggregate has a bulk density of between 75 lb/ft$^3$ and 125 lb/lb/ft$^3$, for example, between 90 lb/ft$^3$ and 115 lb/lb/ft$^3$. In some embodiments the invention provides a structure containing an aggregate containing carbon wherein the carbon has a carbon isotopic fractionation ($\delta^{13}C$) value more negative than (less than) −10‰, or more negative than −20‰, or more negative than −30‰; in some embodiments the structure is a building, a roadway, or a dam. In some embodiments the structure is a roadway.

In some embodiments, the invention provides an aggregate containing 90-99.9% carbonate, 0.1 to 10% sulfate and/or sulfite, in some embodiments the aggregate further contains 0.00000001 to 0.000001% mercury or mercury-containing compound. In some embodiments the aggregate has a carbon isotopic fractionation ($\delta^{13}C$) value more negative than −10‰. In some embodiments the aggregate has a bulk density of between 75 lb/ft$^3$ and 125 lb/lb/ft$^3$, e.g., between 90 lb/ft$^3$ and 115 lb/lb/ft$^3$. In some embodiments the invention provides a structure containing an aggregate containing 90-99.9% carbonate, 0.1 to 10% sulfate and/or sulfite, in some embodiments the aggregate further contains 0.00000001 to 0.000001% mercury or mercury-containing compound; exemplary structures include a building, a roadway, or a dam. In some embodiments the structure is a roadway.

In another aspect the invention provides methods. In some embodiments the invention provides method of sequestering $CO_2$ comprising (i) precipitating a CO2-sequestering carbonate compound composition from a divalent cation-containing water to form a precipitate; and (ii) producing aggregate containing the CO2-sequestering carbonate compound composition; in some embodiments the method further includes contacting the divalent cation-containing water with $CO_2$ from an industrial waste gas stream, such as flue gas from a power plant or a cement plant, e.g., flue gas from a coal-fired power plant; in some embodiments the method comprises contacting the divalent cation-containing water with $CO_2$ from the combustion of a fossil fuel. In some embodiments the producing of the aggregate comprises subjecting the precipitate to elevated temperature, elevated pressure, or a combination thereof, such as elevated temperature, elevated pressure, or combination thereof produced by an extruder. In some embodiments the divalent cations of the divalent cation-containing water come at least partially from a saltwater, such as seawater or brine, e.g., seawater. In some embodiments the producing of the aggregate includes producing aggregate of a predetermined size and shape.

In some embodiments the invention provides a method of manufacturing aggregate by a process that includes precipitating a carbonate compound from a divalent cation-containing water and processing the precipitate to produce an aggregate; in some embodiments the method further includes contacting the divalent cation-containing water with $CO_2$ from an industrial waste gas stream, such as flue gas from a power plant or a cement plant, e.g. flue gas from a coal-fired power plant. In some embodiments the method includes contacting the divalent cation-containing water with $CO_2$ from the combustion of a fossil fuel such as natural gas or coal, e.g., coal. In some embodiments the processing of the precipitate includes treating the precipitate with elevated temperature, elevated pressure, or a combination thereof. In some embodiments the processing of the precipitate comprises combining the precipitate with a cementitious material and water, allowing the combination to set to provide a solidified material, and may further include breaking up the solidified material.

In some embodiments the invention provides a system for producing an aggregate that includes (i) an input for a divalent cation-containing water; (ii) a carbonate compound precipitation station that subjects the water to carbonate compound precipitation conditions and produces a precipitated carbonate compound composition; and (iii) an aggregate producer for producing aggregate from the precipitated carbonate compound composition.

BRIEF DESCRIPTION OF THE DRAWINGS

FIG. 3 illustrates exemplary aggregate structures and aggregate mixtures according to aspects of the present invention 3A: cylinders; 3B: triangular prism; 3C: mixture of spheres and bridges; 3D: gap-graded spheres; 3E: mixture of prisms; 3F-3H: hollow aggregate with tubular void space; 3I-3L: aggregate mixtures with different combinations of aggregates.

FIG. 8 provides scanning electron microscope (SEM) images for precipitation material produced in Example 1.

FIG. 12 provides SEM images for the aggregate produced in Example 2.

FIG. 22 provides SEM images for the precipitation material produced in Example 6.

FIG. 26 provides SEM images for the aggregate of Example 6.

DETAILED DESCRIPTION OF THE INVENTION

Figure 1:
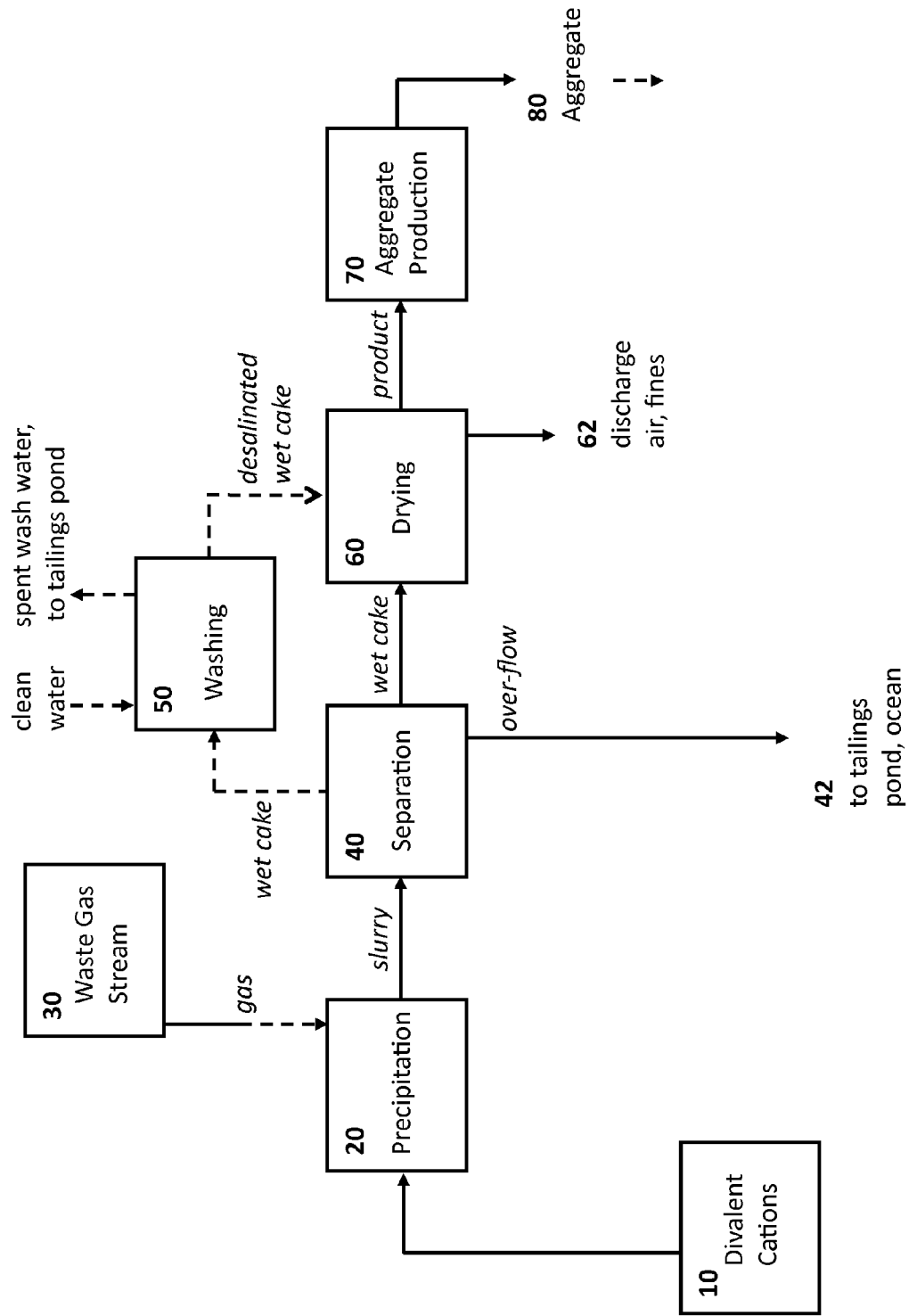
FIG. 1 provides a flow diagram of a precipitation process according to an embodiment of the invention.

I. Introduction
II. Compositions
A. Synthetic Rock and Aggregates
1. Aggregate and rock compositions
2. Making compositions of the invention
B. Settable Compositions
C. Structures
1. Roadways
III. Methods
A. Method of manufacturing aggregate
B. Other methods
IV. Systems
V. Utility I. Introduction The invention provides compositions comprising synthetic rock, aggregates, and other materials, as well as structures, and other materials found in the manmade environment and methods of making and using synthetic rocks, aggregates, structures, and other manmade materials; in addition the invention provides systems and methods of doing business.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Unless otherwise indicated or apparent from context, percentages given herein are w/w. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

II. Compositions

A. Synthetic Rock and Aggregates

In some embodiments the invention provides a synthetic rock that is made without chemical binders. In some embodiments, the invention provides aggregates, e.g., aggregate that contains $CO_2$ sequestered from a gaseous industrial waste stream, and/or aggregates of a certain composition, such as aggregates containing carbonate and/or bicarbonate minerals, aggregates of a certain isotopic composition (often indicative of a fossil fuel origin), aggregates of a certain chemical composition, aggregates containing novel minerals, aggregates with certain fracture characteristics, lightweight aggregates, and customized aggregate sets. The invention further provides settable compositions, and structures, such as roadways, buildings, dams, and other manmade structures, containing the synthetic rock or aggregates of the invention.

The term aggregate is used herein in its art-accepted manner to include a particulate composition that finds use in concretes, mortars and other materials, e.g., roadbeds, asphalts, and other structures and is suitable for use in such structures. Aggregates of the invention are particulate compositions that may in some embodiments be classified as fine or coarse. Fine aggregates according to embodiments of the invention are particulate compositions that almost entirely pass through a Number 4 sieve (ASTM C 125 and ASTM C 33). Fine aggregate compositions according to embodiments of the invention have an average particle size ranging from 0.001 inch (in) to 0.25 in, such as 0.05 in to 0.125 in and including 0.01 in to 0.08 in. Coarse aggregates of the invention are compositions that are predominantly retained on a Number 4 sieve (ASTM C 125 and ASTM C 33). Coarse aggregate compositions according to embodiments of the invention are compositions that have an average particle size ranging from 0.125 in to 6 in, such as 0.187 in to 3.0 in and including 0.25 in to 1.0 in. As used herein, "aggregate" may also in some embodiments encompass larger sizes, such as 3 in to 12 in or even 3 in to 24 in, or larger, such as 12 in to 48 in, or larger than 48 in, e.g., such as sizes used in riprap and the like. In some embodiments, such as producing wave-resistant structures for the ocean, the sizes may be even larger, such as over 48 in, e.g., over 60 in, or over 72 in.

1. Aggregate and Rock Compositions

Compositions of the invention may be made by synthetic methods, described herein, that allow for great control over the properties of the compositions. Significant properties of the compositions may include one or more of hardness, abrasion resistance, density, porosity, chemical composition, mineral composition, isotopic composition, size, shape, acid resistance, alkaline resistance, leachable chloride content, retention of $CO_2$, reactivity (or lack thereof), as will be described more fully herein. In some embodiments one or more of these properties, such as two or more, three or more, or even four or more or five or more, may be specifically engineered into a composition of the invention, e.g., an aggregate.

Aggregates of the invention have a density that may vary so long as the aggregate provides the desired properties for the use for which it will be employed, e.g., for the building material in which it is employed. In certain instances, the density of the aggregate particles ranges from 1.1 to 5 gm/cc, such as 1.3 gm/cc to 3.15 gm/cc, and including 1.8 gm/cc to 2.7 gm/cc. Other particle densities in embodiments of the invention, e.g., for lightweight aggregates, may range from 1.1 to 2.2 gm/cc, e.g, 1.2 to 2.0 g/cc or 1.4 to 1.8 g/cc. In some embodiments the invention provides aggregates that range in bulk density (unit weight) from 50 $lb/ft^3$ to 200 $lb/ft^3$, or 75 $lb/ft^3$ to 175 $lb/ft^3$, or 50 $lb/ft^3$ to 100 $lb/ft^3$, or 75 $lb/ft^3$ to 125 $lb/ft^3$, or 90 $lb/ft^3$ to 115 $lb/ft^3$, or 100 $lb/ft^3$ to 200 $lb/ft^3$, or 125 $lb/ft^3$ to 175 $lb/ft^3$, or 140 $lb/ft^3$ to 160 $lb/ft^3$, or 50 $lb/ft^3$ to 200 $lb/ft^3$. Some embodiments of the invention provide lightweight aggregate, e.g., aggregate that has a bulk density (unit weight) of 75 $lb/ft^3$ to 125 $lb/ft^3$. Some embodiments of the invention provide lightweight aggregate, e.g., aggregate that has a bulk density (unit weight) of 90 $lb/ft^3$ to 115 $lb/ft^3$.

The hardness of the aggregate particles making up the aggregate compositions of the invention may also vary, and in certain instances the hardness, expressed on the Mohs scale, ranges from 1.0 to 9, such as 1 to 7, including 1 to 6 or 1 to 5. In some embodiments, the Mohr's hardness of aggregates of the invention ranges from 2-5, or 2-4. In some embodiments, the Mohs hardness ranges from 2-6. Other hardness scales may also be used to characterize the aggregate, such as the Rockwell, Vickers, or Brinell scales, and equivalent values to those of the Mohs scale may be used to characterize the aggregates of the invention; e.g., a Vickers hardness rating of 250 corresponds to a Mohs rating of 3; conversions between the scales are known in the art.

The abrasion resistance of an aggregate may also be important, e.g., for use in a roadway surface, where aggregates of high abrasion resistance are useful to keep surfaces from polishing. Abrasion resistance is related to hardness but is not the same. Aggregates of the invention include aggregates that have an abrasion resistance similar to that of natural limestone, or aggregates that have an abrasion resistance superior to natural limestone, as well as aggregates having an abrasion resistance lower than natural limestone, as measured by art accepted methods, such as ASTM C131-03. In some embodiments aggregates of the invention have an abrasion resistance of less than 50%, or less than 40%, or less than 35%, or less than 30%, or less than 25%, or less than 20%, or less than 15%, or less than 10%, when measured by ASTM C131-03.

Aggregates of the invention may also have a porosity within a particular ranges. As will be appreciated by those of skill in the art, in some cases a highly porous aggregate is desired, in others an aggregate of moderate porosity is desired, while in other cases aggregates of low porosity, or no porosity, are desired. Porosities of aggregates of some embodiments of the invention, as measured by water uptake after oven drying followed by full immersion for 60 minutes, expressed as % dry weight, can be in the range of 1-40%, such as 2-20%, or 2-15%, including 2-10% or even 3-9%.

The chemical, mineral, and/or isotopic composition of aggregates of the invention varies depending on methods of manufacturing, raw materials, and the like. In some embodiments, some or all of the carbonate compounds are metastable carbonate compounds that are precipitated from a water, such as a salt-water, as described in greater detail below; in some embodiments these metastable compounds are further processed to provide stable compounds in the aggregates of the invention.

The carbonate compounds in embodiments of the invention include precipitated crystalline and/or amorphous carbonate compounds and in some embodiments bicarbonate compounds. Specific carbonate minerals of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3.6H_2O$), and amorphous calcium carbonate ($CaCO_3.6H_2O$). Magnesium carbonate minerals of interest include, but are not limited to: dypingite ($Mg_5(CO_3)_4(OH)_2.5(H_2O)$; the term dypingite is used herein to include dypingite minerals of this formula), magnesite ($MgCO_3$), barringtonite ($MgCO_3.2H_2O$), nesquehonite ($MgCO_3.3H_2O$), lanfordite ($MgCO_3.5H_2O$) and amorphous magnesium carbonate ($MgCO_3.nH_2O$). Calcium magnesium carbonate minerals of interest include, but are not limited to dolomite ($CaMgCO_3$), huntite ($CaMg(CO_3)_4$) and sergeevite ($Ca_2Mg_{11}(CO_3)_{13}.H_2O$). In certain embodiments, non-carbonate compounds like brucite $Mg(OH)_2$ may also form in combination with the minerals listed above. As indicated above, the compounds of the carbonate compounds may be metastable carbonate compounds (and may include one or more metastable hydroxide compounds) that are more stable in saltwater than in freshwater, such that upon contact with fresh water, they dissolve and re-precipitate into other fresh water stable compounds, e.g., minerals such as low-Mg calcite.

In some embodiments, aggregates of the invention are formed, in whole or in part, from metastable compounds as described herein that have been exposed to freshwater and allowed to harden into stable compounds, which may then be further processed, if necessary, to form particles as appropriate to the type of aggregate desired. In some embodiments, aggregates of the invention are formed from metastable compounds exposed to conditions of temperature and/or pressure that convert them into stable compounds.

In some embodiments, silica minerals may co-occur with the carbonate compounds, forming carbonate silicate compounds. These compounds may be amorphous in nature or crystalline. In certain embodiments, the silica may be in the form of opal-A, amorphous silica, typically found in chert rocks. Calcium magnesium carbonate silicate amorphous compounds may form, within crystalline regions of the carbonate minerals listed above. Non-carbonate, silicate minerals may also form. Sepiolite is a clay mineral, a complex magnesium silicate, a typical formula for which is $Mg_4SiO_{15}(OH)_2._6H2O$. It can be present in fibrous, fine-particulate, and solid forms. Silcate carbonate minerals may also form. Carletonite, $KNa_4Ca_4(CO_3)_4Si_8O_{18}$ (F, OH)—$H_2O$, Hydrated potassium sodium calcium carbonate silicate, can form under these conditions. Like any member of the phyllosilicates subclass, carletonite's structure is layered with alternating silicate sheets and the potassium, sodium and calcium layers Unlike other phyllosilicates, carletonite's silicate sheets are composed of interconnected four and eight-member rings. The sheets can be thought of as being like chicken wire with alternating octagon and square shaped holes. Both octagons and squares have a four fold symmetry and this is what gives carletonite its tetragonal symmetry; 4/m 2/m 2/m. Only carletonite and other members of the apophyllite group have this unique interconnected four and eight-member ring structure.

The carbonate and/or bicarbonate compounds of aggregates of the invention generally are derived from, e.g., precipitated from, an aqueous solution of divalent cations (as described in greater detail below). As the carbonate and/or bicarbonate compound compositions of the aggregates are precipitated from the aqueous solution of divalent cations, they will include one or more components that are present in the solution from which they are derived. For example, where the aqueous solution of divalent cations is salt water, the carbonate and/or bicarbonate compounds and aggregates that include the same can include one or more compounds found in the aqueous cation solution source. These compounds can be correlated to components that originate at the aqueous cation solution source, where these identifying components and the amounts thereof are collectively referred to herein as a cation solution source identifier. For example, if the cation solution source is sea water, identifying compounds that may be present in the precipitated mineral compositions include, but are not limited to: chloride, sodium, sulfur, potassium, bromide, silicon, strontium and the like. Any such, source-identifying or "marker" elements are generally present in small amounts, e.g., in amounts of 20,000 parts per million (ppm) or less, such as amounts of 2000 ppm or less. In certain embodiments, the "marker" compound is strontium, which may be present in the precipitated composition comprising carbonates and/or bicarbonates. Strontium may be incorporated into the aragonite (calcium carbonate) lattice, and contribute 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound is magnesium, which may be present in amounts of up to 20% mole substitution for calcium in carbonate compounds. The aqueous cation solution source identifier of the compositions may vary depending on the particular aqueous cation solution source employed to produce the saltwater-derived precipitate composition comprising carbonates and/or bicarbonates. In certain embodiments, the calcium carbonate content of the aggregate is 5%, 10%, 15%, 20% or 25% w/w or higher, such as 30% w/w or higher, and including 40% w/w or higher, e.g., 50% w/w or even 60% w/w or higher, 70% w/w or higher, 80% w/w or higher, 90% w/w or higher, or 95% w/w or higher. In certain embodiments, the magnesium carbonate content of the aggregate is 5%, 10%, 15%, 20% or 25% w/w or higher, such as 30% w/w or higher, and including 40% w/w or higher, e.g., 50% w/w or even 60% w/w or higher, 70% w/w or higher, 80% w/w or higher, 90% w/w or higher, or 95% w/w or higher.

The aggregate has, in certain embodiments, a calcium/magnesium ratio that is influenced by, and therefore reflects, the water source from which it has been precipitated, e.g., seawater, which contains more magnesium than calcium, or, e.g., certain brines, which often contain one-hundred-fold the calcium content as seawater; the calcium/magnesium ratio also reflects factors such as the addition of calcium and/or magnesium-containing substances during the production process, e.g., the use of flyash, red mud, slag, or other calcium and/or magnesium-containing industrial wastes, or the use of calcium and/or magnesium-containing minerals such as mafic and ultramafic minerals, such as serpentine, olivine, and the like, as further described herein, or wollastonite. Because of the large variation in raw materials as well as materials added during production, the calcium/magnesium molar ratio may vary widely in various embodiments of the compositions and methods of the invention, and indeed in certain embodiment the ratio may be adjusted according to the intended use of the aggregate. Thus, in certain embodiments, the calcium/magnesium molar ratio in the aggregate ranges from 200/1 Ca/Mg to 1/200 Ca/Mg. In some embodiments, the calcium magnesium molar ratio ranges from 150/1 Ca/Mg to 1/100 Ca/Mg. In some embodiments, the calcium magnesium molar ratio ranges from 150/1 Ca/Mg to 1/50 Ca/Mg. In some embodiments, the calcium magnesium molar ratio ranges from 150/1 Ca/Mg to 1/10 Ca/Mg. In some embodiments, the calcium magnesium molar ratio ranges from 150/1 Ca/Mg to 1/5 Ca/Mg. In some embodiments, the calcium magnesium molar ratio ranges from 150/1 Ca/Mg to 1/1 Ca/Mg. In some embodiments, the calcium magnesium molar ratio ranges from 150/1 Ca/Mg to 5/1 Ca/Mg. In some embodiments, the calcium magnesium molar ratio ranges from 150/1 Ca/Mg to 10/1 Ca/Mg. In some embodiments, the calcium magnesium molar ratio ranges from 100/1 Ca/Mg to 10/1 Ca/Mg. In some embodiments, the calcium magnesium molar ratio ranges from 1/1 Ca/Mg to 1/100 Ca/Mg. In some embodiments, the calcium magnesium molar ratio ranges from 1/1 Ca/Mg to 1/50 Ca/Mg. In some embodiments, the calcium magnesium molar ratio ranges from 1/1 Ca/Mg to 1/25 Ca/Mg. In some embodiments, the calcium magnesium molar ratio ranges from 1/1 Ca/Mg to 1/10 Ca/Mg. In some embodiments, the calcium magnesium molar ratio ranges from 1/1 Ca/Mg to 1/8 Ca/Mg. In some embodiments, the calcium magnesium molar ratio ranges from 1/1 Ca/Mg to 1/5 Ca/Mg. In some embodiments, the calcium magnesium molar ratio ranges from 10/1 Ca/Mg to 1/10 Ca/Mg. In some embodiments, the calcium magnesium molar ratio ranges from 8/1 Ca/Mg to 1/8 Ca/Mg. In some embodiments, the calcium magnesium molar ratio ranges from 6/1 Ca/Mg to 1/6 Ca/Mg. In some embodiments, the calcium magnesium molar ratio ranges from 4/1 Ca/Mg to 1/4 Ca/Mg. In some embodiments, the calcium magnesium molar ratio ranges from 2/1 Ca/Mg to 1/2 Ca/Mg. In some embodiments, the calcium/magnesium molar ratio is 20/1 or greater, such as 50/1 or greater, for example 100/1 or greater, or even 150/1 or greater. In some embodiments, the calcium/magnesium molar ratio is 1/10 or less, such as 1/25 or less, for example 1/50 or less, or even 1/100 or less. In some embodiments, Ca/Mg ratio ranges are 2/1 to 1/2, 3/2 to 2/3, or 5/4 to 4/5. In some embodiments, Ca/Mg ratio ranges are 1/7 to 200/1, 1/15 to 12/10, 1/10 to 5/1, 1/7 to 1/2, or 1/9 to 2/5. In some embodiments, Ca/Mg ratio ranges are 1/200 to 1/7, 1/70 to 1/7, or 1/65 to 1/40. In some embodiments, Ca/Mg ranges are 1/10 to 50/1, 1/5 to 45/1, 1/6 to 6/1, 6/5 to 45/1, 1/4 to 11/3, or 13/2 to 19/2. In some embodiments, Ca/Mg ranges are 1/3 to 3/1 or 1/2 to 2/1. In some embodiments, Ca/Mg ranges are 2/1 to all calcium, 3/1 to 200/1, 5/1 to 200/1, or 10/1 to 200/1.

In some embodiments, aggregates are provided where the compositions contain carbonates and bicarbonates, e.g., of divalent cations such as calcium or magnesium; in some cases the aggregate contains substantially all carbonates, or substantially all bicarbonates, or some ratio of carbonate to bicarbonate. The molar ratio of carbonates to bicarbonates may be any suitable ratio, such as 100/1 to 1/100, or 50/1 to 1/50, or 25/1 to 1/25, or 10/1 to 1/10, or 2/1 to 1/2, or about 1/1, or substantially all carbonate or substantially all bicarbonate. In some embodiments the invention provides aggregate that contains carbonates and/or bicarbonates of calcium or magnesium or combinations thereof. In some embodiments the invention provides aggregate that contains only carbonates of calcium or magnesium or combinations thereof without containing bicarbonate, or containing only trace amounts of bicarbonate. Other embodiments provide aggregate that is comprised solely of bicarbonates of calcium or magnesium or combinations thereof.

In certain embodiments, aggregate is characterized by having a carbonate to hydroxide compound ratio, where in certain embodiments this ratio ranges from 100 to 1, such as 10 to 1 and including 1 to 1.

Where silica is present, the ratio of calcium/magnesium to silica may range from 100:1 to 1:1, such as from 50:1 to 10:1.

In addition, aggregates of the invention may further include or exclude substances such as chloride. These substances are considered undesirable in some applications; for example, chloride is undesirable in aggregates intended for use in concrete because of its tendency to corrode rebar. However, in some uses, such as base course for a roadway, aggregate containing chloride may be acceptable. Methods of making aggregates of the invention may include one or more steps to minimize the chloride and/or sodium content of the aggregate, if chloride is a component of the starting materials; in some embodiments, such a step or steps is not necessary as the intended final use of the aggregate is relatively insensitive to the content of these materials. Thus, in some embodiments, the leachable chloride content of the aggregates of the invention is less than 5%. In some embodiments, the leachable chloride content of the aggregate ranges from 0.0001% to 0.05%. In some embodiments the leachable chloride content is less than 0.05%, in some embodiments the leachable chloride content is less than 0.1%, and in some embodiments the leachable chloride content is less than 0.5%.

In some embodiments the aggregates of the invention are formed from $CO_2$ and, in some cases, other elements or compounds, having a specific isotopic composition, e.g., an isotopic composition consistent with an origin in a fossil fuel, as described further herein.

The aggregate of the invention may be of any size and shape suitable for a particular use, as described further herein. As the aggregates are synthetic, both the size and the shape may be almost completely controlled, allowing for a great variety of specific aggregates as well as aggregate mixes, as described further. In some embodiments, the invention provides coarse aggregate, e.g., compositions that are predominantly retained on a Number 4 sieve (ASTM C 125 and ASTM C 33). Coarse aggregate compositions according to embodiments of the invention are compositions that have an average particle size ranging from 0.125 in to 6 in, such as 0.187 in to 3.0 in and including 0.25 in to 1.0 in. Fine aggregate compositions according to embodiments of the invention have an average particle size ranging from 0.001 inch (in) to 0.25 in, such as 0.05 in to 0.125 in and including 0.01 in to 0.08 in.

Aggregates of the invention may be reactive or non-reactive. Reactive aggregate are those aggregate particles that upon initiation by a substance (e.g., water) undergo a reaction with constituents (e.g., compounds) in other aggregate particles to form a reaction product. In some instances, the reaction product may be a matrix between aggregate particles forming a stabilizing structure. In other instances the matrix formed may be an expansive gel that, depending on the environment, may act to destabilize the mass; in some cases where there is room for the expansive gel to expand, e.g., in aggregate that is laid as part of a road bed, with void spaces, a reactive aggregate of this type is acceptable. Aggregate of the invention may also be non-reactive.

In addition, in some instances the invention provides aggregates that are resistant to acid, resistant to base, or resistant to both acid and base. For example, in some instances the invention provides aggregates that, when exposed to a pH of 2, 3, 4, or 5, depending on the test desired (e.g., an $H_2SO_4$ solution that has been diluted to a pH of 2, 3, 4, or 5), release less than 1, 0.1, 0.01, or 0.001% of the $CO_2$ contained in the aggregate in a 48 hour period, or a 1-week period, or a 5-week period, or a 25-week period, while remaining intact and retaining a portion or substantially all of its hardness, abrasion resistance, and the like Similar results may be obtained for aggregates of the invention that are resistant to base, e.g., when exposed to a pH of 12, 11, 10, or 9, release less than 1, 0.1, 0.01, or 0.001% of their $CO_2$ in a 48 hour, 1 week, 5 week, or 25 week period, while remaining intact and retaining a portion or substantially all of its hardness, abrasion resistance, and the like. $CO_2$ content of the material may be monitored by, e.g., coulometry, or any other suitable method.

In some embodiments the invention provides aggregates that are stable to $CO_2$ release as described further below.

In some embodiments, the aggregates of the invention are aggregates that sequester one or more components of a human-produced waste stream, typically an industrial waste stream that includes, though is not limited to, gaseous components. Generally the one or more components sequestered by the aggregates are components for which release to the atmosphere or to the environment in general is undesirable. For example, for a flue gas waste stream, undesirable components include $CO_2$, CO, sulfur oxides (SOx, such as $SO_2$ and $SO_3$), nitrogen oxides (NOx, such as NO and $NO_2$), heavy metals such as mercury, cadmium, lead, and/or others well-known in the art, particulates, radioactive substances, organic compounds, and other undesirable components, e.g., any component regulated by governmental or other regulatory agencies.

In particular embodiments, the invention includes $CO_2$ sequestering aggregates. The term "$CO_2$ sequestering aggregate" as used herein includes that the aggregate contains carbon derived from a fuel used by humans, e.g., carbon having a fossil fuel origin. For example, $CO_2$ sequestering aggregate according to embodiments of the present invention contain carbon that was released in the form of $CO_2$ from the combustion of fuel. In certain embodiments, the carbon sequestered in a $CO_2$ sequestering aggregate contains carbonate compounds. Therefore, $CO_2$ sequestering aggregate according to embodiments of the subject invention contain carbonate compounds where at least part of the carbon in the carbonate compounds is derived from a fuel used by humans, e.g., a fossil fuel. As such, production of aggregate of the invention results in the placement of $CO_2$ into a storage stable form, e.g., a component that can be used in a variety of ways in the built environment, i.e., a man-made structure, such as a building, wall, road, etc., or even transported to a source of fossil fuel, e.g., a coal mine, and stored there. As such, production of the $CO_2$ sequestering aggregate of the invention results in the prevention of $CO_2$ gas from entering the atmosphere.

$CO_2$-sequestering aggregate of the invention provides for long term storage of $CO_2$ in a manner such that $CO_2$ is sequestered (i.e., fixed) in the aggregate, where the sequestered $CO_2$ does not become part of the atmosphere. "Long term storage" includes that the aggregate of the invention keeps its sequestered $CO_2$ fixed for extended periods of time (when the aggregate is maintained under conditions conventional for its intended use) without significant, if any, release of the $CO_2$ from the aggregate. Extended periods of time in the context of the invention may be 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer, depending on the particular nature and downstream use of the aggregate. With respect to the $CO_2$ sequestering aggregate, when employed for their intended use and over their lifetime, the amount of degradation, if any, as measured in terms of $CO_2$ gas release from the product will not exceed 10% per year, for example, will not exceed 5%/year, and in certain embodiments will not exceed 1%/year or even will not exceed 0.5% per year or even 0.1% per year.

Tests of the aggregate can be used as surrogate markers for the long-term storage capability of the aggregate. Any art-accepted test may be used, or any test that reasonably would be thought to predict long-term storage of $CO_2$ in a material under its intended conditions of use may be used, e.g., any test that reasonably would be thought to predict that the composition keeps a significant fraction, or substantially all, of its $CO_2$ fixed for a certain amount of time. For example, aggregate may considered long term storage aggregate for sequestered $CO_2$ if, when exposed to 50, 75, 90, 100, 120, or 150° C. for 1, 2, 5, 25, 50, 100, 200, or 500 days at between 10% and 50% relative humidity, it loses less than 1%, 2%, 3%, 4%, 5%, 10%, 20%, 30%, or 50% of its carbon. Test conditions are chosen according to the intended use and environment of the material. $CO_2$ content of the material may be monitored by any suitable method, e.g., coulometry.

To verify that a material is a $CO_2$-sequestering material, e.g., a material containing carbon dioxide originating in the combustion of fossil fuel, tests such as isotope measurements (e.g., measurement of $\delta^{13}C$ values) and carbon coulometry may be used; any other suitable measurement may also be used to verify, e.g., that the composition contains carbonates and/or that carbonates are present at a given percentage of the composition.

Thus, in some embodiments the invention provides a composition comprising a $CO_2$-sequestering aggregate. The aggregate may be precipitated from a divalent cation-containing water, e.g., an alkaline-earth-metal-ion containing water, such as salt water, e.g. sea water or geologic brine, or a water derived from sea water or geologic brine. The divalent cation-containing water may contain $CO_2$ derived from an industrial process, e.g. from an industrial waste gas stream which is then converted into a carbonate that is contained in the aggregate. Thus in some embodiments the aggregates have a $\delta^{13}C$ value reflective of a fossil fuel origin, as described below. The $CO_2$-sequestering aggregate may contain a calcium carbonate, magnesium carbonate, calcium magnesium carbonate, or any combination thereof. In some embodiments the aggregate contains at least about 10, 20, 30, 40, 50, 60, 70, 80, or 90% carbonate. In some embodiments the aggregate contains at least about 50% carbonate. The molar Ca/Mg ratio in some embodiments can be 1/10 to 1/3, or 1/3 to 3/1, or 10/1 to 100/1, or about 1/1. The $CO_2$-sequestering aggregate may contain any of the mineral forms listed herein, e.g., calcite, nesquehonite, aragonite, dypingite, in the percentages given. Such aggregates may have further properties as described herein, e.g., size, shape, density, reactivity, and the like. For example, in some embodiments, such aggregates may have a hardness of at least 2, or at least 3 on the Mohs hardness scale or equivalent. In some embodiments such aggregates may have a bulk density of 50 lb/ft³ to 200 lb/ft³, or 75 lb/ft³ to 175 lb/ft³, or 50 lb/ft³ to 100 lb/ft³, or 75 lb/ft³ to 125 lb/ft³, or 90 lb/ft³ to 115 lb/ft³, or 100 lb/ft³ to 200 lb/ft³, or 125 lb/ft³ to 175 lb/ft³, or 140 lb/ft³ to 160 lb/ft³, or 50 lb/ft³ to 200 lb/ft³. In some embodiments such aggregates are aggregate that has a bulk density (unit weight) of 75 lb/ft³ to 125 lb/ft³. In some embodiments such aggregates are aggregate that has a bulk density (unit weight) of 90 lb/ft³ to 115 lb/ft³. In some embodiments such aggregates are coarse aggregates. In some embodiments such aggregates are fine aggregates. Such aggregates may also have Ca/Mg ratios, crystal structures and polymorphs, porosity, reactivity or lack thereof, stability to $CO_2$ release, and/or other characteristics as described further herein.

In certain embodiments aggregates of the invention will contain carbon from fossil fuel; because of its fossil fuel origin, the carbon isotopic fractionation ($\delta^{13}C$) value of such aggregate will be different from that of, e.g., limestone. As is known in the art, the plants from which fossil fuels are derived preferentially utilize $^{12}C$ over $^{13}C$, thus fractionating the carbon isotopes so that the value of their ratio differs from that in the atmosphere in general; this value, when compared to a standard value (PeeDee Belemnite, or PDB, standard), is termed the carbon isotopic fractionation ($\delta^{13}C$) value. $\delta^{13}C$ values for coal are generally in the range −30 to −20‰ and $\delta^{13}C$ values for methane may be as low as −20‰ to −40‰ or even −40‰ to −80‰. $\delta^{13}C$ values for atmospheric $CO_2$ are −10‰ to −7‰, for limestone aggregate +3‰ to −3‰, and for marine bicarbonate, 0‰. Even if the aggregate contains some natural limestone, or other source of C with a less negative $\delta^{13}C$ value than fossil fuel, its $\delta^{13}C$ value generally will still be negative and more negative (less than) limestone or atmospheric $CO_2$. Aggregates of the invention thus include aggregates with a $\delta^{13}C$ more negative than (less than) −10‰, such as more negative than (less than) −12‰, −14‰, −16‰, −18‰, −20‰, −22‰, −24‰, −26‰, −28‰, or more negative than (less than) −30‰. In some embodiments the invention provides an aggregate with a $\delta^{13}C$ more negative than (less than) −10‰. In some embodiments the invention provides an aggregate with a $\delta^{13}C$ more negative than (less than) −14‰. In some embodiments the invention provides an aggregate with a $\delta^{13}C$ more negative than (less than) −18‰. In some embodiments the invention provides an aggregate with a $\delta^{13}C$ more negative than (less than) −20‰. In some embodiments the invention provides an aggregate with a $\delta^{13}C$ more negative than (less than) −24‰. In some embodiments the invention provides an aggregate with a $\delta^{13}C$ more negative than (less than) −28‰. In some embodiments the invention provides an aggregate with a $\delta^{13}C$ more negative than (less than) −30‰. In some embodiments the invention provides an aggregate with a $\delta^{13}C$ more negative than (less than) −32‰. In some embodiments the invention provides an aggregate with a $\delta^{13}C$ more negative than (less than) −34‰. Such aggregates may be carbonate-containing aggregates, as described above, e.g., aggregate with that contains at least 10, 20, 30, 40, 50, 60, 70, 80, or 90% carbonate, e.g., at least 50% carbonate w/w. Such aggregates may have further properties as described herein, e.g., size, shape, density, reactivity, and the like. For example, in some embodiments, such aggregates may have a hardness of at least 2, or at least 3 on the Mohs hardness scale or equivalent. In some embodiments such aggregates may have a bulk density of 50 lb/ft³ to 200 lb/ft³, or 75 lb/ft³ to 175 lb/ft³, or 50 lb/ft³ to 100 lb/ft³, or 75 lb/ft³ to 125 lb/ft³, or 90 lb/ft³ to 115 lb/ft³, or 100 lb/ft³ to 200 lb/ft³, or 125 lb/ft³ to 175 lb/ft³, or 140 lb/ft³ to 160 lb/ft³, or 50 lb/ft³ to 200 lb/ft³. In some embodiments such aggregates are aggregate that has a bulk density (unit weight) of 75 lb/ft³ to 125 lb/ft³. In some embodiments such aggregates are aggregate that has a bulk density (unit weight) of 90 lb/ft³ to 115 lb/ft³. In some embodiments such aggregates are coarse aggregates. In some embodiments such aggregates are fine aggregates. Such aggregates may also have Ca/Mg ratios, crystal structures and polymorphs, porosity, reactivity or lack thereof, stability to CO2 release, and/or other characteristics as described further herein.

In some embodiments the aggregate of the invention is carbon-negative aggregate, and the methods of production of the aggregate are carbon-negative methods. The term "carbon negative," as it is used herein, includes the meaning that the amount by weight of $CO_2$ that is sequestered (e.g., through conversion of $CO_2$ to carbonate) by practice of the methods or in a composition made by a method is greater that the amount of $CO_2$ that is generated (e.g., through power production, production or mining of reactants such as base, transportation, and other parts of the manufacture of the product that produce $CO_2$) to practice the methods or produce the product in final form ready for use, which may be expressed as a percentage as shown in the following equation:

$$((\text{Amount } CO_2 \text{ captured-amount } CO_2 \text{ expended in capture})/\text{Amount } CO_2 \text{ captured}) \times 100 = \% \text{ carbon negative.}$$

Thus, a product which captures carbon dioxide while expending no carbon dioxide in the capture process is 100% carbon negative. In some instances, the products or processes of the invention are 1 to 100% carbon negative, such as 5 to 100%, including 10 to 95%, 10 to 90%, 10 to 80%, 10 to 70%, 10 to 60%, 10 to 50%, 10 to 40%, 10 to 30%, 10 to 20%, 20 to 95%, 20 to 90%, 20 to 80%, 20 to 70%, 20 to 60%, 20 to 50%, 20 to 40%, 20 to 30%, 30 to 95%, 30 to 90%, 30 to 80%, 30 to 70%, 30 to 60%, 30 to 50%, 30 to 40%, 40 to 95%, 40 to 90%, 40 to 80%, 40 to 70%, 40 to 60%, 40 to 50%, 50 to 95%, 50 to 90%, 50 to 80%, 50 to 70%, 50 to 60%, 60 to 95%, 60 to 90%, 60 to 80%, 60 to 70%, 70 to 95%, 70 to 90%, 70 to 80%, 80 to 95%, 80 to 90%, and 90 to 95% carbon negative. In some instances, the products or processes of the invention are at least 5% carbon negative, or at least 10% carbon negative, or at least 20% carbon negative, or at least 30% carbon negative, or at least 40% carbon negative, or at least 50% carbon negative, or at least 60% carbon negative, or at least 70% carbon negative, or at least 80% carbon negative, or at least 90% carbon negative. Carbon negative methods in general are described in more detail in U.S. patent application Ser. No. 12/344,019, which is incorporated by reference herein in its entirety.

Aggregates of the invention may, in some embodiments, include further sequestered components found, e.g., in industrial waste gases, as described above. Accordingly, in some embodiments, in addition to containing carbonates, e.g., from sequestered $CO_2$, aggregates of the invention may include one or more substances that are, and/or are derived from, the following compounds or elements: CO, sulfur oxides (SOx, such as SO2 and SO3), nitrogen oxides (NOx, such as NO and NO2), heavy metals such as mercury, cadmium, lead, and/or others well-known in the art, particulates, radioactive substances, and organic compounds. Thus the invention includes aggregates that, in addition to a $CO_2$-sequestering component such as a carbonate, contain a SOx-derived component, such as a sulfate or a sulfite, e.g., a calcium or magnesium sulfate or sulfite, or a combination of calcium and magnesium sulfate or sulfites. In some embodiments, the invention provides aggregates containing carbonate compounds, e.g., derived from $CO_2$, and sulfate and/or sulfite compounds, e.g., derived from SOx, where the molar ratio of carbonates to sulfates/sulfites (in combination, if both are present) is between 200:1 to 10:1, such as between 150:1 to 20:1, or 120:1 to 80:1. In some embodiments, the invention provides aggregates containing carbonate compounds, e.g., derived from $CO_2$, and sulfate and/or sulfite compounds, e.g., derived from SOx, where the carbonates make up 20%-99% of the aggregate and the sulfate/sulfite compounds make up 0.01-5% of the aggregate, e.g., where the carbonates make up 50%-99% of the aggregate and the sulfate/sulfite compounds make up 0.1-3% of the aggregate, such as where the carbonates make up 85%-99% of the aggregate and the sulfate/sulfite compounds make up 0.2-2% of the aggregate. In some embodiments, the invention provides aggregates containing carbonate compounds and sulfate and/or sulfite compounds where the molar ratio of carbonates to sulfates/sulfites (in combination, if both are present) is between 200:1 to 10:1, such as between 150:1 to 20:1, or 120:1 to 80:1. In some embodiments, the invention includes aggregates that include, in addition to carbonate compounds, e.g., derived from, and, optionally, a sulfate or sulfite, e.g., derived from SOx, further includes a heavy metal, e.g., mercury, or a heavy-metal derived compound. In such embodiments, the aggregate may contain carbonate and mercury compounds in a molar ratio of carbonate to mercury compounds of $5 \times 10^9$:1 to $5 \times 10^8$:1, such as $2 \times 10^9$:1 to $5 \times 10^8$:1. In some embodiments the aggregates of the invention include a $CO_2$-derived component, a SOx-derived component, and a mercury-derived component, optionally also including a NOx-derived component.

In some embodiments, an aggregate of the invention contains at least one of: a calcium carbonate compound, a magnesium carbonate compound and a calcium magnesium carbonate compound. The molar ratio of the calcium to magnesium for the aggregate may be any of the ratios given herein, e.g., in a magnesium:calcium range of 7:1 to 2:1, 2:1 to 1:2, or 1:10 to 1:200, depending on starting materials, manufacturing conditions, and the like. In some embodiments, the one or more carbonate compounds make up at least 10, 20, 30, 40, 50, 60, 70, 80, 90, 95, 99% by weight of the aggregate, for example, at least 50%, including at least 80%, such as at least 90%. The one or more carbonate compounds may include a precipitate from an divalent cation-containing water, for example a divalent cation-containing water that contains $CO_2$ derived from a gaseous industrial waste stream. Industrial gaseous waste streams may be as described herein, e.g., from a power plant, foundry, cement plant, refinery, or smelter. In some embodiments, the aggregate contains specific minerals that are produced by the manufacturing conditions, as described elsewhere herein. In some specific embodiments, the aggregate contains dypingite at a percentage w/w of at least 0.1%, or at least 0.5%, or at least 1%, or at least 2%, or at least 5%, or at least 10%. In some embodiments the aggregate contains dypingite as well as nesquehonite. In some specific embodiments, the aggregate contains dypingite at a percentage w/w of at least 0.1%, or at least 0.5%, or at least 1%, or at least 2%, or at least 5%, or at least 10% and nesquehonite at a percentage w/w of at least 0.1%, or at least 0.5%, or at least 1%, or at least 2%, or at least 5%, or at least 10%. In some embodiments the aggregate contains calcite at a percentage w/w of at least 0.1%, or at least 0.5%, or at least 1%, or at least 2%, or at least 5%, or at least 10%, or at least 20%, or at least 30%. In some embodiments the aggregate contains dolomite at a percentage w/w of at least 0.1%, or at least 0.5%, or at least 1%, or at least 2%, or at least 5%, or at least 10%, or at least 20%, or at least 30%.

In some embodiments the invention provides a synthetic rock that does not contain binders, i.e., a self-cementing synthetic rock. The methods of the invention allow for production of a hard, durable rock through processes that involve physical reactions without the need for extrinsic or intrinsic binders, as described more fully elsewhere herein. Thus, in some embodiments the invention provides synthetic rock that contains less than 10, 5, 2, 1, 0.5, 0.2, 0.1, 0.05, 0.02, 0.01, 0.005, 0.001, 0.0005, 0.0001% w/w of binder, where "binder," as that term is used herein, includes compounds or substances that are added to a synthetic rock system in order to cause or promote chemical reactions that cause components of the synthetic rock to bind together during a synthetic process. Typical binders are described elsewhere herein. In some embodiments, the synthetic rock of the invention includes substantially no binder. Such synthetic rock can be artificially lithified in processes that mimic geologic processes in which physical, rather than chemical, processes are the processes by which rocks are formed, e.g., dissolution and reprecipitation of compounds in new forms that serve to bind the composition together. Such synthetic rocks in certain embodiments contain one or more carbonate compounds, e.g., carbonate compounds derived from a fossil fuel source. The synthetic rock may in some embodiments have a carbon isotopic fractionation ($\delta^{13}C$) value more negative than (less than) −10‰ or −12‰, or −14‰ or −18‰, or −22‰, or −26‰ or −30‰, or −32‰, or −36‰. The synthetic rock may in some embodiments have a carbon isotopic fractionation ($\delta^{13}C$) value between −10‰ and −40‰.

In some embodiments, the synthetic rock with low or no binder content includes at least one of: a calcium carbonate compound, a magnesium carbonate compound and a calcium magnesium carbonate compound. The molar ratio of the calcium to magnesium for the synthetic rock may be any of the ratios given herein, e.g., in a magnesium:calcium range of 7:1 to 2:1, 2:1 to 1:2, or 1:10 to 1:200, depending on starting materials, manufacturing conditions, and the like. In some embodiments, the one or more carbonate compounds make up at least 10, 20, 30, 40, 50, 60, 70, 80, 90, 95, 99% by weight of the synthetic rock, for example, at least 50%, including at least 80%, such as at least 90%. The one or more carbonate compounds may include a precipitate from a divalent cation-containing water, for example a divalent cation-containing water that contains $CO_2$ derived from a gaseous industrial waste stream. Industrial gaseous waste streams may be as described herein, e.g., from a power plant, foundry, cement plant, refinery, or smelter. The artificial rock may be produced in a process in which metastable components, such as metastable carbonates, are converted to more stable components. For example, in some embodiments the synthetic rock is produced in a process where aragonite is converted to calcite, and/or vaterite is converted to aragonite and/or calcite, and/or protodolomite is converted to dolomite.

In some embodiments the invention provides a lightweight aggregate, e.g., an aggregate with a bulk density of 75-125 lb/ft$^3$, or 90-115 lb/ft$^3$. In some embodiments the lightweight aggregate is a $CO_2$-sequestering aggregate, which may be an aggregate containing carbonates, e.g., at least 10, 20, 30, 40, 50, 60, 70, 80, or 90% carbonates derived from a fossil fuel. In some embodiments the aggregate has a carbon isotopic fractionation ($\delta^{13}C$) value more negative than (less than) −10‰, or −12‰, or −14‰, or −18‰, or −22‰, or −26‰ or −30‰, or −32‰, or −36‰. The lightweight aggregate may in some embodiments have a carbon isotopic fractionation ($\delta^{13}C$) value between −10‰ and −40‰. The lightweight aggregate may in some embodiments have a carbon isotopic fractionation ($\delta^{13}C$) value more negative than (less than) −20‰. The lightweight aggregate may in some embodiments have a carbon isotopic fractionation ($\delta^{13}C$) value more negative than (less than) −30‰. The lightweight aggregate in some embodiments contains carbonate and sulfate or sulfite, or a combination of sulfate and sulfite. In some embodiments the molar ration of carbonate to sulfate and/or sulfite is 1000:1 to 10:1, or 500:1 to 50:1, or 300:1 to 75:1. In some of these embodiments the aggregate further contains mercury or a mercury compound, which may be of fossil fuel origin. In some embodiments the aggregate contains dypingite.

In some embodiments the invention provides a customized set of aggregates, e.g., a set of aggregates with a plurality of characteristics that is chosen to match a predetermined set of characteristics, such as at least two, three, four, or five of size, shape, surface texture, hardness, abrasion resistance, density, porosity, acid stability, base stability, $CO_2$ release stability, and color. In some embodiments the invention provides a set of aggregates with a plurality of characteristics that are chosen to match a predetermined set of characteristics, where the characteristics include size, shape, and hardness. In some embodiments the invention provides a set of aggregates with a plurality of characteristics that are chosen to match a predetermined set of characteristics, where the characteristics include size, shape, hardness, and surface texture. In some embodiments the invention provides a set of aggregates with a plurality of characteristics that are chosen to match a predetermined set of characteristics, where the characteristics include size, shape, hardness, and density. In some embodiments the invention provides a set of aggregates with a plurality of characteristics that are chosen to match a predetermined set of characteristics, where the characteristics include size, shape, and density.

In some embodiments, the invention provides an aggregate comprising a synthetic carbonate. The synthetic carbonate may contain sequestered $CO_2$, such as a carbonate that is a precipitate from divalent cation containing water, e.g., an alkaline-earth-metal-ion containing water, such as salt water as described further herein, for example, sea water. The divalent cation containing-water, e.g., alkaline-earth-metal-ion containing water, may contain $CO_2$ derived from an industrial waste stream, wherein at least part of the $CO_2$ derived from the industrial waste stream is present in the synthetic carbonate as sequestered $CO_2$. The industrial gaseous waste stream may be any waste stream as described herein, e.g, from a power plant, foundry, cement plant, refinery, or smelter. The synthetic carbonate can contain at least one of: a calcium carbonate compound, a magnesium carbonate compound and a calcium magnesium carbonate compound, in any ratio as described more fully herein, for example, where the weight ratio of magnesium to calcium ranges from 10/1 to 1/10. The calcium carbonate compounds, if present, may include one or more any of the polymorphs described herein, for example, calcite, aragonite, vaterite, ikaite or amorphous calcium carbonate. The magnesium carbonate compounds, if present, may include one or more of the any of the polymorphs described herein, for example, dypingite, magnesite, barringtonite, nesquehonite, lansfordite, hydromagnesite or amorphous magnesium carbonate, such as dypingite in an amount of at least 1% w/w, or in an amount at least 5% w/w; embodiments including dypingite may, in some cases, further include nesquehonite, hydromagnesite, or a combination thereof. The calcium magnesium carbonate compounds, if present, may include one or more of any of the polymorphs described herein, for example dolomite, huntite or sergeevite. The aggregate may comprise strontium in an amount as described herein. The aggregate may be reactive or may not be reactive, also as described further herein. In some embodiments, the synthetic carbonate comprises from 1% to 99% of the aggregate. The aggregate may be coarse aggregate, e.g., having an average particle size that ranges between 0.125 inches to 6 inches, or fine aggregate, e.g., having an average particle size that ranges between 0.001 inches to 0.25 inches, or a combination of coarse and fine. The aggregate may have particle shapes selected from the group consisting of: rounded, irregular, flaky, angular, elongated, flaky-elongated, subangular, subrounded, well rounded and any mixtures thereof; in some cases the aggregate further has particle surface textures that are selected from the group consisting of: glassy, smooth, granular, rough, crystalline, honeycombed and mixtures thereof. In some embodiments, the aggregate has particle shapes selected from the group consisting of: polygonal, cylindrical, spherical, triangular, curved shapes, annulus, ellipsoidal, oval, star shaped, prisms or any mixtures thereof; and in some cases may further have particle surface textures that are selected from the group consisting of: glassy, smooth, granular, rough, crystalline, honeycombed and mixtures thereof. The aggregate may have a Mohs hardness that ranges from about 1.5 to 9, such as about 2.5 to 6, or equivalent hardness on the Rockwell, Vickers, or Brinell scales. Any of the above aggregates may further include one or more of: Portland cement, fly ash, lime and a binder, for example, Portland cement, such as where the weight ratio of the synthetic carbonate and Portland cement ranges from 0.1/1 to 5/1. The aggregate has a unit density of between 100 to 150 lb/ft$^3$, such as between 75-125 lb/ft$^3$.

In some embodiments the invention provides a method of producing an aggregate comprising a synthetic carbonate, the method comprising: obtaining a synthetic carbonate; and producing an aggregate comprising the synthetic carbonate. In some embodiments the synthetic carbonate comprises sequestered $CO_2$. In some embodiments the obtaining step comprises precipitating the synthetic carbonate from a divalent cation-containing water, e.g., an alkaline-earth-metal-ion containing water such as salt water, e.g., sea water. The obtaining step may further comprise contacting the divalent cation-containing water, e.g., alkaline-earth-metal-ion containing water, to an industrial gaseous waste stream comprising $CO_2$ prior to, and/or during, the precipitating step. The industrial gaseous waste stream may be any stream as described herein, such as from a power plant, foundry, cement plant, refinery, or smelter, e.g. a flue gas. In some embodiments the obtaining step further comprises raising the pH of the alkaline-earth-metal-ion containing water to 10 or higher prior to or during the precipitating step. The producing step may further include generating a settable composition comprising the synthetic carbonate; and allowing the settable composition to form a solid product, such as by mixing the synthetic carbonate with one or more of: water, Portland cement, fly ash, lime and a binder, and optionally mechanically refining the solid product, such as by molding, extruding, pelletizing or crushing. The producing step may include contacting the synthetic carbonate with fresh water to convert the synthetic carbonate to a freshwater stable product; in one embodiment this is done by spreading the synthetic carbonate in an open area; and contacting the spread synthetic carbonate with fresh water.

In some embodiments, the invention provides an aggregate suitable for use in a building material wherein the aggregate has a unit density of less than 115 lb/cu ft and is a carbon negative aggregate.

In some embodiments the invention provides a composition that includes a hydraulic cement; and an aggregate containing a synthetic carbonate, such as any of the synthetic carbonates described above. The composition may further include water, and the composition is a settable composition such as a concrete, mortar, or a soil stabilizer. The composition may further contain at least one admixture. The hydraulic cement may contain a second synthetic carbonate, e.g, where the second synthetic carbonate comprises sequestered $CO_2$.

The invention also provides a method that includes obtaining a composition comprising a hydraulic cement and an aggregate comprising a synthetic carbonate, such as any of the synthetic carbonates described above, e.g., a $CO_2$-sequestering carbonate, i.e., a carbonate that contains sequestered $CO_2$; and producing a settable composition comprising the obtained composition. The method may further include allowing the settable composition to set into a solid product, such as a structural product, e.g. part of a road, such as asphalt, or a building foundation.

In some embodiments the invention provides road base comprising aggregate comprising a synthetic carbonate, such as any of the synthetic carbonates described above. In some embodiments the invention provides an asphalt comprising aggregate comprising a synthetic carbonate, such as any of the synthetic carbonates described above.

The invention also provides a system for producing an aggregate containing a synthetic carbonate, the system comprising: an input for an alkaline-earth-metal-containing water; carbonate compound precipitation station that subjects the water to carbonate compound precipitation conditions and produces a synthetic carbonate; and an aggregate producer for producing aggregate comprising the synthetic carbonate. In some embodiments, the aggregate producer comprises a refining station to mechanically refine the aggregate comprising the synthetic carbonate.

In some embodiments the invention provides a method of sequestering $CO_2$, that includes contacting an alkaline-earth-metal-ion containing water to a gaseous industrial waste stream comprising $CO_2$; precipitating a synthetic carbonate from the alkaline-earth-metal-ion containing water, wherein the synthetic carbonate comprises $CO_2$ derived from the gaseous industrial waste stream; and producing aggregate comprising the synthetic carbonate.

In some embodiments, the invention provides a concoidally-fracturing aggregate.

2. Making the Compositions of the Invention

Aggregates of the invention can be produced by any suitable method. For example, aggregates of the invention can be produced by precipitating a precursor calcium and/or magnesium carbonate composition from a water and then processing the resultant precipitate to produce an aggregate. The carbonate compound compositions that make up the aggregates of the invention can be metastable carbonate compounds, or derived from such compounds, that are precipitated from a water, such as a salt-water, as described in greater detail below. The carbonate compound compositions of the invention included precipitated crystalline and/or amorphous carbonate compounds.

As reviewed above, the aggregates of the invention include a carbonate compound composition, e.g., a composition precipitated from a divalent cation-containing water, such as an alkaline-earth-metal-containing water, such as a saltwater-derived carbonate compound composition. As such, the carbonate compound composition of the aggregates is one that is made up of one or more different carbonate compounds, which may be amorphous or crystalline. As reviewed above, the carbonate compound compositions of the cements may include one or more hydroxide compounds.

Exemplary methods for preparation of compositions of the invention include methods that may be divided into 1) preparation of a precipitate, and 2) preparation of aggregate from the precipitate.

1) Preparation of Precipitate.

The precipitates for use in aggregates of the invention may be prepared from divalent cations, e.g., magnesium and/or calcium ions and $CO_2$, e.g., from an industrial waste gas source. The precipitates are generally carbonates and/or bicarbonates, and in order to prepare the precipitate it is necessary to remove protons from the solution, e.g., by use of a base, by use of electrochemical methods, or a combination.

Divalent cations Divalent cations (e.g., cations of alkaline earth metals such as $Ca^{2+}$ and $Mg^{2+}$), are used to produce aggregate using systems and methods of the invention. Divalent cations may come from any of a number of different divalent cation sources depending upon availability at a particular location. Such sources include industrial wastes, seawater, brines, hard waters, minerals, and any other suitable source.

In some locations, industrial waste streams from various industrial processes provide for convenient sources of divalent cations (as well as in some cases other materials useful in the process, e.g., metal hydroxide). Such waste streams include, but are not limited to, mining wastes; fossil fuel burning ash (e.g., flyash); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge.

In some locations, a convenient source of divalent cations for use in systems and methods of the invention is water (e.g., an aqueous solution comprising divalent cations such as seawater or surface brine), which may vary depending upon the particular location at which the invention is practiced. Suitable aqueous solutions of divalent cations that may be used include solutions comprising one or more divalent cations, e.g., alkaline earth metals (e.g., calcium, magnesium). In some embodiments, the aqueous source of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}/Mg^{2+}$ in the aqueous solution of divalent cations is 1 to 1000; 1 to 800; 1 to 500; 1 to 250; 1 to 200; 1 to 150; 1 to 100; 1 to 50; and 1 to 25.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other salines having a salinity that is greater than that of freshwater. Brackish water is water that is saltier than freshwater, but not as salty as seawater. Brackish water has a salinity ranging from about 0.5 to about 35 ppt (parts per thousand). Seawater is water from a sea, an ocean, or any other saline body of water that has a salinity ranging from about 35 to about 50 ppt. Brine is water saturated or nearly saturated with salt. Brine has a salinity that is about 50 ppt or greater. In some embodiments, the saltwater source from which divalent cations are derived is a naturally occurring source selected from a sea, an ocean, a lake, a swamp, an estuary, a lagoon, a surface brine, a deep brine, an alkaline lake, an inland sea, or the like. In some embodiments, the saltwater source from which the divalent cations are derived is a anthropogenic brine selected from a geothermal plant wastewater or a desalination wastewater.

Freshwater is often a convenient source of divalent cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., calcium or magnesium) to produce a mineral-rich water that is suitable for systems and methods for producing aggregate according to the invention. Divalent cations or precursors thereof (e.g. salts, minerals) may be added to freshwater (or any other water described herein) using any convenient protocol (e.g., addition of solids, suspensions, or solutions). In some embodiments, divalent cations selected from calcium and magnesium are added to freshwater. In some embodiments, monovalent cations selected from sodium and potassium are added to freshwater. In some embodiments, freshwater comprising calcium is combined with magnesium silicates (e.g., olivine or serpentine), or products or processed forms thereof, yielding a solution comprising calcium and magnesium cations.

Many minerals provide sources of divalent cations and, in addition, some minerals are sources of base. Mafic and ultramafic minerals such as olivine, serpentine, and any other suitable mineral may be dissolved using any convenient protocol. Dissolution may be accelerated by increasing surface area, such as by milling by conventional means or by, e.g., jet milling, as well as by use of, e.g., ultrasonic techniques. In addition, mineral dissolution may be accelerated by exposure to acid or base. Metal silicates (e.g., magnesium silicates) and other minerals comprising cations of interest may be dissolved, e.g., in acid (e.g., HCl such as HCl from an electrochemical process) to produce, for example, magnesium and other metal cations for use in precipitation material, and, subsequently, aggregate or other compositions of the invention. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)2$, $Ca(OH)2$) may be made available for use in aggregate by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% and from 70% to 20% water. Advantageously, metal silicates and the like digested with aqueous alkali hydroxide may be used directly to produce precipitation material, and, subsequently, aggregate from a waste gas stream. In addition, base value from the precipitation reaction mixture may be recovered and reused to digest additional metal silicates and the like.

In some embodiments, an aqueous solution of divalent cations may be obtained from an industrial plant that is also providing a combustion gas stream. For example, in water-cooled industrial plants, such as seawater-cooled industrial plants, water that has been used by an industrial plant for cooling may then be used as water for producing precipitation material, and, subsequently, aggregate in a system or method of the invention. If desired, the water may be cooled prior to entering the precipitation system. Such approaches may be employed, for example, with once-through cooling systems. For example, a city or agricultural water supply may be employed as a once-through cooling system for an industrial plant. Water from the industrial plant may then be employed for producing precipitation material, which may subsequently be used to produce aggregate in a system or method of the invention, and wherein output water has a reduced hardness and greater purity. If desired, such systems may be modified to include security measures (e.g., to detect tampering such as addition of poisons) and coordinated with governmental agencies (e.g., Homeland Security or other agencies). Additional tampering or attack safeguards may be employed in such embodiments.

$CO_2$ sources Although in some embodiments there is sufficient carbon dioxide in the water source to precipitate significant amounts of carbonates (e.g., from seawater), additional carbon dioxide is generally used for $CO_2$-sequestering aggregates it will be apparent that this is generally the case. Thus, in certain embodiments, the methods further include contacting the volume of aqueous solution, e.g., an aqueous solution of divalent cations that is to be subjected to mineral precipitation conditions, with a source of $CO_2$. The source of $CO_2$ that is contacted with the aqueous solution, e.g., of divalent cations may be any convenient $CO_2$ source. The $CO_2$ source may be a gas, a liquid, a solid (e.g., dry ice), a supercritical fluid, or $CO_2$ dissolved in a liquid. In certain embodiments, the CO2 source is a gaseous CO2 source. This gaseous $CO_2$ source is, in certain instances, a waste feed (i.e., a byproduct of an active process of the industrial plant) from an industrial plant. The nature of the industrial plant may vary in these embodiments, where industrial plants of interest include power plants, chemical processing plants, mechanical processing plants, refineries, cement plants, steel plants, and other industrial plants that produce $CO_2$ as a byproduct of fuel combustion or another processing step (such as calcination by a cement plant). For $CO_2$-sequestering aggregate these waste streams, in some embodiments, provide the $CO_2$ to be sequestered. The gaseous stream may be substantially pure $CO_2$ or comprise multiple components that include $CO_2$ and one or more additional gases and/or other substances such as ash and other particulates.

Waste gas streams comprising $CO_2$ include both reducing (e.g., syngas, shifted syngas, natural gas, hydrogen and the like) and oxidizing condition streams (e.g., flue gases from combustion). Particular waste gas streams that may be convenient for the invention include oxygen-containing combustion industrial plant flue gas, turbo charged boiler product gas, coal gasification product gas, shifted coal gasification product gas, anaerobic digester product gas, wellhead natural gas stream, reformed natural gas or methane hydrates, and the like. Combustion gas from any convenient source may be used to produce aggregate. In some embodiments, combustion gases in post-combustion effluent stacks of industrial plants such as power plants, cement plants, and coal processing plants is used Thus, the waste streams may be produced from a variety of different types of industrial plants. Suitable waste streams for the invention include waste streams produced by industrial plants that combust fossil fuels (e.g., coal, oil, natural gas) and anthropogenic fuel products of naturally occurring organic fuel deposits (e.g., tar sands, heavy oil, oil shale, etc.). In some embodiments, waste streams suitable for systems and methods of the invention are sourced from a coal-fired power plant, such as a pulverized coal power plant, a supercritical coal power plant, a mass burn coal power plant, a fluidized bed coal power plant; in some embodiments the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce aggregate in accordance with systems and methods of the invention.

Waste streams produced by cement plants are also suitable for systems and methods of the invention. Cement plants waste streams include waste streams from both wet process and dry process plants, which plants may employ shaft kilns or rotary kilns, and may include pre-calciners. These industrial plants may each burn a single fuel, or may burn two or more fuels sequentially or simultaneously.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include CO, mercury and other heavy metals, and dust particles (e.g., from calcining and combustion processes). Additional components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. In various embodiments, one or more of these additional components is precipitated in precipitation material formed by contacting the waste gas stream comprising these additional components with an aqueous solution comprising divalent cations (e.g., alkaline earth metal ions such as $Ca^{2+}$ and $Mg^{2+}$). For example, where $SO_2$ is contained in the gas stream, sulfates and sulfites of calcium and magnesium may be precipitated in precipitation material, which precipitation may further comprise calcium and/or magnesium carbonates. Other components, such as heavy metals, e.g., mercury, may be trapped in the precipitate or may precipitate as solid compounds.

Although industrial waste gas offers a relatively concentrated source of combustion gases, the methods and systems are also applicable to removing combustion gas components from less concentrated sources (e.g., atmospheric air), which contains a much lower concentration of pollutants than, for example, flue gas. Thus, in some embodiments, methods and systems encompass decreasing the concentration of pollutants in atmospheric air by producing a stable precipitation material, and, subsequently, aggregate using the procedures outlined herein. In these cases, the concentration of pollutants, e.g., $CO_2$, in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in atmospheric pollutants may be accomplished with yields as described herein, or with higher or lower yields, and may be accomplished in one precipitation step or in a series of precipitation steps.

A variety of different gaseous waste streams may be treated in order to utilize various combustion gas components. Suitable gaseous waste streams have, in some embodiments, $CO_2$ present in amounts of 200 ppm to 1,000,000 ppm, such as 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm. The waste streams may include one or more additional components, for example, water, NOx (mononitrogen oxides: NO and $NO_2$), SOx (monosulfur oxides: SO, SO2 and SO3), VOC (volatile organic compounds), heavy metals such as mercury, and particulate matter (particles of solid or liquid suspended in a gas). Flue gas temperature may also vary. In some embodiments, the temperature of the flue gas is from 0° C. to 2000° C., such as from 60° C. to 7000° C., and including 100° C. to 400° C.

A source of $CO_2$ is contacted with an aqueous solution, e.g., an aqueous solution of divalent cations (e.g., alkaline earth metal cations) at some point during the method, such as before, during, or even after the aqueous solution of divalent cations has been subjected to precipitation conditions. Contact of the aqueous solution, e.g. of divalent cations such as alkaline earth metal ions, with the source of $CO_2$ may occur before and/or during the time when the cation solution is subject to $CO_2$ precipitation conditions. Accordingly, embodiments of the invention include methods in which the volume of aqueous solution of divalent cations is contacted with a source of $CO_2$ prior to subjecting the volume of cation solution to mineral precipitation conditions. Embodiments of the invention include methods in which the volume of divalent cation solution is contacted with a source of $CO_2$ while the volume of divalent cation solution is being subjected to carbonate and/or bicarbonate compound precipitation conditions. Embodiments of the invention include methods in which the volume of aqueous solution of divalent cations is contacted with a source of a $CO_2$ prior to subjecting the volume of cation solution to carbonate and/or bicarbonate compound precipitation conditions. Embodiments of the invention include methods in which the volume of aqueous solution of divalent cations is contacted with a source of a $CO_2$ both prior to and while subjecting the volume of cation solution to carbonate and/or bicarbonate compound precipitation conditions. In some embodiments, the same divalent cation solution may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate and/or bicarbonate compounds. It will be appreciated that in these cases the CO2 may be contacted with the water before, during, and/or after divalent cations have been added.

A gaseous waste stream may be provided from the industrial plant to the site of precipitation in any convenient manner that conveys the gaseous waste stream from the industrial plant to the precipitation plant. In some embodiments, the gaseous waste stream is provided with a gas conveyer (e.g., a duct) that runs from a site of the industrial plant (e.g., an industrial plant flue) to one or more locations of the precipitation site. The source of the gaseous waste stream may be a distal location relative to the site of precipitation such that the source of the gaseous waste stream is a location that is 1 mile or more, such as 10 miles or more, including 100 miles or more, from the precipitation location. For example, the gaseous waste stream may have been transported to the site of precipitation from a remote industrial plant via a $CO_2$ gas conveyance system (e.g., a pipeline). The industrial plant generated $CO_2$ containing gas may or may not be processed (e.g., remove other components) before it reaches the precipitation site (i.e., the site in which precipitation and/or production of aggregate takes place). In yet other instances, the gaseous waste stream source is proximal to the precipitation site. For example, the precipitation site is integrated with the gaseous waste stream source, such as a power plant that integrates a precipitation reactor for precipitation of precipitation material that may be used to produce aggregate.

A portion of the gaseous waste stream (i.e., not the entire gaseous waste stream) from an industrial plant may be used to produce precipitation material and, subsequently, aggregate. In these embodiments, the portion of the gaseous waste stream that is employed in precipitation of precipitation material may be 75% or less, such as 60% or less, and including 50% and less of the gaseous waste stream. In yet other embodiments, substantially (e.g., 80% or more) the entire gaseous waste stream produced by the industrial plant is employed in precipitation of precipitation material useful for producing aggregate of the invention. In these embodiments, 80% or more, such as 90% or more, including 95% or more, up to 100% of the gaseous waste stream (e.g., flue gas) generated by the source may be employed for precipitation of precipitation material.

As indicated above, the gaseous waste stream may be one that is obtained from a flue or analogous structure of an industrial plant. In these embodiments, a line (e.g., duct) is connected to the flue so that gas leaves the flue through the line and is conveyed to the appropriate location(s) of a precipitation system. Depending upon the particular configuration of the precipitation system at the point which the gaseous waste stream is employed, the location of the source from which the gaseous waste stream is obtained may vary (e.g., to provide a waste stream that has the appropriate or desired temperature). As such, in certain embodiments, where a gaseous waste stream having a temperature ranging for 0° C. to 1800° C., such as 60° C. to 700° C., is desired, the flue gas may be obtained at the exit point of the boiler or gas turbine, the kiln, or at any point of the power plant or stack, that provides the desired temperature. Where desired, the flue gas is maintained at a temperature above the dew point (e.g., 125° C.) in order to avoid condensation and related complications. If it is not possible to maintain the temperature above the dew point, steps may be taken to reduce the adverse impact of condensation (e.g., employing ducting that is stainless steel, fluorocarbon (such as poly(tetrafluoroethylene)) lined, diluted with water, and pH controlled, etc.) so the duct does not rapidly deteriorate.

The volume of water may be contacted with the $CO_2$ source using any convenient protocol. Where the $CO_2$ is a gas, contact protocols of interest include, but are not limited to: direct contacting protocols, e.g., bubbling the gas through the volume of saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient. In one embodiments, contact is between a flat jet liquid sheet and the gas, where the sheet and the gas may be moving in countercurrent, cocurrent, or crosscurrent directions, or in any other suitable manner. See, e.g., U.S. Patent Application No. 61/158,992, filed Mar. 10, 2009, which is hereby incorporated by reference in its entirety. In one embodiment contact is between neutrally buoyant liquid droplets of solution, of a diameter of 5 mircometers or less, and gas in a chamber. In some embodiments a catalyst is used to accelerate the dissolution of carbon dioxide into water by accelerating the reaction toward equilibrium; the catalyst may be an inorganic substance such as zinc trichloride or cadmium, or an organic substance, e.g., an enzyme such as carbonic anhydrase Proton removal The dissolution of $CO_2$ into aqueous solution produces carbonic acid, which is in equilibrium with bicarbonate and carbonate. In order to precipitate carbonates, protons are removed from the solution to shift the equilibrium toward carbonate. In addition, removal of protons allows more $CO_2$ to go into solution. In some embodiments proton removal is used together with $CO_2$ contact with the aqueous solution, e.g. containing divalent cations, to increase $CO_2$ absorption in one phase of the reaction, where the pH may remain constant, increase, or even decrease, followed by a rapid removal of protons (e.g., by addition of a base) to cause rapid precipitation of carbonate compounds. Protons may be removed from the solution by any convenient approach. Approaches of interest include, but are not limited to: use of naturally occurring pH raising agents, use of microorganisms and fungi, use of synthetic chemical pH raising agents, recovery of man-made waste streams, and using electrochemical means.

The term naturally occurring pH raising agents encompasses any means that can be found in the wider environment that may create or have a basic local environment. Some embodiments provide for naturally occurring pH raising agents including minerals that create basic environments upon addition to solution, e.g. dissolution. Such minerals include, but are not limited to: lime (CaO), periclase (MgO), volcanic ash, ultramafic rocks and minerals such as serpentine, and iron hydroxide minerals, e.g. goethite and limonite. Methods of dissolution of such rocks and minerals are provided herein. Some embodiments provide for using naturally alkaline bodies of water as naturally occurring pH raising agents. Examples of naturally alkaline bodies of water include, but are not limited to: surface water sources, e.g. alkaline lakes such as Mono Lake in California, and ground water sources, e.g. basic aquifers. Other embodiments provide for the use of deposits from dried alkaline bodies of water, such as the crust along Lake Natron in Africa's Great Rift Valley. Other embodiments provide using organisms that excrete basic solutions or molecules in their normal metabolism as pH raising agents. Examples of such organisms are fungi that produce alkaline protease, e.g. the deep-sea fungus *Aspergillus ustus* with an optimal pH of 9, and bacteria that create alkaline molecules, e.g. the cynobacteria, *Lyngbya* sp. found in the Atlin wetland in Bristish Columbia that increase pH as a byproduct of photosynthesis. In some embodiments, organisms are used where there are co-contaminants that are used in the metabolism that produces pH raising molecules or solutions, e.g. *B. pasteurii* that hydrolyzes urea to ammonia is used where urea exists as a contaminant. In some embodiments, organisms are cultured away from the process and their alkaline excretions are used for addition to the sequestration process.

Chemical pH raising agents generally refer to synthetic chemicals, produced in large quantities, that are commercially available. Some embodiments provide for use of chemicals including: hydroxides, organic bases, super bases, oxides, ammonia, and carbonates. Hydroxides include molecules that contain OH. Exemplary hydroxides are: sodium hydroxide (NaOH), potassium hydroxide (KOH), calcium hydroxide ($Ca(OH)_2$), and magnesium hydroxide ($Mg(OH)_2$). Organic bases are carbon containing molecules and are generally are of the form ($—NR_2H^+$). Some embodiments provide for use of organic bases to raise pH, including: pyridine, methyl amine, imidazole, benimidazol, histidine, and the phophazene bases. Some embodiments provide for removing protons pH with ammonia, $NH_3$. Ammonia is considered by some to be an organic base of sorts though it lacks carbon molecules. Other embodiments provide for the use of super bases as pH raising chemicals, including but not limited to: ethoxide, sodium amide ($NaNH_2$), sodium hydride (NaH), butyl lithium, lithium diisopropylamide, lithium diethylamide, and lithium bis(trimethylsilyl)amide. Oxides are other chemicals that can be used as proton acceptors/pH raising agents. Some embodiments provide for using oxides as pH raising agents, including, but not limited to: calcium oxide (CaO), magnesium oxide (MgO), strontium oxide (SrO), and beryllium oxide (BeO).

Waste streams from various processes are other sources of agents that may be used to react with protons in the aqueous solution, e.g., bases. In some embodiments waste streams are provided as bases. Such waste streams include, but are not limited to: mining wastes; fossil fuel burning ash; slag, e.g. iron slag, phosphorous slag; cement kiln waste; oil refinery/petrochemical refinery waste, e.g. oil field and methane seam brines; coal seam wastes, e.g. gas production brines and coal seam brine; paper processing waste; water softening, e.g. ion exchange waste brine; silicon processing wastes; agricultural waste; metal finishing waste; high pH textile waste; and caustic sludge. Mining wastes include any wastes from the extraction of metal or another precious or useful mineral from the earth. Some embodiments provide for wastes from mining to be used to raise pH, including: red mud from the Bayer aluminum extraction process; the waste from magnesium extraction for sea water, e.g. at Moss Landing, Calif.; and the wastes from other mining processes involving leaching Ash from processes burning fossil fuels, such as coal fired power plants, create ash that is often rich in CaO or other metal oxides that can create a basic environment when in solution. In some embodiments, ashes resulting from burning fossil fuels, e.g. coal fired power plants, are provided as pH raising agents, including fly ash, e.g. ash that exits out the smoke stack, and bottom ash. Cement kiln waste is useful as a pH raising agent because the powder remaining in cement kilns often contains CaO, and is provided as such in some embodiments. Agricultural waste, either through animal waste or excessive fertilizer use, may contain potassium hydroxide (KOH) or ammonia ($NH_3$) or both, and agricultural waste is provided in some embodiments of the invention as a pH raising agent. This agricultural waste is often collected in ponds, but it may also percolate down into aquifers, where it can be accessed for use in the sequestration process.

Electrochemical methods are another means to remove protons from a solution, either by removing protons from molecules (deprotonation) from the aqueous solution of divalent cations, e.g., if proton production from $CO_2$ dissolution matches or exceeds proton removal by an electrochemical process, or by creating caustic molecules, e.g. hydroxides, as through the chlor-alkali process or other electrochemical processes. For example, electrodes (cathode and anode) may be provided in the reactor which holds the aqueous solution, e.g., in some embodiments, of divalent cations, where the electrodes may be separated by a selective barrier, such as a membrane, as desired. Where desired, byproducts of the hydrolysis product, e.g., $H_2$, sodium metal, etc. may be harvested and employed for other purposes, as desired. Additional electrochemical approaches of interest include, but are not limited, those described in U.S. Provisional Application Ser. Nos. 61/081,299 and 61/091,729; the disclosures of which are herein incorporated by reference.

In some instances, low-voltage electrochemical protocols are employed remove protons from the aqueous solution, e.g. while $CO_2$ is dissolved (either directly removing protons or indirectly by providing base), and at the precipitation step, (again either directly or indirectly). "Low-voltage" includes an electrochemical protocol that operates at an average voltage of 2, 1.9, 1.8, 1.7, or 1.6 V or less, such as less than 1.5, 1.4, 1.3, 1.2, 1.1 V or less, such as 1V or less, including 0.9V or less, 0.8V or less, 0.7V or less, 0.6V or less, 0.5V or less, 0.4V or less, 0.3V or less, 0.2V or less, or 0.1V or less. Of interest are electrochemical protocols that do not generate chlorine gas. Also of interest are electrochemical protocols that do not generate oxygen gas. Also of interest are electrochemical protocols that do not generate hydrogen gas. In some instances, the electrochemical protocol is one that does not generate any gaseous by-byproduct. In some embodiments, the electrochemical protocol generates hydrogen gas at the cathode which is transported to the anode where it is converted to protons. See, e.g., U.S. patent application Ser. No. 12/344,019, filed Dec. 24, 2008, and U.S. patent application Ser. No. 12/375,632, filed Dec. 23, 2008, and PCT Application No. U.S.08/088,242, filed Dec. 23, 2008, and PCT Application No. U.S.09/32301, filed Jan. 28, 2009, all of which are hereby incorporated by reference in their entirety.

These proton removal approaches may be used in any suitable combination. Some embodiments provide for combination of pH raising/proton removal methods including: use of man made waste, e.g. fly ash or mining waste, in combination with commercially available base, e.g. NaOH; man made waste in combination with electrochemical methods, e.g. deprotonation, and naturally occurring pH raising agents, e.g. serpentine minerals; or man made waste in combination with commercially available base and naturally occurring pH raising agents. Some embodiments provide for the combination of pH raising/proton removal such that 2-30% of the pH raising agent is fly ash, 20-80%% of the pH raising agent is waste, e.g. from a mining process such as red mud, or mineral, such as serpentine, or a combination thereof, and 10-50% of the pH raising agent is proton removal using deprotonation in an electrochemical process.

Precipitation conditions Following $CO_2$ dissolution in aqueous solution containing divalent cations, or in some embodiments during, or after dissolution, precipitation occurs. Precipitation conditions of interest may vary. For example, the temperature of the water may be within a suitable range for the precipitation of the desired mineral to occur. In some embodiments, the temperature of the water may be in a range from 5 to 70° C., such as from 20 to 50° C. and including from 25 to 45° C. As such, while a given set of precipitation conditions may have a temperature ranging from 0 to 100° C., the temperature of the water may have to be adjusted in certain embodiments to produce the desired precipitate.

While the pH of the aqueous solution of divalent cations may range from 5 to 14 during a given precipitation process, in some instances the protons are removed, e.g. pH is raised to alkaline levels, in order to produce the desired precipitation product. In some embodiments, the pH is raised to a level sufficient to cause precipitation of the desired $CO_2$ sequestering product. As such, the pH may be raised to 9.5 or higher, such as 10 or higher, including 10.5 or higher. In some embodiments, conditions are adjusted so that little or no $CO_2$ is released during the precipitaion. Using sea water as an example, in normal sea water, 93% of the dissolved $CO_2$ is in the form of bicarbonate ions ($HCO_3^-$) and 6% is in the form of carbonate ions ($CO_3^{-2}$). When calcium carbonate precipitates from normal sea water at ambient pH, $CO_2$ is released. In fresh water, at pH greater than 10.33, greater than 90% of the carbonate is in the form of carbonate ion, and no $CO_2$ is released during the precipitation of calcium carbonate. In sea water this transition occurs at a slightly lower pH, closer to a pH of 9.7. Where desired, the pH may be raised to a level which minimizes if not eliminates $CO_2$ production during precipitation. For example, the pH may be raised to a value of 10 or higher, such as a value of 11 or higher. In certain embodiments, the pH is raised to between 7 and 11, such as between 8 and 11, including between 9 and 11, for example between 9 and 10, or between 10 and 11. In this step, the pH may be raised to and maintained at the desired alkaline level, such that the pH is maintained at a constant alkaline level, or the pH may be transitioned or cycled between two or more different alkaline levels, as desired.

Additives other than pH elevating agents may also be introduced into the aqueous solution of divalent cations in order to influence the nature of the precipitate that is produced. As such, certain embodiments of the methods include providing an additive in the solution before or during the time when the cation solution is subjected to the precipitation conditions. Certain calcium carbonate polymorphs can be favored by trace amounts of certain additives. For example, vaterite, a highly unstable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitate can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph. As such, a wide range of magnesium:calcium ratios can be employed, including, e.g., more than 100/1, 50/1, 20/1, 10/1, 5/1, 2/1, 1/1, or less than 1/2, 1/5, 1/10, 1/20, 1/50, 1/100. In certain embodiments, the magnesium:calcium ratio is determined by the aqueous solution of divalent cations employed in the precipitation process (e.g., seawater, brine, brackish water, fresh water), whereas in other embodiments, the magnesium:calcium ratio is adjusted to fall within a certain range, e.g., by addition of exogenous calcium or magnesium, for example from dissolution of a rock or mineral, such as serpentine. In some embodiments a high-calcium water source is used, such as a geologic or other brine, and the mineral ratio is adjusted toward 1:1 Ca:Mg by addition of a high-magnesium source, such as dissolved serpentine or other rock or mineral. Such a Ca:Mg ratio can allow the formation of protodolomite in the precipitation stage, which may be further converted to dolomite in the formation of aggregate or artificial rock.

When silica is present, a number of additional minerals may be formed. Replacement of carbonate minerals by silica is a common feature of ancient sedimentary rocks and deep-sea sediments. Silica can be added in many forms. At alkaline pHs, silica dissolves and becomes available for reaction with precipitating carbonates. Sources of silica include diatomaceous earth, fly ash from the burning of coal, and silica fume. Also, Mg-carbonates are used to scavenge silica in wastewaters indicating that dissolved silica/carbonate mineral interactions can occur on short time scales as well. Klein and Walter (1992) conducted experiments to determine of the rate, time dependence, and extent of aqueous $SiO_2$ uptake onto well characterized Ca—Mg carbonate at temperatures between 25° C. and 50° C., where the solutions of aqueous $SiO_2$ ranged from 1.5 to 3.5 mM $SiO_2$. Three different reaction conditions were tested: (1) silica uptake during short term calcite overgrowth precipitation onto calcite seeds at fixed degrees of calcite supersaturation; (2) silica uptake near equilibrium with respect to calcite; and (3) silica uptake during the relatively long term (3 weeks) recrystallization of metastable carbonates (aragonite, 18 mol % Mg-calcite). Silica uptake onto carbonates is greatest during rapid carbonate precipitation. Calcite precipitation kinetics, however, are unaffected by the $SiO_2$ interaction with carbonate surface and similar precipitation rates are observed at equivalent degrees of calcite supersaturation in silica-spiked and silica-free experiments. In near equilibrium experiments, $SiO_2$ uptake was strongly time-dependent but smaller in magnitude and uptake was enhanced at higher $SiO_2$ concentrations, lower pH, and higher temperature. In longer term aragonite and Mg-calcite recrystallization experiments. $SiO_2$ uptake was similar to near-equilibrium experiments conducted with low Mg-calcite. One advantage of having silica present in the carbonate precipitates is related to their later potential to form hard, stable aggregate particles.

Rate of precipitation also has a large effect on compound phase formation. The most rapid precipitation can be achieved by seeding the solution with a desired phase. Without seeding, rapid precipitation can be achieved by rapidly increasing the pH of the aqueous solution of divalent cations, which results in more amorphous constituents. When silica is present, the more rapid the reaction rate, the more silica is incorporated with the carbonate precipitate. The higher the pH is, the more rapid the precipitation is and the more amorphous the precipitate is.

Accordingly, a set of precipitation conditions to produce a desired precipitate from an aqueous solution of divalent cations include, in certain embodiments, the solution's temperature and pH, and in some instances the concentrations of additives and ionic species in the aqueous solution of divalent cations. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate and/or bicarbonate compound precipitates according to the invention may be batch or continuous protocols. It will be appreciated that precipitation conditions may be different to produce a given precipitate in a continuous flow system compared to a batch system.

Following production of the carbonate mineral precipitate from the water, the resultant precipitated carbonate mineral composition is separated from the mother liquor to produce separated carbonate mineral precipitate product, also described herein as a dewatered precipitate or water precipitate cake. Separation of the precipitate can be achieved using any convenient approach, including a mechanical approach, e.g., where bulk excess water is drained from the precipitated, e.g., either by gravity alone or with the addition of vacuum, mechanical pressing, by filtering the precipitate from the mother liquor to produce a filtrate, etc. Separation of bulk water produces a wet, dewatered precipitate.

2) Production of Aggregate or Artificial Rock from Precipitate

The precipitate produced by the methods above is then further treated to produce aggregates or artificial rock of the invention.

In some embodiments, the dewatered precipitate is then dried to produce a product. Drying can be achieved by air drying the filtrate. Where the filtrate is air dried, air drying may be at a temperature ranging from −70° C. to 120° C., as desired. In certain embodiments, drying is achieved by freeze-drying (i.e., lyophilization), where the precipitate is frozen, the surrounding pressure is reduced and enough heat is added to allow the frozen water in the material to sublime directly from the frozen precipitate phase to gas. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. In certain embodiments, waste heat from a power plant, or similar operation, is used to perform the drying step when appropriate.

Where desired, the precipitate may be stored in the mother liquor for a period of time following precipitation and prior to separation. For example, the precipitate may be stored in the mother liquor for a period of time ranging from 1 to 1000 days or longer (e.g., many years or a decade or more), such as 1 to 10 days or longer, at a temperature ranging from 1° C. to 40° C., such as 20° C. to 25° C.

At the stage of the water precipitate cake, any convenient method may be used to produce aggregates. Several methods are described herein. In some cases, the dewatered precipitate may be ball-milled, in the presence of water, binders, surfactants, flocculents (which may be present from an earlier stage of the process), or other suitable substances. The precipitate is then further treated; this may be as simple as removing it from the ball mill and putting it in a container under airflow, where it self-consolidates into a mass that can then be further used. In some cases, the cake may be reacted with freshwater to produce a different set of solid precipitated compounds that are more stable in freshwater, then further processed to produce aggregate. In some cases, the cake may be subjected to conditions of temperature and pressure that cause an artificial lithification, i.e., the artificial production of rock, which may then be further processed; e.g., the filter cake may be pressed, or stacked, or the filter cake may be passed through an extruder. In some of these cases the process is performed without the use of binders, to produce a synthetic rock, e.g., aggregate, that is free of binders, or with a minimal level of binders. In other cases one or more binders are used.

Exemplary methods in which freshwater-stable re-precipitated substances are produced include the following: the precipitate may be combined with fresh water in a manner sufficient to cause the precipitate to form a solid product, where it is thought that the metastable carbonate compounds present in the precipitate have converted to a form that is stable in fresh water. By controlling the water content of the wet material, the porosity, and eventual strength and density of the final aggregate may be controlled. Typically a wet cake will be 40-60 volume % water. For denser aggregates, the wet cake will be <50% water, for less dense cakes, the wet cake will be >50% water. After hardening, the resultant solid product may then be mechanically processed, e.g., crushed or otherwise broken up and sorted to produce aggregate of the desired characteristics, e.g., size, particular shape, etc. In these processes the setting and mechanical processing steps may be performed in a substantially continuous fashion or at separate times.

In certain embodiments, large volumes of precipitate may be stored in the open environment where the precipitate is exposed to the atmosphere. The precipitate may be irrigated in a convenient fashion with fresh water, or allowed to be rained on or otherwise exposed to freshwater naturally or order to produce the aggregate product. The aggregate product may then be mechanically processed as described above.

In an example of one embodiment of the invention, the precipitate is mechanically spread in a uniform manner using a belt conveyor and highway grader onto a compacted earth surface to a depth of interest, e.g., up to twelve inches, such as 1 to 12 inches, including 6 to 12 inches. The spread material is then irrigated with fresh water at a convenient ratio, e.g., of one/half gallon of water per cubic foot of precipitate. The material is then compacted using multiple passes with a steel roller, such as those used in compacting asphalt. The surface is re-irrigated on a regular, e.g., weekly basis until the material exhibits the desired chemical and mechanical properties, at which point the material is mechanically processed into aggregate by crushing.

In processes involving the use of temperature and pressure, the dewatered water precipitate cake is generally first dried. The cake is then exposed to a combination of rewatering, and elevated temperature and/or pressure for a certain time. The combination of the amount of water added back, the temperature, the pressure, and the time of exposure, as well as the thickness of the cake, can be varied according to composition of the starting material and the desired results. A number of different ways of exposing the material to temperature and pressure are described herein; it will be appreciated that any convenient method may be used. An exemplary drying protocol is exposure to 40° C. for 24-48 hours, but greater or lesser temperatures and times may be used as convenient, e.g., 20-60° C. for 3-96 hours or even longer. Water is added back to the desired percentage, e.g., to 1%-50%, e,g, 1% to 10%, such as 1, 2, 3, 4, 5, 6, 7, 8, 9, or 10% w/w, such as 5% w/w, or 4-6% w/w, or 3-7% w/w. In some cases an exact percentage of water added back is not important, as in materials that are stored outdoors and exposed to meteoric precipitation. Thickness and size of the cake may be adjusted as desired; the thickness can vary in some embodiment from 0.05 inch to 5 inches, e.g. 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120° C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally then cured, e.g., by placing outside and storing, by placing in a chamber wherein they are subjected to high levels of humidity and heat, etc. These hard tablets, optionally cured, are then used as building materials themselves or crushed to produce aggregate.

One method of providing temperature and pressure is to stack dewatered and dried slabs. For example, in such a method a dewatered precipitate may be dried, e.g., with flue gas, in a slab, e.g., 1 inch to 10 feet thick, or 1 foot to 10 feet thick. Pressure is supplied by placing slabs on top of each other; greater pressure is achieved by greater thicknesses of slab layers, e.g., 10-1000 feet or even greater, such as 100-5000 feet. At an appropriate time, which may be days, weeks, months, or even years, depending on the desired result, lithified slabs from a given level of the layers, e.g., from the bottom, is removed, e.g., by quarrying, and treated as desired to produce an aggregate or other rock material.

Another method of providing temperature and pressure is the use of a press, as described more fully in the Examples. A suitable press, e.g., a platen press, may be used to provide pressure at the desired temperature (using heat supplied, e.g., by a flue gas or by other steps of the process to produce a precipitate, e.g., from an electrochemical process) for a desired time. A set of rollers may be used in similar fashion.

Another way to expose the cake to elevated temperature and pressure is by means of an extruder, e.g., a screw-type extruder, also described further in the Examples. The barrel of the extruder can be outfitted to achieve an elevated temperature, e.g., by jacketing; this elevated temperature can be supplied by, e.g., flue gases or the like. Extrusion may be used as a means of pre-heating and drying the feedstock prior to a pressing operation. Such pressing can be performed by means of a compression mold, via rollers, via rollers with shaped indentations (which can provide virtually any shape of aggregate desired), between a belt which provides compression as it travels, or any other convenient method. Alternatively, the extruder may be used to extrude material through a die, exposing the material to pressure as it is forced through the die, and giving any desired shape. In some embodiments, the carbonate mineral precipitate is mixed with fresh water and then placed into the feed section of a rotating screw extruder. The extruder and/or the exit die may be heated to further assist in the process. The turning of the screw conveys the material along its length and compresses it as the flite depth of the screw decreases. The screw and barrel of the extruder may further include vents in the barrel with decompression zones in the screw coincident with the barrel vent openings. Particularly in the case of a heated extruder, these vented areas allow for the release of steam from the conveyed mass, removing water from the material.

The screw conveyed material is then forced through a die section which further compresses the material and shapes it. Typical openings in the die can be circular, oval, square, rectangular, trapezoidal, etc., although any shape which the final aggregate is desired in could be made by adjusting the shape of the opening. The material exiting the die may be cut to any convenient length by any convenient method, such as by a fly knife. A typical length can be from 0.05 inches to 6 inches, although lengths outside those ranges are possible. Typical diameters can be 0.05 inches to 1.0 inches, though diameters outside of these ranges are possible.

Use of a heated die section may further assist in the formation of the aggregate by accelerating the transition of the carbonate mineral to a hard, stable form. Heated dies may also be used in the case of binders to harden or set the binder. Temperatures of 100° C. to 600° C. are commonly used in the heated die section. Heat for the heated die may come in whole or in part from the flue gas or other industrial gas used in the process of producing the precipitate, where the flue gas is first routed to the die to transfer heat from the hot flue gas to the die.

Without being bound by theory, it is thought that the above process induces artificial lithification, i.e., the formation of rock, through reformulation of the compounds in the original filter cake, into forms that bind to each other without the need for additional binders, and which remain together in a cohesive mass that is resistant to fracture or crushing. Thus, in some embodiments the invention provides methods of making a synthetic rock, e.g., an synthetic carbonate-containing rock, without the use of binders. The rock may be formed by, e.g., using methods such as the methods described above. In some embodiments only heat and pressure are used to form an artificial rock, where the rock has a hardness of at least 2.5 Mohs, or at least 3 Mohs, or 3-10 Mohs, or 3-8 Mohs, or 3-6 Mohs, or 2-6 Mohs.

Binders may be added to the carbonate mineral prior to aggregate formation to assist in holding the powdered material together, either to provide structural stability or to act to hold the powders in place while further processing takes place. Typical binders include, but are not limited to, portland cement, flyash, silica, citric acid, gum xantham, or combinations thereof. Binders include those which become relatively fluid during heating and reharden when cooled. These binders provide processing aids in extrusion as well as binding the mineral powders together. Examples of these binders include asphalt and thermoplastic polymers such as polyethylene. Other binders of interest are those which react chemically with themselves or with the mineral feedstock to form a matrix which encapsulates and binds the mineral feedstock. Examples of these binders include thermosetting resins, such as epoxy, phenolic or polyester, and reactive inorganic materials such as portland cement, flyash and lime. When a binder is used, any suitable percentage of binder may be used, depending on the properties of the mineral feedstock; in some embodiments, from 0.05% to 50% w/w may be used, such as 0.1% to 20%, or 0.5% to 10%, or 0.5% to 5%, or 0.5% to 2%.

Post-forming processing may include further moisture treatment, drying, sintering, or similar techniques designed to accelerate and complete any chemical reactions or morphological changes desired. Other post-processing techniques may include particle agglomeration or particle size reduction, such as by jaw-crushing or grinding. Particle sizes of aggregate may be further separated using any convenient sieve or filtering device. In some instances, the particle sizes of the aggregate may be uniform (i.e., relatively similar particle sizes) and in other instances, the particle sizes may vary greatly.

Aggregate of the invention produced by the formation techniques outlined above may vary greatly depending on the conditions to which it is subjected during formation. By controlling the size, shape, surface texture and internal cavity structure of the aggregate, desired properties may be engineered into the aggregate.

In some embodiments, aggregate of the invention may be processed into a shape which possesses a high aspect ratio, where its length is substantially longer than its width. By "substantially longer" is meant a range between 2 to 100 times longer, such as 5 to 50 times longer, including 5 to 10 times longer. Aggregate with high aspect ratios may improve concrete flow properties and aggregate interlock due to longitudinal alignment along its long axis. In some instances, aggregate of the invention may be in the shape of cylinder, tube or capsule (FIG. 3A). By "capsule" is meant a cylindrical tube with rounded edges. In other instances, aggregate of the invention are in the shape of a prism. The term "prism" is used in its conventional sense to mean a polyhedron made of an n-sided polygonal base, a translated copy, and n faces joining corresponding sides. The joining faces of the prism are parallelograms and all cross-sections parallel to the base faces are the same.

FIG. 3B depicts an example of a triangular (i.e., n=3) prism aggregate provided by the present invention. This aggregate can have high concrete flow properties while providing excellent aggregate interlock.

In some embodiments, aggregate of the invention may include a mixture of shapes and sizes. Aggregate mixtures may have shapes that include but are not limited to prisms (n=3 to 15), spherical, polygonal, cylindrical, triangular, curved shapes, annulus, ellipsoidal, oval, star shaped, disk shaped and any combination thereof. Depending on its intended use, the type and number of different shapes in the mixture may vary. The type and number of shapes in the mixture may be equally distributed or include some shapes at a higher percentage than others. In one embodiment, the aggregate mixture of the invention may be of different shapes but have particle sizes that vary only slightly. By "vary only slightly" is meant a deviation in particle sizes that does not exceed 0.05 inches in some embodiments, or 0.10 inches in some embodiments, or 0.20 inches in some embodiments. In another embodiment, the aggregate mixtures may be of different sizes, but possess similar or identical shapes (e.g., different sizes of triangular prism aggregate). In yet another embodiment, the aggregate mixture may vary in both shape and size. Also provided by the invention is an aggregate mixture that contain particles of identical shapes and sizes.

In an exemplary embodiment, aggregate mixtures of the invention comprise aggregate of both different shapes and different sizes. The void space between larger aggregate may be occupied by smaller aggregate reducing the overall space between aggregate particles. This allows for the production of a strong and durable aggregate base, reducing the amount cement content in roads or concretes. For example, an aggregate mixture may comprise spheres and "bridges" (FIG. 3C). Aggregate shaped as bridges can occupy the void space between spherical aggregate particles creating a densely packed aggregate mixture.

In another embodiment, aggregate mixtures of the invention comprise aggregate that produces a high level of open void space when employed in a concrete. These aggregates generally contain particles of similar size with shapes designed to produce open void space between the aggregate particles, increasing the porosity of packed aggregate beds. FIGS. 3D and 3E show exemplary aggregates in this category ("gap-graded spheres" and prisms, respectively). In certain embodiments, the open void space may be left unfilled to provide higher levels of porosity and liquid flow through material. In certain embodiments, the open space may be filled with cement to create a high cement content concrete or may also be filled with an unreactive filler. The void space created by a mixture comprising similar shapes of similar sizes may also be filled with polymeric material or other structural support features.

Aggregate of the invention may also be produced to have one or more connected open spaces along one or more axis of the aggregate particle. In some instances, such aggregate may be in the form of a hollow cylinder or a polyhedral prism that contains a tubular void space extending through the aggregate (see FIGS. 3F, 3G, and 3H). Such structures may be produced by extrusion, molding or creating the hole from a solid aggregate particle. The open space in the aggregate may be later filled (e.g., with cement, polymeric fibers, etc.) or may be left unfilled.

Another embodiment provided by the present invention is hollow aggregate. Hollow aggregate may have any shape (e.g., spherical, disk-shaped, polyhedral prism, etc.) and size while possessing one or more internal cavities that are substantially empty. By "substantially empty" is meant that the internal cavity contains a void space in the internal cavity that, in certain embodiments, ranges from 10% to 100% of the total volume of the internal cavity of the aggregate. The internal cavity of the aggregate may be porous with pockets of void space or may have a honeycomb-like structure.

Another embodiment provided by the present invention is aggregate that possess exterior grooves, which may facilitate the flow of any desired liquid through the packed aggregate bed. Exterior grooves may be, e.g., etched into smooth faced aggregate or may be produced by molding or extruding the aggregate. The types of grooves may vary, where in some instances the groove pattern may be regular (i.e., grooves in non-random intervals) or may be random. The grooves may also be produced straight across the surface of the aggregate or may have a curved pattern.

In an exemplary embodiment, the aggregate exterior grooves may form interlocking aggregate. Interlocking aggregate particles are shaped such that the exterior grooves of aggregate particles fit into the grooves of other aggregate particles. The interlock between particles may be tight (i.e., grooves closely fit reducing interparticle void space) or may be loose.

In an exemplary embodiment of the invention, a variety of aggregate shapes having different types of external grooves can be combined to make an aggregate that interlocks to form a smooth durable surface yet allow for passage of any desired fluid through the material. A well-graded (i.e., uniformly covering a wide variety of sizes) spherical aggregate having external grooves is one such embodiment. Additional embodiments may include aggregates having external grooves in a variety of shapes with open connected spaces through the center which allow fluid passage through the aggregate particle. In certain embodiments, one or more of the aggregate shapes include through holes (e.g., as described above) which facilitate liquid flow through the material. Exemplary aggregate mixtures having different combinations of aggregate particles are illustrated in FIGS. 3I, 3J, 3K, and 3L.

As indicated above, aggregate compositions of the subject invention comprise aggregate particles that have a wide variety of shapes and surface textures which can be selected based on the intended use of the aggregate (e.g., the desired property of the material in which the aggregate is used). Exemplary aggregate shapes include, but are not limited to: rounded, irregular, flaky, angular, elongated, flaky-elongated, subangular, subrounded, well rounded, polygonal, cylindrical, spherical, triangular, curved shapes, annulus, ellipsoidal, oval, star shaped, prisms, and any mixtures thereof. Exemplary aggregate surface textures include, but are not limited to surface textures that are selected from the group consisting of: glassy, smooth, granular, rough, grooved, crystalline, honeycombed and mixtures thereof.

FIG. 1 provides a schematic flow diagram of an aggregate production process according to an embodiment of the invention. In the embodiment depicted in FIG. 1, an aqueous solution of divalent cations (10) such as $Ca^{2+}$ or $Mg^{2+}$ is first charged with waste gas stream 30 to produce a precipitation reaction mixture comprising $CO_2$, which reaction mixture is then subjected to precipitation conditions. In some embodiments, the $CO_2$ charging and the precipitation may occur simultaneously, e.g., in a single piece of equipment. As depicted in FIG. 1, a waste gas stream 30 is contacted with divalent cations 10 at precipitation step 20. By charging an aqueous solution of divalent cations with waste gas components, components such as $CO_2$ combine with water molecules to produce, for example, carbonic acid, bicarbonate and carbonate ion. Likewise, waste gas components such as SOx and NOx form aqueous sulfur- and nitrogen-containing species. As such, charging water results in an increase in, for example, the $CO_2$ content of the water, manifested in the form of carbonic acid, bicarbonate and carbonate ion, which results in a concomitant decrease in the partial pressure of $CO_2$ in the waste stream that is contacted with the water. The precipitation reaction mixture may be acidic, having a pH of 6 or less, such as 5 or less, and including 4 or less; however, as described in further detail herein, the precipitation reaction mixture may be made basic (pH of 7 or more, for example, pH 8, 9, 10, 11, or 12) prior to charging the aqueous solution of divalent cations to form the precipitation reaction mixture. In certain embodiments, the concentration of $CO_2$ in the waste gas that is used to charge the water is 1% or higher, 2% or higher, 4% or higher, 8% or higher, 10% or higher, 11% or higher, 12% or higher, 13% or higher, 14% or higher, 15% or higher, 20% or higher, 25% or higher, including 50% or higher, such as 75% or even higher. In some embodiments, the waste gas comprises further components, such as sulfur oxides (SOx); nitrogen oxides (NOx); heavy metals such as mercury, cadmium, lead, selenium, and the like; radioactive substances; particulate matter; volatile organic constituents, and the like. One or more of these components may also go into solution to form an aqueous solution. For example, SOx may go into solution as sulfate and/or sulfite; NOx as nitrate and/or nitrite; mercury as mercuric chloride; etc. In some embodiments contacting conditions are adjusted so that, in addition to $CO_2$, further components of the waste gas are moved from the gas phase to the water phase, such as SOx and/or mercury, to be ultimately captured in the aggregates of the invention.

Contact protocols of interest include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, crosscurrent means, and the like. Thus, contact may be accomplished through use of infusers, bubblers, fluidic Venturi reactor, sparger, gas filter, spray, tray, or packed column reactors, and the like, as may be convenient. In one embodiment contact is via a crosscurrent contactor where the gas is flowed in a direction perpendicular to a flat sheet of water or other liquid. In one embodiment contact is between neutrally buoyant liquid droplets of solution, of a diameter of 5 micrometers or less, and gas in a chamber.

At precipitation step 20, carbonate and/or bicarbonate compounds are precipitated. Precipitation conditions of interest include those that change the physical environment of the water to produce the desired precipitate product. For example, the temperature of the water may be raised to an amount suitable for precipitation of the desired carbonate compound to occur. In such embodiments, the temperature of the water may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitate. In certain embodiments, the temperature is raised using energy generated from low or zero carbon dioxide emission sources, e.g., solar energy source, wind energy source, hydroelectric energy source, etc. In some embodiments the temperature is raised by exposure to the heat of the flue gas. While the pH of the water may range from 7 to 14 during a given precipitation process, in certain embodiments the pH is raised to alkaline levels in order to drive the precipitation of carbonate mineral as desired. In certain of these embodiments, the pH is raised to a level which minimizes if not eliminates $CO_2$ gas generation production during precipitation. In these embodiments, the pH may be raised to 10 or higher, such as 11 or higher. Where desired, the pH of the water is raised using any convenient approach. In certain embodiments, a pH raising agent may be employed, where examples of such agents include oxides, hydroxides (e.g., sodium hydroxide, potassium hydroxide, brucite), carbonates (e.g. sodium carbonate) and the like. The amount of pH elevating agent that is added to the saltwater source will depend on the particular nature of the agent and the volume of saltwater being modified, and will be sufficient to raise the pH of the salt water source to the desired value. Alternatively, the pH of the saltwater source can be raised to the desired level by electrolysis of the water.

$CO_2$ charging and carbonate mineral precipitation may occur in a continuous process or at separate steps. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

Amorphous silica in the aggregate product may be desired, for example, to improve hardness and durability of the aggregate product. Siliceous materials may be added to the aqueous solution of divalent cations prior to charging the water with waste gas such as combustion gas (e.g., gases comprising $CO_2$). In such embodiments, silica is added with a pH-raising agent, such as fly ash from the burning of coal. Due to the oxide content of fly ash (i.e., CaO), the addition of fly ash to an aqueous solution of divalent cations will substantially increase the pH, which will help dissolve the silica in the fly ash. When an alkaline solution of divalent cations with the dissolved silica is charged with waste gas comprising carbon dioxide, the carbon dioxide forms carbonic acid that quickly disassociates into carbonate ions. The presence of carbonate ions at a precipitation concentration allows carbonate compounds to form, which may simultaneously precipitate silica intercalated with the precipitation material.

Following production of precipitation material from the precipitation reaction mixture, the precipitation material is separated from the precipitation reaction mixture to produce separated precipitation material, as illustrated at step 40 of FIG. 1. Separation of precipitation material from the precipitation reaction mixture is achieved using any of a number of convenient approaches, including draining (e.g., gravitational sedimentation of the precipitation product followed by draining), decanting, filtering (e.g., gravity filtration, vacuum filtration, filtration using forced air), centrifuging, pressing, or any combination thereof. Separation of bulk water produces a wet, dewatered precipitation material.

The resulting dewatered precipitation material may then be optionally dried to produce a dried precipitation material, as illustrated at step 60 of FIG. 1. Drying may be achieved by air drying the precipitation material. Where the precipitation material is air dried, air drying may be at room or elevated temperature. In certain embodiments, the elevated temperature is provided by the industrial plant gaseous waste stream. In such embodiments, the gaseous waste stream (e.g., flue gas) from the power plant may be first used in the drying step, where the gaseous waste stream may have a temperature ranging from 30 to 700° C., such as 75 to 300° C. The gaseous waste stream may be contacted directly with the wet precipitation material in the drying stage, or used to indirectly heat gases (such as air) in the drying stage. The desired temperature may be provided in the gaseous waste stream by having the gas conveyer (e.g., duct) from the industrial plant originate at a suitable location, for example, at a location a certain distance in the heat recovery steam generator (HRSG) or up the flue, as determined based on the specifics of the exhaust gas and configuration of the industrial plant. In yet another embodiment, the precipitation material is spray dried to dry the precipitation material, wherein a slurry comprising the precipitation material is dried by feeding it through a hot gas (such as the gaseous waste stream from the power plant), for example, where the slurry is pumped through an atomizer into a main drying chamber and a hot gas is passed as a co-current or counter-current to the atomizer direction. In certain embodiments, drying is achieved by freeze-drying (i.e., lyophilization), where the precipitation material is frozen, the surrounding pressure is reduced and enough heat is added to allow the frozen water in the precipitation material to sublime. Depending on the particular drying protocol of the system, the drying station may include a filtration element, freeze drying structure, spray drying structure, etc.

Where desired, the dewatered precipitation material from the separation reactor 40 may be washed before drying, as illustrated at optional step 50 of FIG. 1. The precipitation material may be washed with freshwater, for example, to remove salts such as NaCl from the dewatered precipitation material. Used wash water may be disposed of as convenient, for example, by disposing of it in a tailings pond, an ocean, a sea, a lake, etc.

At step 70, the dried precipitation material is processed where necessary to provide the desired aggregate product. As reviewed above, this step may include contacting the precipitation material with fresh water (with or without drying it first) to produce a set product followed by mechanical processing of the set product to produce the desired aggregate.

In certain embodiments, a system is employed to perform the above methods, wherein such systems include those described below in greater detail.

B. Settable Compositions

Additional embodiments of the invention are settable compositions which include a hydraulic cement and $CO_2$ sequestering aggregate of the invention; with the addition of an aqueous fluid, e.g., water, the composition sets and hardens, e.g., into a concrete or a mortar. The term "hydraulic cement" includes its conventional sense to refer to a composition which sets and hardens after combining with water or a solution where the solvent is water. e.g. an admixture solution. Setting and hardening of the product produced by combination of the cements of the invention with an aqueous liquid results from the production of hydrates that are formed from the cement upon reaction with water, where the hydrates are essentially insoluble in water.

Aggregates of the invention find use in place of conventional natural rock aggregates used in conventional concrete when combined with pure portland cement. Other hydraulic cements of interest in certain embodiments are portland cement blends. The phrase "portland cement blend" includes a hydraulic cement composition that includes a portland cement component and significant amount of a non-portland cement component. As the cements of the invention are portland cement blends, the cements include a portland cement component. The portland cement component may be any convenient portland cement. As is known in the art, portland cements are powder compositions produced by grinding portland cement clinker (more than 90%), a limited amount of calcium sulfate which controls the set time, and up to 5% minor constituents (as allowed by various standards). When the exhaust gases used to provide carbon dioxide for the reaction contain SOx, then sufficient sulphate may be present as calcium sulfate in the precipitated material, either as a cement or aggregate to offset the need for additional calcium sulfate. As defined by the European Standard EN197.1, "portland cement clinker is a hydraulic material which shall consist of at least two-thirds by mass of calcium silicates ($3CaO.SiO_2$ and $2CaO.SiO_2$), the remainder consisting of aluminium- and iron-containing clinker phases and other compounds. The ratio of CaO to $SiO_2$ shall not be less than 2.0. The magnesium content (MgO) shall not exceed 5.0% by mass." The concern about MgO is that later in the setting reaction, magnesium hydroxide, brucite, may form, leading to the deformation and weakening and cracking of the cement. In the case of magnesium carbonate containing cements, brucite will not form as it may with MgO. In certain embodiments, the portland cement constituent of the present invention is any Portland cement that satisfies the ASTM Standards and Specifications of C150 (Types I-VIII) of the American Society for Testing of Materials (ASTM C50-Standard Specification for Portland Cement). ASTM C150 covers eight types of portland cement, each possessing different properties, and used specifically for those properties.

Also of interest as hydraulic cements are carbonate containing hydraulic cements. Such carbonate containing hydraulic cements, methods for their manufacture and use are described in co-pending U.S. patent application Ser. No. 12/126,776 filed on May 23, 2008; the disclosure of which applications are herein incorporated by reference.

In certain embodiments, the hydraulic cement may be a blend of two or more different kinds of hydraulic cements, such as Portland cement and a carbonate containing hydraulic cement. In certain embodiments, the amount of a first cement, e.g., Portland cement in the blend ranges from 10 to 90% (w/w), such as 30 to 70% (w/w) and including 40 to 60% (w/w), e.g., a blend of 80% OPC and 20% carbonate hydraulic cement.

Settable compositions of the invention, such as concretes and mortars, are produced by combining the hydraulic cement with an amount of aggregate (fine for mortar, e.g., sand; coarse with or without fine for concrete) and water, either at the same time or by pre-combining the cement with aggregate, and then combining the resultant dry components with water. The choice of coarse aggregate material for concrete mixes using cement compositions of the invention may have a minimum size of about ⅜ inch and can vary in size from that minimum up to one inch or larger, including in gradations between these limits. Finely divided aggregate is smaller than ⅜ inch in size and again may be graduated in much finer sizes down to 200-sieve size or so. Fine aggregates may be present in both mortars and concretes of the invention. The weight ratio of cement to aggregate in the dry components of the cement may vary, and in certain embodiments ranges from 1:10 to 4:10, such as 2:10 to 5:10 and including from 55:1000 to 70:100.

The liquid phase, e.g., aqueous fluid, with which the dry component is combined to produce the settable composition, e.g., concrete, may vary, from pure water to water that includes one or more solutes, additives, co-solvents, etc., as desired. The ratio of dry component to liquid phase that is combined in preparing the settable composition may vary, and in certain embodiments ranges from 2:10 to 7:10, such as 3:10 to 6:10 and including 4:10 to 6:10.

In certain embodiments, the cements may be employed with one or more admixtures. Admixtures are compositions added to concrete to provide it with desirable characteristics that are not obtainable with basic concrete mixtures or to modify properties of the concrete to make it more readily useable or more suitable for a particular purpose or for cost reduction. As is known in the art, an admixture is any material or composition, other than the hydraulic cement, aggregate and water, that is used as a component of the concrete or mortar to enhance some characteristic, or lower the cost, thereof. The amount of admixture that is employed may vary depending on the nature of the admixture. In certain embodiments the amounts of these components range from 1 to 50% w/w, such as 2 to 10% w/w.

Admixtures of interest include finely divided mineral admixtures such as cementitious materials; pozzolans; pozzolanic and cementitious materials; and nominally inert materials. Pozzolans include diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Nominally inert materials can also include finely divided raw quartz, dolomites, limestone, marble, granite, and others. Fly ash is defined in ASTM C618.

Other types of admixture of interest include plasticizers, accelerators, retarders, air-entrainers, foaming agents, water reducers, corrosion inhibitors, and pigments.

As such, admixtures of interest include, but are not limited to: set accelerators, set retarders, air-entraining agents, defoamers, alkali-reactivity reducers, bonding admixtures, dispersants, coloring admixtures, corrosion inhibitors, dampproofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. Admixtures are well-known in the art and any suitable admixture of the above type or any other desired type may be used; see, e.g., U.S. patent application Ser. No. 12/126,776, incorporated herein by reference in its entirety.

In certain embodiments, settable compositions of the invention include a cement employed with fibers, e.g., where one desires fiber-reinforced concrete. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

The components of the settable composition can be combined using any convenient protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

Following the combination of the components to produce a settable composition (e.g., concrete), the settable composition will set after a given period of time. The setting time may vary, and in certain embodiments ranges from 30 minutes to 48 hours, such as 30 minutes to 24 hours and including from 1 hour to 4 hours.

The strength of the set product may also vary. In certain embodiments, the strength of the set cement may range from 5 Mpa to 70 MPa, such as 10 MPa to 50 MPa and including from 20 MPa to 40 MPa. In certain embodiments, set products produced from cements of the invention are extremely durable. e.g., as determined using the test method described at ASTM C1157.

Aspects of the invention further include structures produced from the aggregates and settable compositions of the invention. Because these structures are produced from aggregates and/or settable compositions of the invention, they will include markers or components that identify them as being obtained from a water precipitated carbonate compound composition, such as trace amounts of various elements present in the initial salt water source, e.g., as described above. For example, where the mineral component of the aggregate component of the concrete is one that has been produced from sea water, the set product will contain a seawater marker profile of different elements in identifying amounts, such as magnesium, potassium, sulfur, boron, sodium, and chloride, etc.

C. Structures

Further embodiments include manmade structures that contain the aggregates of the invention and methods of their manufacture. Thus in some embodiments the invention provides a manmade structure that includes one or more aggregates as described herein. The manmade structure may be any structure in which an aggregate may be used, such as a building, dam, levee, roadways or any other manmade structure that incoroporates an aggregate or rock. The aggregate may be a carbon dioxide sequestering aggregate, an aggregate with a $\delta^{13}C$ more negative than negative –10‰, and the like, or any aggregate described herein.

In some embodiments, the invention provides a manmade structure, e.g. a building, a dam, or a roadway, that includes an aggregate that contains $CO_2$ from a fossil fuel source, e.g., aggregate that is at least 10% w/w $CO_2$ from a fossil fuel source, or at least 20% $CO_2$ from a fossil fuel source, or at least 30% $CO_2$ from a fossil fuel source. In some cases the aggregate has a $\delta^{13}C$ value more negative than –10‰, or more negative than –20‰. In some embodiments the invention provides a manmade structure, e.g. a building, a dam, or a roadway, containing aggregate, where a portion or all of the aggregate is a lightweight aggregate, e.g., an aggregate that has a density of 90-115 lb/ft3, and where the aggregate contains $CO_2$ from a fossil fuel source, e.g., aggregate that is at least 10% w/w $CO_2$ from a fossil fuel source, or at least 20% $CO_2$ from a fossil fuel source, or at least 30% $CO_2$ from a fossil fuel source. In some cases the aggregate has a $\delta^{13}C$ value more negative than –10‰, or more negative than –20‰.

In some embodiments the invention provides a method of manufacturing a structure, comprising providing an aggregate that contains $CO_2$ from a fossil fuel source, e.g., aggregate that is at least 10% w/w $CO_2$ from a fossil fuel source, or at least 20% $CO_2$ from a fossil fuel source, or at least 30% $CO_2$ from a fossil fuel source. In some cases the aggregate has a $\delta^{13}C$ value more negative than –10‰, or more negative than –20‰ and manufacturing at least a portion of the structure using the aggregate. In some embodiments at least a portion of the aggregate is a lightweight aggregate, e.g., an aggregate that has a density of 90-115 lb/ft$^3$.

1. Roadways

In some embodiments the invention provides a roadway that includes one or more of the aggregates of the invention, or a component of a roadway that includes one or more of the aggregates of the invention, and methods and systems for manufacturing such roadways and/or components. In some embodiments the invention provides a carbon dioxide-sequestering roadway, that is, a roadway that is built with components, which may include one or more aggregates of the invention, whose overall manufacture results in sequestration of carbon dioxide, e.g., from an industrial source; in some embodiments the invention provides a roadway for which the amount of carbon dioxide produced in manufacturing the roadway is less than the amount of carbon dioxide sequestered within the material of the roadway, which may include aggregates of the invention, carbon-dioxide-sequestering cements, forms, and other components, i.e., a carbon-negative roadway.

The term "roadway" is used herein to include a general class of surfaces used for conveyance and recreation. It includes pavements used by motorized vehicles, animal and pedestrian traffic, bicycles and any other conveyance used either singly or as a group. Roadways of the invention may include but are not limited to roads, sidewalks, bridge surfaces, bicycle paths, paved walking paths and the like, as described in further detail below. Roadways include structures as simple as gravel roads, which may be a single layer, as well as asphalt- and concrete-paved roadways, which typically contain two or more layers.

In some embodiments the invention provides a roadway that includes a $CO_2$-sequestering aggregate, such as an aggregate that contains $CO_2$ derived from a industrial waste gas source, such as any of the $CO_2$-sequestering aggregates described herein. In some embodiments the roadway includes an aggregate that comprises a synthetic carbonate. In some embodiments, the roadway includes an aggregate that has a $\delta^{13}C$ value less than –15‰, or less than –20‰, or less than –25‰. In some embodiments the roadway includes an aggregate that contains dypinginite, nesquehonite, magnesite, or a combination of one or more of these.

The aggregate of the above embodiments may be used in one or more components of the roadway, as described in further detail below. The aggregate may make up more than 1, 2, 5, 10, 20, 30, 40, 50, 60, 70, 80, or 90% of the roadway, e.g., more than 20%, or more than 50%, by weight.

In some embodiments, the roadway is a highway, highways system, city street, airport runway, sidewalk, or open-space pavement. A highway includes a main road intended for travel by the public between important destinations, such as cities and towns. An interconnected set of highways can be variously referred to as a "highway system", a "highway network" or a "highway transportation system". A city street includes any public thoroughfare that is a parcel of land adjoining buildings on which people may move about. City streets of the invention refer to those roadways that are primarily used for vehicular traffic but do not experience the high of volume of traffic as a highway, but accommodate higher applied loads than sidewalks. Another exemplary roadway structure provided by the present invention is an airport runway. A runway includes a strip of land on an airport, on which aircraft can take off and land, and may also include blast pads, which are overrun areas or stopways at the ends of a runway as well as thresholds which are used for airplane taxiing, takeoff and landing rollout. Sidewalk includes the paved surface conventionally found alongside roadways for vehicular traffic. Sidewalks of the present invention may include any paved roadway primarily employed for pedestrian traffic including cobblestone pavements, brick paved roads as well as paved walkways that run along beaches (i.e., beach paths), inside parks and between residential and commercial buildings. Sidewalks of the invention may also include bicycle paths and other roadways designed for non-vehicular and/or animal traffic. An open-space pavement may be a plot of land of any size or shape which has been paved so that it may be used for a multitude of different purposes. For example, an open-space pavement may be a playground, a sports recreation surface (e.g., basketball court, rollerskating rink), a parking lot and the like. The paved surface may be the foundation for temporary buildings or storage facilities. The open-space pavement may be constructed depending upon the applied load and the thickness of each layer may vary considerably.

The invention also provides a roadway containing material that sequesters at least 1, 5, 10, 50, 100, 500, 1000, 2000, 3000, 4000, 5000, 6000, 7000, 8000, 9000, or 10,000 tons of $CO_2$ per lane mile of roadway. In some embodiments, the roadway is at least 10, 100, 1000 10,000 feet long, or at least 3, 5, 10, 50, or 100 miles long. The material may be any material, e.g., the aggregates as described herein, that is produced in a manmade process so that $CO_2$ from an industrial source is trapped within the material, e.g., by chemical reaction to produce stable precipitates, and will remain in the material under ordinary conditions of use to the desired degree, or when subjected to specific tests, such as temperature, acid, and/or base stability, as described elsewhere herein. For example, a one-lane road 15 feet wide, with a base course of 18 inches deep that contains aggregates, some or all of which is an aggregate of embodiments of the invention, with a bulk density of 100 lb/ft³ contains approximately 2250 pounds of aggregate per linear foot of roadway, or approximately 1.1 ton per linear foot, and thus approx 5,500 tons per lane mile. If the aggregate, overall, sequesters only 1% of its weight as $CO_2$, the roadway will contain material sequestering 55 tons of $CO_2$ per lane mile. If it sequesters 50% of its weight as $CO_2$ (e.g., if essentially all of the aggregate is $CO_2$-aggregate according to some embodiments of the invention) then the roadway will contain material sequestering at least 2750 tons of $CO_2$ per lane mile. A roadway with a deeper base course would have correspondingly more aggregate and one with a shallower base course, less. This calculation, assuming aggregate as the $CO_2$-sequestering component, is merely a simple example to illustrate the principle. Other components of the roadway may also contain $CO_2$-sequestering material, such as the surface cement or asphalt, other layers of the roadway, and the like. It can easily be calculated how much $CO_2$ is sequestered per lane mile of a roadway. To verify that a material is a $CO_2$-sequestering material, e.g., a material containing carbon dioxide originating in the combustion of fossil fuel, tests such as isotope measurements (e.g., measurement of $\delta^{13}C$ values) and carbon coulometry may be used; any other suitable measurement may also be used.

The invention also provides a carbon-negative roadway, where "carbon-negative" has the meaning as used herein. In some embodiments, the roadway is at least 10, 100, 1000 10,000 feet long, or at least 3, 5, 10, 50, or 100 miles long. In some instances the roadway is at least 5% carbon negative, or at least 10% carbon negative, or at least 20% carbon negative, or at least 30% carbon negative, or at least 40% carbon negative, or at least 50% carbon negative, or at least 60% carbon negative, or at least 70% carbon negative, or at least 80% carbon negative, or at least 90% carbon negative.

Roadways are made from various components and the invention also provides one or more of the components of a roadway. "Roadway component" includes any component (e.g., structural component) used in the construction of a roadway. In certain embodiments, the roadway component may be an aggregate, a binder, a soil stabilizer, a concrete, a formed material, or asphalt. In certain other embodiments, the roadway component may be a settable composition such as cement, concrete or formed building material (e.g., brick). In some embodiments the roadway component comprises a $CO_2$ sequestering aggregate, such as that described for use in the aggregates of the invention, or a carbonate with a $\delta^{13}C$ value of less than −15‰ or −20‰. Depending on the particular type and size of roadway structure to be constructed and its geographical location, the amount of the carbonate that is present in a roadway component of the roadway may vary. In certain embodiments, the amount of the carbonate in a roadway component can range from 1 to 100% w/w, such as from 5 to 99% w/w including from 10 to 90%, or from 15 to 50%, or 30% to 70%, or 50% to 80%, or 60-90%, or 70-100%, or 70-99%. In producing the roadway component, an amount of the carbonate component is combined with water and other additional components, which include, but are not limited to: clay, shale, soft slate, calcium silicate, quarried stone, Portland cement, fly ash, slag cement, binder, aggregate (e.g., blast furnace slag, bottom ash, gravel, limestone, granite, sand, etc.), silica fume, silicate and pozzolans. Synthetic carbonate production protocols of interest include, but are not limited to, those disclosed in U.S. patent application Ser. Nos. 12/126,776; 12/163,205; and 12/344,019 as well as pending U.S. Provisional Patent Application Ser. Nos. 61/017,405; 61/017,419; 61/057,173; 61/056,972; 61/073,319; 61/079,790; 61/081,299; 61/082,766; 61/088,347; 61/088,340; 61/101,629; and 61/101,631; the disclosures of which are herein incorporated by reference. Synthetic carbonate employed in roadway components and roadways of the invention may be produced by precipitating a calcium and/or magnesium carbonate composition from a water, as described elsewhere herein.

In some embodiments, the roadway component is an asphalt product. The term "asphalt" (i.e., bitumen) is used in its conventional sense to include the natural or manufactured black or dark-colored solid, semisolid or viscous material composed mainly of high molecular weight hydrocarbons derived from a cut in petroleum distillation after naptha, gasoline, kerosene and other fractions have been removed from crude oil. Thus the invention provides an asphalt product that includes asphalt and an aggregate as described herein. The amount of aggregate in the roadway asphalt products of the present invention may vary greatly. It may range from 5 to 50%, including 10 to 40%, such as 25 to 35%. $CO_2$ sequestering asphalt, the methods and systems for producing them are further described in U.S. Provisional Applications 61/110, 495, filed on Oct. 31, 2008 and 61/149,949 filed on Feb. 9, 2009 the disclosure of which is herein incorporated by reference.

In other embodiments, the roadway component is a soil stabilizer. By "soil stabilizer" is meant a composition used to improve the stability and structural integrity (i.e., maintains its shape) of a soil. $CO_2$ sequestering soil stabilizers, the methods and systems of producing them are further described in U.S. Provisional Application 61/149,633, filed on Feb. 3, 2009 the disclosure of which is herein incorporated by reference.

In other embodiments, the roadway component is a formed building material. By "formed" is meant shaped, e.g., molded, cast, cut or otherwise produced, into a man-made structure with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. $CO_2$ sequestering formed building materials, the method and systems for producing them are further described in U.S. Provisional Application 61/149,610, filed on Feb. 3, 2009 the disclosure of which is herein incorporated by reference.

As indicated above, roadways of the present invention may include one or more roadway layer. By way of example, a roadway, e.g., $CO_2$ sequestering roadway or carbon negative roadway of the invention, may include one or more of a sub-grade layer, a sub-base layer, a base course layer and a surface layer (as those terms are understood by those of skill in the art; equivalent terms may be substituted if the meaning is substantially the same). It will be appreciated that the composition of these layers determines the type of material that may be used in them. For example, when aggregates of the invention are used in one or more of the layers, if there is no rebar or other corrosion-prone materials, the aggregate may be an aggregate with virtually any leachable chloride content that does not detract from the strength and durability properties of the aggregate. Thus, aggregates of the invention that are produced from waters containing high amounts of chloride, such as seawater or brine, do not necessarily have to be processed, or only minimally processed, to remove chloride if the aggregate is to be used in an appropriate layer of a roadway. In addition, in some embodiments the invention provides one or more of the layers as containing aggregate in which a portion or all of the aggregate is reactive aggregate. Unlike in conventional structures, reactive aggregate may be an advantage in roadways because in reacting the aggregate provides a stronger bond between particles and thus a more durable layer. A roadway layer such as a base course layer, in which the aggregate is loose, allows for reactive aggregate that forms an expansive gel, so long as the expansion does not exceed the void space.

Methods for producing roadway, e.g., $CO_2$ sequestering roadways include the construction of any part of one or more of these layers. As such, methods for constructing roadway, e.g., $CO_2$ sequestering roadways according to aspects of the present invention include constructing a new roadway, replacing a previously-constructed roadway, or repairing/improving any portion of a previously-constructed roadway. In other embodiments, the roadway, e.g., $CO_2$ sequestering roadways may be a full depth reclamation. In yet other embodiments, roadways of the invention may be resurfacing (i.e., overlay) of only the top layer.

The bottom layer of a roadway can be the subgrade layer. In preparing the subgrade, the first step may include a soil stabilization step. The underlying subgrade soil may also be stabilized using the roadway soil stabilizer component of the present invention. The subgrade soil should be blended with the roadway soil stabilizer component so as to give a uniform composition. Depending upon the desired properties (e.g., load-bearing capacity, frost resistance), the subgrade may be further mixed with other roadway components described above (e.g., cementitious materials) to provide increased stabilization. The subgrade may also be treated with herbicides to prevent or retard the growth of vegetation which may affect the long-term structural integrity of the subgrade.

Following final compaction, a primecoat may be added to the surface of the graded subgrade. In general, if the final roadway surface is less than 100 mm in thickness, a primecoat should be added to the subgrade layer. An exemplary primecoat employed in present invention include an emulsified asphalt product comprising an amount of an aggregate of the invention, e.g., a $CO_2$ sequestering synthetic carbonate described above.

The second layer of a roadway can be the sub-base layer. The sub-base layer is situated above the subgrade and functions primarily for structural support of the overlying base and surface layers. In some embodiments, the sub-base may be of minimum thickness or altogether absent, depending upon the final desired load-bearing capacity of the roadway. Since the purpose of a stable sub-base is to provide even distribution of the traffic load on the underlying subgrade, suitable sub-base materials employed are those that are able to evenly distribute the applied load.

In some embodiments, sub-base may comprise unbound granular materials. By "unbound granular materials" is meant those which do not bond or adhere to each other when laid and compacted but rely on the natural interlocking of adjacent particles. The proportion of fine and coarse particles in unbound granular materials will depend upon the desired load-bearing capacity of the roadway. Therefore, the particle sizes of unbound granular material in the sub-base may vary greatly, ranging from 0.05 mm to 25 mm, although they should not to exceed 37.5 mm. In some instances, unbound granular material may be a non-reactive aggregate comprising a $CO_2$ sequestering synthetic carbonate. The aggregate component may be produced, as described above, by crushing a settable composition or may be a molded aggregate that possesses a shape suitable for interlocking with adjacent aggregate particles (e.g., star shaped).

In other embodiments, the sub-base may comprise bound material. Bound materials are those which bond with neighboring particles by means of a binder. By "binder" is meant a component that is able to substantially set or adjoin adjacent particles. In some instances of the present invention, the binder is an asphalt product comprising a $CO_2$ sequestering synthetic carbonate. In other instances, the binder may be a cement comprising a $CO_2$ sequestering synthetic carbonate. In some embodiments, the sub-base comprises a reactive aggregate. By employing a reactive aggregate, a stabilized matrix between aggregate particles is formed which allows the sub-base to minimize the intrusion of fines from the sub-grade into the roadway structure and minimize frost action damage. In some embodiments, water may be added to the composition to provide optimum moisture content and material uniformity. After an appropriate thickness of sub-base material is laid, the sub-base may be compacted in the same manner as described above for the subgrade.

In some embodiments, the sub-base may comprise a pre-cast concrete slab. The concrete may be prepared by mixing and molding an amount of the $CO_2$ sequestering synthetic carbonate and a cementitious component such as Portland cement in addition to other supplementary cementitious materials as described above. The concrete slab may also employ reinforcing materials, such as a steel rebar structure or aluminum wire mesh.

Another layer of a roadway, provided by the present invention is the base course layer. The base course is situated immediately below the surface layer and contributes additional load distribution, drainage and frost resistance and provides a stable platform for construction equipment. Base course layers of the present invention may be comprised substantially of the aggregate as described above for the sub-base. Aggregate comprising a $CO_2$ sequestering synthetic carbonate is preferred especially in instances where sub-surface drainage problems may exist in the roadbed, in areas where the roadbed soil is unstable, in areas where unsuitable materials have been removed or under full depth flexible roadways. In some embodiments, the aggregate base course comprises a mixture of reactive aggregate and non reactive aggregate. The proportion of reactive aggregate in the mixture may vary, ranging from 5 to 25%, including 5 to 15%, such as 10%. The aggregate composition may also include an amount of a cementitious component. The amount of cementitious component added varies depending upon the type of roadway, ranging from 1 to 20% by weight of the base course, including 1 to 10%, such as 5%. The base course may be further prepared by employing and mixing in a dense-graded or permeable hot mix asphalt.

The top layer provided by the invention of roadways is the surface layer. The surface course is the layer situated immediately above the base course and is in contact with traffic loads. The surface layer should be constructed such that it provides characteristics such as friction, smoothness, noise control and drainage. In addition, the surface layer serves as a waterproofing layer to the underlying base, sub-base and subgrade. The surface layer may be constructed in two separate stages to prepare its two layers—the wearing course and the binder course. The wearing course is the layer in direct contact with traffic loads. It is meant to take the brunt of traffic wear and can be removed and replaced as it becomes worn. The binder course is the bulk of the surface layer structure and serves to distribute the overlying traffic load.

In some embodiments, the surface course provided by the invention is comprised substantially of aggregate, of which a portion or all is aggregate of the invention, and asphalt binder. In addition, an amount of aggregate of the invention may be further employed in powdered form as a mineral filler. The amount of asphalt binder used in the surface course may vary, ranging from 5 to 50%, including 5 to 40%, such as 5 to 35%. The particle sizes of the aggregate used in the surface layer may vary, ranging from 50 mm to 15 mm, including 100 mm to 12.5 mm, such as 75 mm to 10 mm. The surface course layer is prepared by mixing the aggregate and mineral filler with hot asphalt binder until all of the aggregate and mineral filler material is fully coated. The asphalt coated aggregate material may then be spread onto the surface of the base course such that it produces a smooth, uniform layer. Additional asphalt binder may be employed to fill in any void space or grading changes along the surface. The surface course is then compacted at a high temperature. By "high temperature" is meant a temperature not lower than 125° C.

In other embodiments, the surface layer may be a rigid, formed paved concrete surface as described above. In instances where the surface layer is a concrete slab, the surface may be treated with chemical admixtures to improve frost resistance, moisture damage and stripping damage. A rigid concrete surface layer may be employed in roadways used primarily for pedestrian traffic or for lighter applied loads.

Roadways components comprising a $CO_2$ sequestering synthetic carbonate find use in a variety of different applications. Specific roadway structures in which the roadway component compositions of the invention find use include, but are not limited to: highways, sidewalks, bicycle paths, beachfront paths, airport runways, city streets, cobblestone roads, parking lots, rollerskating rinks and any other paved plot of land.

In some embodiments the invention provides a method comprising:

constructing a roadway comprising a $CO_2$ sequestering component comprising a synthetic carbonate. In some embodiments the invention provides a method comprising: constructing a roadway comprising an aggregate where the aggregate has a $\delta^{13}C$ value more negative than –10‰, or, in some embodiments, more negative than –20‰. The aggregate may make up more than 10, 20, 30, 40, 50, 60, 70, 80, or 90% of the roadway.

In some embodiments the invention provides a method of producing a roadway component, the method comprising: obtaining a $CO_2$ sequestering synthetic carbonate; and producing a roadway component comprising the $CO_2$ sequestering synthetic carbonate. The roadway component may be, e.g., an aggregate, a cement, a blended cement, an asphalt, a soil stabilizer, a concrete, a binder, a formed material (brick, stone slab) a settable composition. In some embodiments the invention provides a method of producing a roadway component, the method comprising: obtaining a synthetic carbonate where the carbonate has a δ13C value more negative than –10, or, in some embodiments, more negative than –20; and producing a roadway component comprising the $CO_2$ sequestering synthetic carbonate. The roadway component may be, e.g., an aggregate, a cement, a blended cement, an asphalt, a soil stabilizer, a concrete, a binder, a formed material (brick, stone slab) a settable composition.

In some embodiments the invention provides a system for producing a roadway component comprising a $CO_2$ sequestering synthetic carbonate, the system comprising: an input for an alkaline-earth-metal-containing water; carbonate compound precipitation station that subjects the water to carbonate compound precipitation conditions and produces a $CO_2$ sequestering synthetic carbonate; and a roadway component producer for producing the roadway component comprising the $CO_2$ sequestering synthetic carbonate. In some embodiments the invention provides a system for producing a roadway component comprising a synthetic carbonate where the carbonate has a $\delta^{13}C$ value more negative than –10‰, or, in some embodiments, more negative than –20‰, the system comprising: an input for an alkaline-earth-metal-containing water; carbonate compound precipitation station that subjects the water to carbonate compound precipitation conditions and produces a synthetic carbonate where the carbonate has a $\delta^{13}C$ value more negative than –10‰, or, in some embodiments, more negative than –20‰; and a roadway component producer for producing the roadway component comprising the synthetic carbonate where the carbonate has a $\delta^{13}C$ value more negative than –10‰, or, in some embodiments, more negative than –20‰.

In some embodiments the invention provides a method of sequestering $CO_2$, the method comprising: contacting an alkaline-earth-metal-ion containing water to a gaseous industrial waste stream comprising $CO_2$; precipitating a $CO_2$ sequestering synthetic carbonate from the alkaline-earth-metal-ion containing water, wherein the synthetic carbonate comprises $CO_2$ derived from the gaseous industrial waste stream; and producing a roadway component comprising the $CO_2$ sequestering synthetic carbonate. In some embodiments the invention provides a method of sequestering $CO_2$, the method comprising: contacting an alkaline-earth-metal-ion containing water to a gaseous industrial waste stream comprising $CO_2$; precipitating a synthetic carbonate where the carbonate has a $\delta^{13}C$ value more negative than –10‰, or, in some embodiments, more negative than –20‰ from the alkaline-earth-metal-ion containing water, wherein the synthetic carbonate comprises $CO_2$ derived from the gaseous industrial waste stream; and producing a roadway component comprising the synthetic carbonate where the carbonate has a $\delta^{13}C$ value more negative than –10‰, or, in some embodiments, more negative than –20‰.

In some embodiments the invention provides a method of producing a carbon sequestration tradable commodity, the method comprising: producing a roadway component comprising a $CO_2$ sequestering synthetic carbonate compound; determining a quantified amount of $CO_2$ sequestered in the roadway component; and producing a carbon sequestration tradable commodity based on the determined quantified amount.

In some embodiments the invention provides a method of obtaining a carbon sequestration tradable commodity, the method comprising: (a) generating $CO_2$; (b) forwarding the $CO_2$ to a $CO_2$ sequesterer that: (i) produces a roadway component comprising a $CO_2$ sequestering synthetic carbonate compound; (ii) determines a quantified amount of $CO_2$ sequestered in the roadway component; and (iii) produces a carbon sequestration tradable commodity based on the determined quantified amount; and (c) receiving the carbon sequestration tradable commodity from the $CO_2$ sequesterer.

III. Methods

The methods of the invention include methods of manufacturing aggregate, methods of sequestering $CO_2$ through manufacturing aggregate, the production of sets of aggregate to a predetermined set of characteristics, methods of making settable compositions, methods of making structures that include the aggregates of the invention, and business methods.

A. Methods of Manufacturing Aggregate.

In some embodiments the invention provides methods of manufacturing aggregate. In one embodiment, the invention provides a method of manufacturing aggregate by dissolving carbon dioxide from an industrial waste stream in an aqueous solution and precipitating one or more carbonate compounds from the aqueous solution, dewatering the precipitate, and in some embodiments further treating the dewatered precipitate to produce an aggregate. The industrial waste stream may be any suitable waste stream, as described herein. In some embodiments the industrial waste stream is the flue gas from a coal-fired power plant. Contacting may be by any suitable apparatus and procedure, also as described herein, such as by a flat jet contactor, or by aerosol contact. In some embodiments the CO2 in the industrial waste stream is contacted with the aqueous solution using a flat stream contactor as described herein. Protons are removed from the aqueous solution containing the dissolved CO2 (and bicarbonate and carbonate, as dictated by pH) by any convenient means, also as described further herein; in some embodiments protons are removed by an electrochemical system that may be used to produce base for proton removal, or may be used to directly remove protons (e.g., by contact with the solution in which the $CO_2$ is dissolved); for further description see this application and U.S. patent application Ser. Nos. 12/344,019 and 12/375,632. The composition of the precipitate depends on the composition of the aqueous solution; the aqueous solution contains divalent cations, e.g., magnesium and/or calcium, which may be from one or more of a variety of sources, including seawater, brines such as geologic brines, minerals such as minerals, e.g., serpentine, olivine, and the like, flyash, slag, other industrial waste such as red mud from bauxite refining. Thus the calcium/magnesium ratio in the precipitate may vary and may be one of the ratios described herein, such as 5/1 to 1/5, or 1/1 to 1/10, or 100/1 to 10/1, or any other ratio depending on the material used in the aqueous solution. The precipitate contains calcium and/or magnesium carbonates and may, in addition, contain other components of the industrial waste gas contained in the precipitate, as described herein, e.g., sulfates or sulfites, precipitated nitrogen-containing compounds, heavy metals such as mercury, and others as disclosed herein. In some embodiments the precipitate is dewatered. Further treatment can include treatment by elevated temperature and/or pressure, as described elsewhere herein, e.g., by means of platen press, or by extrusion. The dewatered precipitate in some embodiments is further dried, then water is added back to the desired percentage, e.g., to 1-20%, or 1-10%, or 3-7% w/w. In some embodiments the dewatered precipitate, optionally dried and reconstituted, is treated by being sent through an extrusion press, which may produce aggregate of virtually any desired shape and size, as described further herein. In some embodiments the dewatered precipitate, optionally dried and reconstituted, is treated by being pressing in a platen press, which may produce shaped aggregate or "plates" of aggregate that may be further treated. The dewatered precipitate in some embodiments is subjected to high pressure, e.g., 2000-6000 psi, or even 2000-20,000 psi, for suitable time, e.g., 0.1-minute to 100 minutes, or 1-20 minutes, or 1-10 minutes, and at suitable temperature, e.g., 50-150° C., or 70-120° C., or 80-100° C. In some embodiments the product so formed is used as is. In some embodiments, the product contains carbonate and has a $\delta^{13}C$ more negative than −10‰, or more negative than −15‰, or more negative than −20‰, or more negative than −25‰. In other embodiments the product is further treated, e.g., through crushing, grinding, and the like. In some embodiments, the methods further include combining the aggregate so produced in a settable composition.

In some embodiments the invention provides a method of producing an aggregate comprising a synthetic carbonate by obtaining a synthetic carbonate; and producing an aggregate comprising the synthetic carbonate. Any suitable method, such as those described herein, may be used to obtain the synthetic carbonate as long as it is suitable for use in an aggregate. In some embodiments, the synthetic carbonate comprises sequestered $CO_2$. In some embodiments, the synthetic carbonate has a $\delta^{13}C$ more negative than −10‰, or more negative than −15‰, or more negative than −20‰, or more negative than −25‰. The obtaining step may comprise precipitating the synthetic carbonate from an alkaline-earth-metal-ion containing water, for example a salt water such as sea water, or brine, or water treated to contain alkaline-earth metals, e.g., from minerals or from industrial waste such as flyash, slag, or red mud. In some embodiments, the obtaining step further comprises contacting the alkaline-earth-metal-ion containing water to an industrial gaseous waste stream comprising $CO_2$ prior to the precipitating step; the industrial gaseous waste stream may be from, e.g., a power plant, foundry, cement plant, refinery, or smelter; the gas waste stream may be, e.g. flue gas, such as flue gas from a coal-fired power plant. In some embodiments the obtaining step further comprises raising the pH of the alkaline-earth-metal-ion containing water to 10 or higher during the precipitating step. In some embodiments the producing step further comprises: generating a settable composition comprising the synthetic carbonate; and allowing the settable composition to form a solid product. In some alternative embodiments the producing step further comprises subjecting the precipitate to a combination of temperature and pressure sufficient to produce an aggregate suitable for the intended use; such as a temperature of between 35-500° C., or 50-200° C., or 50-150° C., and a pressure between 1000 psi to 20,000 psi, or 1000 psi to 10,000 psi, or 1000 psi to 6000 psi, such as 4000 psi to 6000 psi. In some alternative embodiments the generating step comprises mixing the synthetic carbonate with one or more of: water, Portland cement, fly ash, lime and a binder. The generating step may further comprise mechanically refining the solid product, such as by molding, extruding, pelletizing, crushing, or some combination thereof. In some embodiments the producing step comprises contacting the synthetic carbonate with fresh water, e.g., to convert the synthetic carbonate to a freshwater stable product. In some embodiments the contacting step comprises: spreading the synthetic carbonate in an open area; and contacting the spread synthetic carbonate with fresh water.

B. Other methods

In some embodiments the invention provides a method comprising: obtaining a composition comprising a hydraulic cement and an aggregate comprising a synthetic carbonate; and producing a settable composition comprising the obtained composition. The aggregate comprising a synthetic carbonate may, in some embodiments, be made by the methods described herein. In some embodiments, the synthetic carbonate comprises sequestered $CO_2$. In some embodiments, the synthetic carbonate has a $\delta^{13}C$ more negative than −10‰, or more negative than −15‰, or more negative than −20‰, or more negative than −25‰. The method may further comprises allowing the settable composition to set into a solid product, such as a structural product, e.g., part of a road, or asphalt, or a building foundation.

In some embodiments the invention provides a method of sequestering carbon dioxide, the method comprising: precipitating a $CO_2$ sequestering carbonate compound composition from an alkaline-earth-metal-ion containing water; and producing aggregate comprising the $CO_2$ sequestering carbonate compound composition. In some embodiments the invention provides a method of sequestering $CO_2$ by contacting an alkaline-earth-metal-ion containing water to a gaseous industrial waste stream comprising $CO_2$; precipitating a synthetic carbonate from the alkaline-earth-metal-ion containing water, wherein the synthetic carbonate comprises $CO_2$ derived from the gaseous industrial waste stream; and producing aggregate comprising the synthetic carbonate. In some embodiments, the aggregate is combined in a settable composition. The aggregate may be used in making manmade structures. In some embodiments, the aggregate makes up at least 1, 5, 10, 20, 30, 40, 50, 60, 70, 80, 90, or 95% of the manmade structure. In some embodiments, the manmade structure is a building. In some embodiments, the manmade structure is a roadway, or a component of a roadway. In some embodiments, the manmade structure is a dam. In other embodiments, the aggregate is transported to a storage site, such as an underwater storage site, or an underground storage site, e.g., a coal mine or other fossil fuel removal site. The aggregate may be transported to the site by, e.g., rail, such as the same rail cars that transported coal to the coal-fired power plant at which the aggregate was produced. The aggregate may be produced in a variety of shapes so as to make packing in the storage site more efficient and/or give a stronger packing.

In some embodiments the invention provides a method of producing a $CO_2$ sequestering aggregate by: obtaining a $CO_2$ sequestering component; and producing an aggregate comprising the $CO_2$ sequestering component. The $CO_2$-sequestering component may be obtained in some embodiments by precipitating a carbonate from an aqueous solution that has been contacted with a $CO_2$-containing industrial waste gas stream. The aggregate may be produced by any suitable method such as the methods described herein.

In some embodiments the invention provides a method of producing an aggregate containing carbon with a $\delta^{13}C$ more negative than $-10‰$, or more negative than $-15‰$, or more negative than $-20‰$, or more negative than $-25‰$ by: obtaining a component containing carbon with a $\delta^{13}C$ more negative than $-10‰$, or more negative than $-15\%$, or more negative than $-20‰$, or more negative than $-25‰$; and producing an aggregate from the component, thus producing an aggregate containing carbon with a $\delta^{13}C$ more negative than $-10‰$, or more negative than $-15\%$, or more negative than $-20\%$, or more negative than $-25‰$. The component may be obtained in some embodiments by precipitating a carbonate-containing precipitate from an aqueous solution that has been contacted with an industrial waste gas stream that contains $CO_2$ from combustion of fossil fuel; depending on the type of fossil fuel, the $CO_2$ will contain carbon with a $\delta^{13}C$ more negative than $-10‰$, or more negative than $-15‰$, or more negative than $-20‰$, or more negative than $-25‰$, and the carbonates precipitated from this gas will also have similar $\delta^{13}C$ values. The counterion to the carbonate is in some embodiments calcium, magnesium or a combination of calcium and magnesium in any ratio as described herein. In some embodiments, the aggregate is combined in a settable composition. The aggregate may be used in making manmade structures. In some embodiments, the aggregate makes up at least 1, 5, 10, 20, 30, 40, 50, 60, 70, 80, 90, or 95% of the manmade structure. In some embodiments, the manmade structure is a building. In some embodiments, the manmade structure is a roadway, or a component of a roadway. In some embodiments, the manmade structure is a dam. In other embodiments, the aggregate is transported to a storage site, such as an underwater storage site, or an underground storage site, e.g., a coal mine or other fossil fuel removal site. The aggregate may be transported to the site by, e.g., rail, such as the same rail cars that transported coal to the coal-fired power plant at which the aggregate was produced. The aggregate may be produced in a variety of shapes so as to make packing in the storage site more efficient and/or give a stronger packing. Storage sites also include wave-resistant structures (e.g., artificial reefs), or other structures resistant to water currents and motion (such as riprap); thus the invention provides wave-resistant structures that contain one or more of the aggregates described herein, and also provides structures resistant to water currents and motion containing one or more of the aggregates described herein. The invention further provides methods of making wave-resistant structures or water-resistant structures that include manufacturing an aggregate as described herein, and forming a wave-resistant structure or a structure resistant to water currents and motion using the aggregate.

In some embodiments, the invention provides a method comprising: obtaining a settable composition comprising a hydraulic cement and a $CO_2$ sequestering aggregate; and producing a solid product from the settable composition.

In some embodiments the invention provides a method of producing a carbon negative structure by using a carbon negative aggregate in the construction of the structure. "Carbon negative" has the meaning described herein. In some embodiments, the structure is a building. In some embodiments, the structure is a dam. In some embodiments, the structure is a roadway. In some embodiments, the structure is a component of a larger structure, e.g., a foundation for a building, or a base course or other base layer for a roadway. In some embodiments, the carbon negative aggregate comprises at least 5, 10, 20, 30, 40, 50, 60, 70, 80, or 90% of the structure. In some embodiments, the structure also includes at least one other $CO_2$-sequestering component. For example, in some embodiments, the structure further contains a $CO_2$-sequestering supplementary cementitious material, and/or a $CO_2$-sequestering pozzolan, that is used in the making of cement for the structure. In some embodiments, the structure further contains a $CO_2$-sequestering cement. In some embodiments, the amount of $CO_2$ sequestered in the making of the structure and its components exceeds the amount of $CO_2$ produced in the making of the structure and its components by at least 1, 5, 10, 20, 30, 40 50, 60 70, 80, 90, or 95%, where % is calculated as described for "carbon negative" elsewhere herein.

In some embodiments, the invention provides a method of producing a carbon sequestration tradable commodity by producing an aggregate comprising a synthetic $CO_2$ sequestering carbonate compound; determining a quantified amount of $CO_2$ sequestered in the aggregate; and producing a carbon sequestration tradable commodity based on said determined quantified amount. In some embodiments the invention provides method of obtaining a carbon sequestration tradable commodity by generating $CO_2$; forwarding the $CO_2$ to a $CO_2$ sequesterer that: (i) produces an aggregate comprising a synthetic $CO_2$ sequestering carbonate compound; (ii) determines a quantified amount of $CO_2$ sequestered in the $CO_2$ aggregate; and (iii) produces a carbon sequestration tradable commodity based on the determined quantified amount; and (c) receiving said carbon sequestration tradable commodity from the $CO_2$ sequesterer.

In some embodiments the invention provides methods of producing lightweight aggregate by treating a starting material in such a way that there is no net production of $CO_2$ during the treatment, to produce a lightweight aggregate. In some embodiments there is a net sequestration of $CO_2$ in the production of the aggregate. The starting material may be an aqueous solution, a $CO_2$-containing gas stream, such as industrial waste gas stream, a source of divalent cations, or a combination thereof. The starting materials may be treated so as to precipitate a carbonate, where the carbonate sequesters $CO_2$ in the process. The process may further include treating the precipitate under conditions that produce a lightweight aggregate, e.g., an aggregate with a bulk density (unit weight) of 75 lb/ft$^3$ to 125 lb/ft$^3$, such as 90 lb/ft$^3$ to 115 lb/ft$^3$.

In some embodiments the invention provides a method of manufacturing an artificial rock without the use of a binder by subjecting a synthetic carbonate to conditions that cause it to undergo a physical transformation, thereby forming an artificial rock, where the formation of the artificial rock is not dependent on chemical reactions of the starting material. In some embodiments, the artificial rock is formed by dissolution and re-precipitation of compounds in the starting synthetic carbonate to produce new compounds or greater quantities of compounds already in the starting material. In some embodiments the new or greater quantities of compounds include one or more of dypingite, hydromagnesite, and/or nesquehonite. In some embodiments the manufacture of the artificial rock includes subjecting the synthetic carbonate to a combination of elevated temperature and pressure for a period of time sufficient to product the artificial rock. In some embodiments the conditions to which the synthetic carbonate is subjected are sufficient to produce an artificial rock having a hardness of greater than 2, or greater than 3, or greater than 4, or 2-7, or 2-6, or 2-5, on the Mohs scale or equivalent on the Rockwell, Vickers, or Brinell scale. In some embodiments the conditions to which the synthetic carbonate is subjected are sufficient to produce an artificial rock having a bulk density of 50 lb/ft$^3$ to 200 lb/ft$^3$. In some embodiments the conditions to which the synthetic carbonate is subjected are sufficient to produce an artificial rock having a bulk density of 75 lb/ft$^3$ to 125 lb/ft$^3$.

In some embodiments the invention provides a method of manufacturing an aggregate comprising combining waste gases from an industrial process with water containing species that will react with the waste gas to form a precipitate and processing the precipitate to form an aggregate.

The methods of the invention allow the production of virtually any size or shape of aggregate, as well as any number of other characteristics of the aggregate, such as hardness, abrasion resistance, density, porosity, chemical composition, mineral composition, acid resistance, alkaline resistance, chloride content, sodium content, retention of $CO_2$, and reactivity (or lack thereof). Accordingly, in some embodiments the invention provides methods of manufacturing aggregate by manufacturing the aggregate to a predetermined set of characteristics. In some of these embodiments, the aggregate contains $CO_2$ from an industrial waste gas stream. In some embodiments, the characteristics include two or more of size, shape, hardness, abrasion resistance, density, porosity, chemical composition, mineral composition, acid resistance, alkaline resistance, chloride content, sodium content, retention of $CO_2$, and reactivity (or lack thereof). In some embodiments, the characteristics include three or more of size, shape, hardness, abrasion resistance, density, porosity, chemical composition, mineral composition, acid resistance, alkaline resistance, chloride content, sodium content, retention of $CO_2$, and reactivity (or lack thereof). In some embodiments, the characteristics include four or more of size, shape, hardness, abrasion resistance, density, porosity, chemical composition, mineral composition, acid resistance, alkaline resistance, chloride content, sodium content, retention of $CO_2$, and reactivity (or lack thereof). In some embodiments the characteristics include size and shape. In some embodiments the characteristics include size, shape, and at least one of hardness, abrasion resistance, density, porosity, chemical composition, mineral composition, acid resistance, alkaline resistance, chloride content, sodium content, retention of $CO_2$, and reactivity (or lack thereof).

In embodiments where the set of aggregates is made to include aggregates of predetermined size and shape, methods of making aggregate to a desired shape or size are as described herein. Any desired mixture may be produced, for example, a mixture of aggregate with one, two, three, four, five, six, seven, eight, nine, ten, or more than ten sizes of aggregate, in combination with one, two, three, four, five, six, seven, eight, nine, ten, or more than ten shapes of aggregate. For example, an aggregate set may have at least two sizes and at least two shapes, or exactly two sizes and exactly two shapes. This is exemplary only, and any combination of numbers of sizes and shapes may be used. The sizes may be any desirable size, e.g., to provide a desired degree of packing and reduce the need for cement in a concrete, a graded set of sizes may be used, e.g., selected from the largest of coarse aggregate down to the finest of fine aggregate, or any combination in between. Similarly, the shapes may be any desirable shape that is predetermined, for example, all one shape, or a variety of shapes. Some sizes of aggregate in the set may be produced in one shape while others may be produced in one or more other shapes. For example, the methods of the invention allow the production of a set of aggregates that include aggregate of spherical or disk shape in a set of graded sizes, for packing, as well as a portion of the larger particles being of elongate shape (i.e., having a high aspect ratio, as described elsewhere herein) to improve flowability and/or to reduce cracking by acting as "pins." Other possibilities are sets of aggregate with some star-shaped pieces for interlocking combined with other, smaller pieces for packing and reducing the need for cement. These possibilities are exemplary only and those of skill in the art will recognize that aggregate sets may be made in virtually any combination of size and shape depending on the job for which they are intended; from this job the characteristics of the aggregate set may be determined and the set may be "made to order."

Further useful characteristics may be included besides size and shape, such as reactivity. In some applications, some degree of reactivity may be useful, or it may be useful to have a certain percentage of an aggregate set, but not all of the set, be reactive. In the construction of roadways, for example, it may be useful to have a base course composed of some degree of reactive aggregate so that water seeping through the roadway surface will cause the underlying aggregate to react and form a stronger base. The methods of the invention allow for a calibrated amount of reactive aggregate, e.g., aggregate containing siliceous materials, to be used in a set of aggregate to achieve a desired degree of overall reactivity. This can be in a certain percentage of aggregate of a certain size, or all of a particular size of aggregate, or shape, etc.

Other characteristics that may be varied based on the conditions under which the aggregate is manufactured include hardness. While in general harder aggregate is preferred, certain classes of size or shape of aggregate in a set may be more useful if somewhat softer, e.g., to provide deformation in certain highly packed uses. For example, if aggregate is used to refill mining voids, e.g., in coal mines, it may be desirable to make a set of aggregate with a variety of sizes for packing as well as having a certain percentage of the smaller aggregate as somewhat softer for deformation as the aggregate is packed as tightly as practical in the void left by the mining of the coal.

Further characteristics include stability, e.g., solubility such as solubility in neutral, acid, or basic pH. The aggregates of a set may all have the same solubility or different solubilities. Certain aggregates in a set may be deliberately manufactured to be soluble under their conditions of use so that over a period of time, which may be of any duration, they dissolve, leaving a void space in a concrete or other material, that matches the size and shape of the aggregate. This allows for the manufacture of concrete of controlled permeability.

Abrasion resistance may also be controlled in the sets of aggregates, thus an aggregate may be produced with all of one abrasion resistance or may have sets of different aggregates of different abrasion resistance.

IV. Systems

Aspects of the invention further include systems, e.g., processing plants or factories, for producing the carbonate compound compositions, e.g., saltwater derived carbonate and hydroxide mineral compositions, and aggregates of the invention, as well as concretes and mortars that include the aggregates of the invention. Systems of the invention may have any configuration which enables practice of the particular production method of interest.

Aspects of the invention further include systems, for example, processing plants or factories, for producing aggregate of the invention from divalent cations and components of industrial waste gas, as well as concretes and mortars that include the aggregates of the invention. Systems of the invention may have any configuration which enables practice of the particular production method of interest. Systems of the invention include a system for producing aggregate where the system includes an input for a divalent cation-containing water, a carbonate compound precipitation station that subjects the water to carbonate compound precipitation conditions and produces a precipitated carbonate compound composition; and an aggregate producer for producing aggregate from the precipitated carbonate compound composition. In some embodiments the system further includes an input for a $CO_2$-containing industrial waste gas stream, which may be in some embodiments a waste gas stream from a power plant, foundry, cement plant, or smelter; e.g., in some embodiments, a power plant such as a coal-fired power plant. The aggregate producer of the system may be an aggregate producer that uses any suitable method for producing aggregate of the desired qualities, e.g., any of the methods described herein, such as using a combination of temperature and pressure such as in a platen press, an extruder, or a roller system. In some embodiments the aggregate producer is capable of producing an aggregate of a specific size and/or of a specific shape. In some embodiments, the aggregate producer is capable of producing aggregates of a variety of sizes and/or shapes. The aggregate producer may produce aggregate in one step or in more than one step, e.g., a step of producing a solid block optionally followed by one or more steps to produce aggregate of the desired properties, e.g., size and/or shape, from the block. In some embodiments a system of the invention is capable of producing at least 0.5, 1, 2, 5, 10, 50, 100, 1000, or 10,000 tons of aggregate per day containing at least 0.1, 0.2, 0.3, 0.4, or 0.5 tons of $CO_2$ sequestered from a source of $CO_2$ per ton of aggregate. In some embodiments a system of the invention is capable of producing at least 1 ton of aggregate per day containing at least 0.1 ton of $CO_2$ sequestered from a source of $CO_2$ per ton of aggregate. In some embodiments a system of the invention is capable of producing at least 1 ton of aggregate per day containing at least 0.2 ton of $CO_2$ sequestered from a source of $CO_2$ per ton of aggregate. In some embodiments a system of the invention is capable of producing at least 1 ton of aggregate per day containing at least 0.3 ton of $CO_2$ sequestered from a source of $CO_2$ per ton of aggregate. In some embodiments a system of the invention is capable of producing at least 10 tons of aggregate per day containing at least 0.3 tons of $CO_2$ sequestered from a source of $CO_2$ per ton of aggregate. In some of these embodiments the aggregate is suitable for use as a building material.

Figure 2:
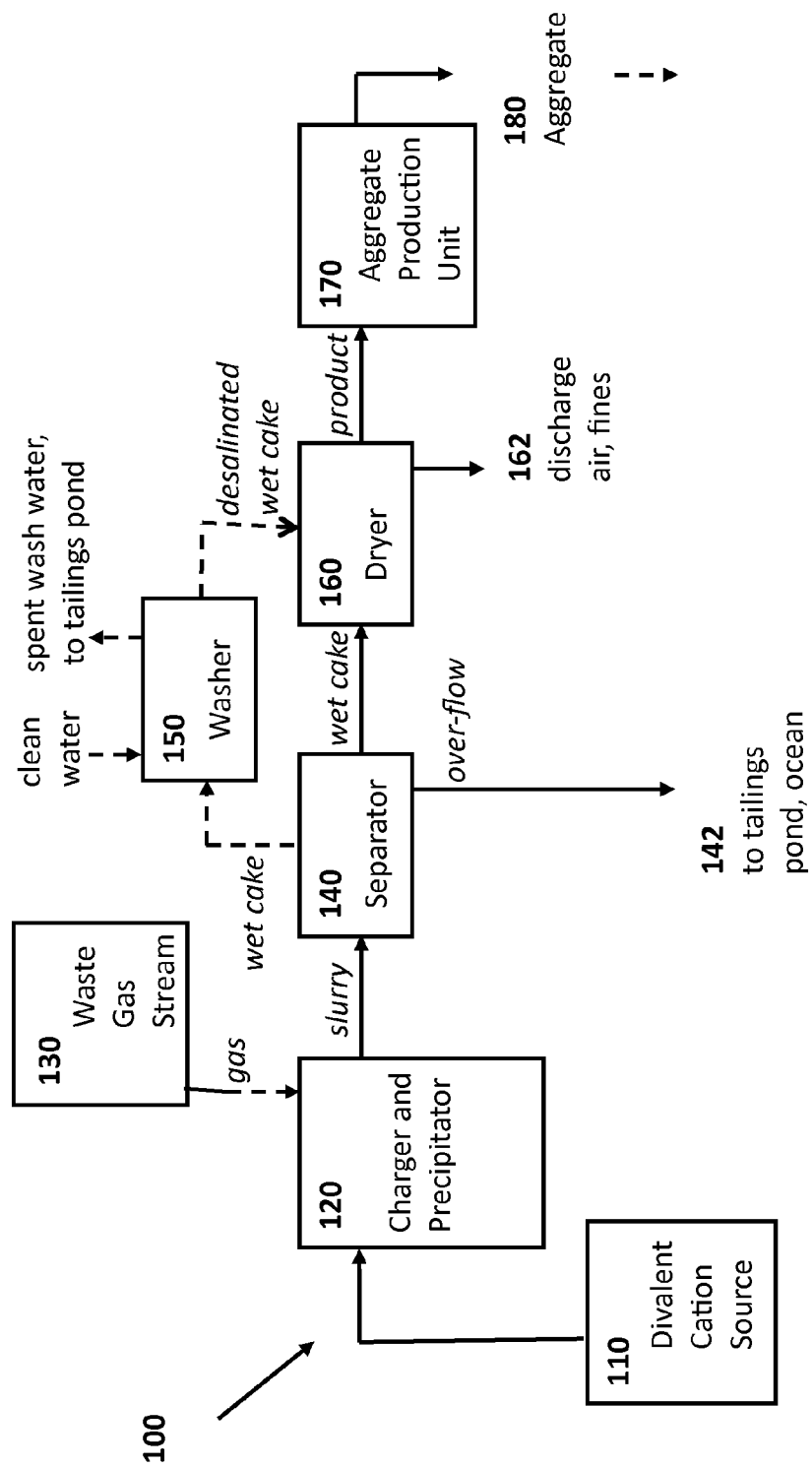
FIG. 2 provides a schematic of a system according to one embodiment of the invention.

FIG. 2 provides a schematic of a precipitation and aggregate production system according to one embodiment of the invention. In FIG. 2, system 100 includes divalent cation source 110. In certain embodiments, divalent cation source 110 includes a structure having an input for an aqueous solution of divalent cations, such as a pipe or conduit from an ocean, etc. Where the aqueous solution of divalent cations that is processed by the system to produce the precipitation material, and, subsequently, aggregate, is seawater, the input is in fluid communication with the seawater. For example, the input may be a pipe line or feed from ocean water to a land based system, or the input may be a inlet port in the hull of ship (e.g., where the system is part of a ocean-faring ship).

Also shown in FIG. 2, is gaseous waste stream source 130, which comprises carbon dioxide and other components of combustion gases. The waste gas stream may vary as described above. The divalent cation source and the gaseous waste stream source are connected to the charger and precipitator reactor 120. The charger and precipitator 120 may include any of a number of different elements, such as temperature regulators (e.g., configured to heat the water to a desired temperature), chemical additive elements (e.g., for introducing chemical pH-raising agents (such as fly ash) into the water), and electrolysis elements (e.g., cathodes/anodes, etc. Charger and precipitator 120 may operate in a batch process, semi-batch process, or a continuous process.

The product of the precipitation reaction (e.g., a slurry) is optionally processed at a separator 140, as illustrated in FIG. 2. The separator 140 may use a variety of different water removal processes, including processes such as continuous centrifugation, centrifugation, filter centrifugation, gravitational settling, and the like. The precipitation material may be simply washed with fresh water and left wet for a fresh water hardening reaction to proceed. Partial mechanical water removal may be performed to adjust the density of the set product, controlling strength and hardness.

The system shown in FIG. 2 also includes an optional dryer 160 for drying the dewatered precipitation material produced at separator 140. Depending on the particular drying protocol of the system, the dryer 160 may include a filtration element, freeze drying structure, oven drying, spray drying structure, etc., as described above in more detail.

Also shown is optional washing station 150, where bulk dewatered precipitation material from separator 140 is washed, for example, to remove salts and other solutes from the precipitation material prior to drying in dryer 160.

Dried precipitation material from dryer 160 is then provided to aggregate production unit 180, where the precipitation material may be set and mechanically processed to produce a final aggregate product.

As indicated above, the system may be present on land or sea. For example, the system may be a land-based system that is in a coastal region (e.g., close to a source of sea water), or even an interior location, where water is piped into the precipitation and aggregate producing system from a divalent cation source (e.g., ocean). Alternatively, the precipitation and aggregate producing system may be a water-based system (i.e., a system that is present on or in water). Such a system may be present on a boat, ocean-based platform etc., as desired.

IV. Utility

The subject aggregates and settable compositions that include the same, find use in a variety of different applications, such as above ground stable $CO_2$ sequestration products, as well as building or construction materials. Specific structures in which the settable compositions of the invention find use include, but are not limited to: pavements, architectural structures, e.g., buildings, foundations, motorways/roads, overpasses, parking structures, brick/block walls and footings for gates, fences and poles. Mortars of the invention find use in binding construction blocks, e.g., bricks, together and filling gaps between construction blocks. Mortars can also be used to fix existing structure, e.g., to replace sections where the original mortar has become compromised or eroded, among other uses.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Preparation of Precipitation Material for Use in Aggregate 76,000 gallons of seawater was pumped at 40 gallons per minute into a 250,000-gallon open tank configured with spargers in the bottom of the tank until the height of seawater in the tank was six feet above the spargers. Carbon dioxide was subsequently sparged into the seawater at a rate that kept the pH above 5.6.

With continued carbon dioxide sparging, a slurry containing 4,500 kg of jet-milled (to decrease particle size and improve dissolution rates) magnesium hydroxide was added through piping with in-line mixers. (The magnesium hydroxide for this experiment was waste from a seawater magnesia (MgO) plant, the magnesium hydroxide being about 85% $Mg(OH)_2$, about 12% $CaCO_3$, and about 3% $SiO_2$.) Carbon dioxide sparging continued after complete addition of magnesium hydroxide and until 9,400 pounds of carbon dioxide had been added. Half of the reaction mixture in the tank (Tank A) was subsequently transferred to another tank (Tank B). The total time to complete these steps was approximately 30 hours.

About 300 gallons of a 50% (w/w) sodium hydroxide solution was added to Tank A over a period of 4-6 hours until the pH reached 9.5. This mixture was then transferred to Tank B over the course of about 5 hours and allowed to settle under the action of gravity for 8-12 hours.

The settled precipitation material was removed from the bottom of Tank B and a portion of the settled precipitation material was subsequently washed with fresh water, dewatered in a filter press to produce a filter cake at approximately 30% solids, and used to make aggregate (see Example 2).

Figure 5:
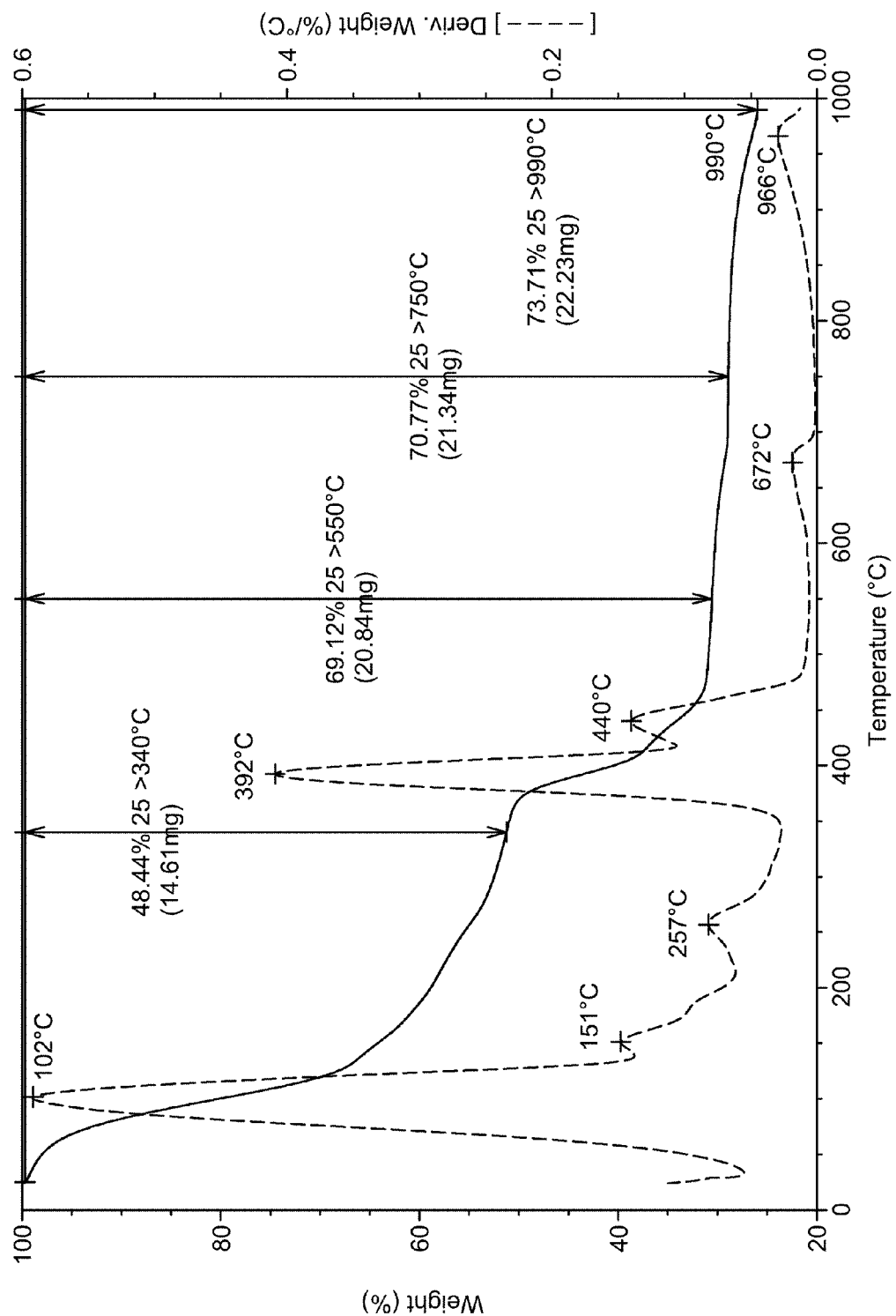
FIG. 5 provides a thermogravimetic analysis (TGA) of wet precipitation material produced in Example 1.
Figure 6:
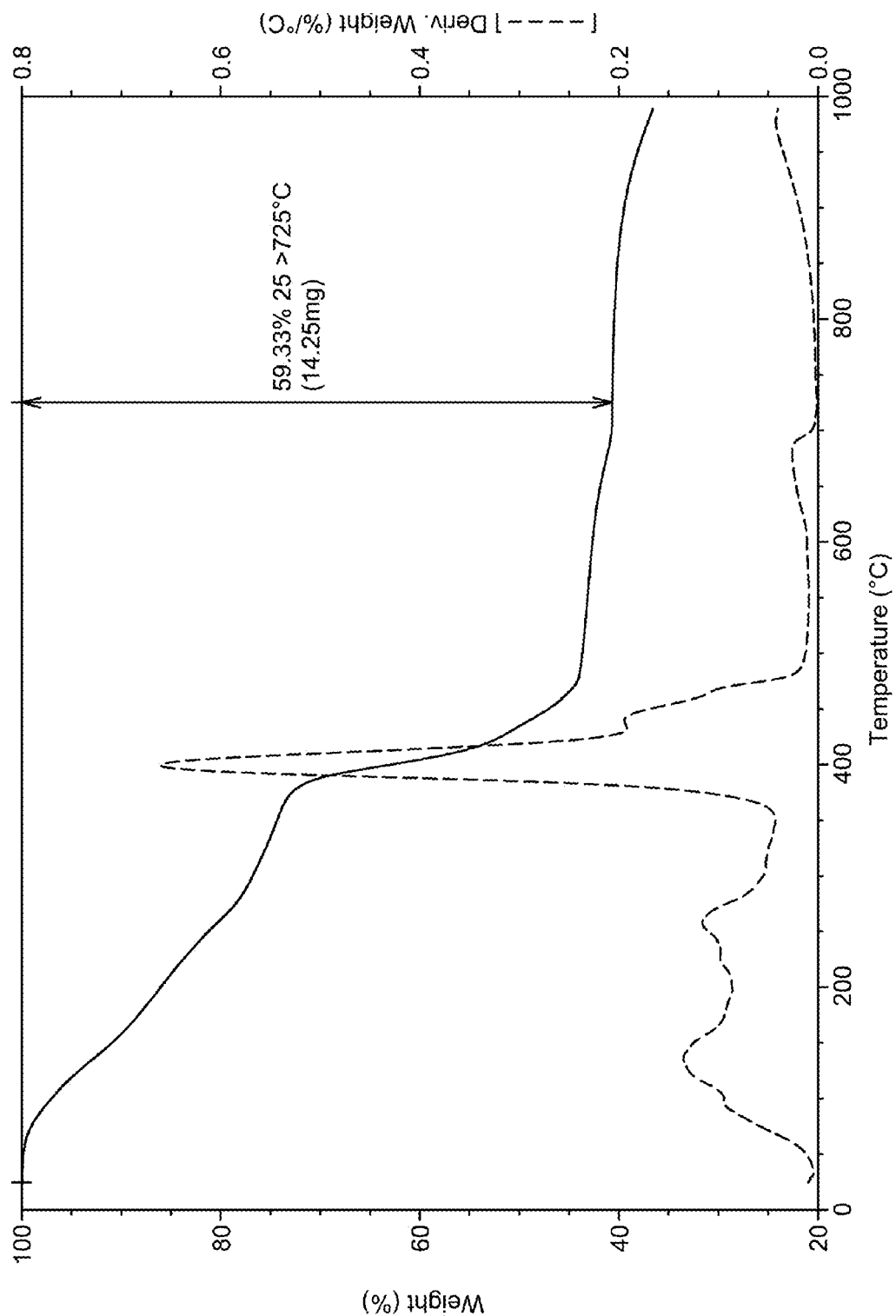
FIG. 6 provides a TGA of dry precipitation material produced in Example 1.

X-ray fluorescence (XRF) data (Table 3) indicates that the precipitation material had a high Mg:Ca weight ratio of 12. Thermogravimetric analysis (TGA) data provided herewith (FIG. 5 and FIG. 6) indicated that the precipitation material remained wet. FIG. 5 provides a TGA analysis of wet precipitation material. FIG. 6 provides a TGA analysis of precipitation material dried in a desiccator.

TABLE 3

XRF elemental analysis of precipitation material

| | Na | Mg | Al | Si | S | Cl | K | Ca | Fe |
|---|---|---|---|---|---|---|---|---|---|
| Weight % | 1.65 | 19.99 | 0.00 | 0.24 | 0.06 | 2.09 | 0.07 | 1.68 | 0.04 |

TABLE 4

Percent CO2 content (coulometry) and calculated percent H2O from TGA

| | % $H_2O$ | % $CO_2$ |
|---|---|---|
| Weight % | 27.38 | 31.98 |

Figure 4:
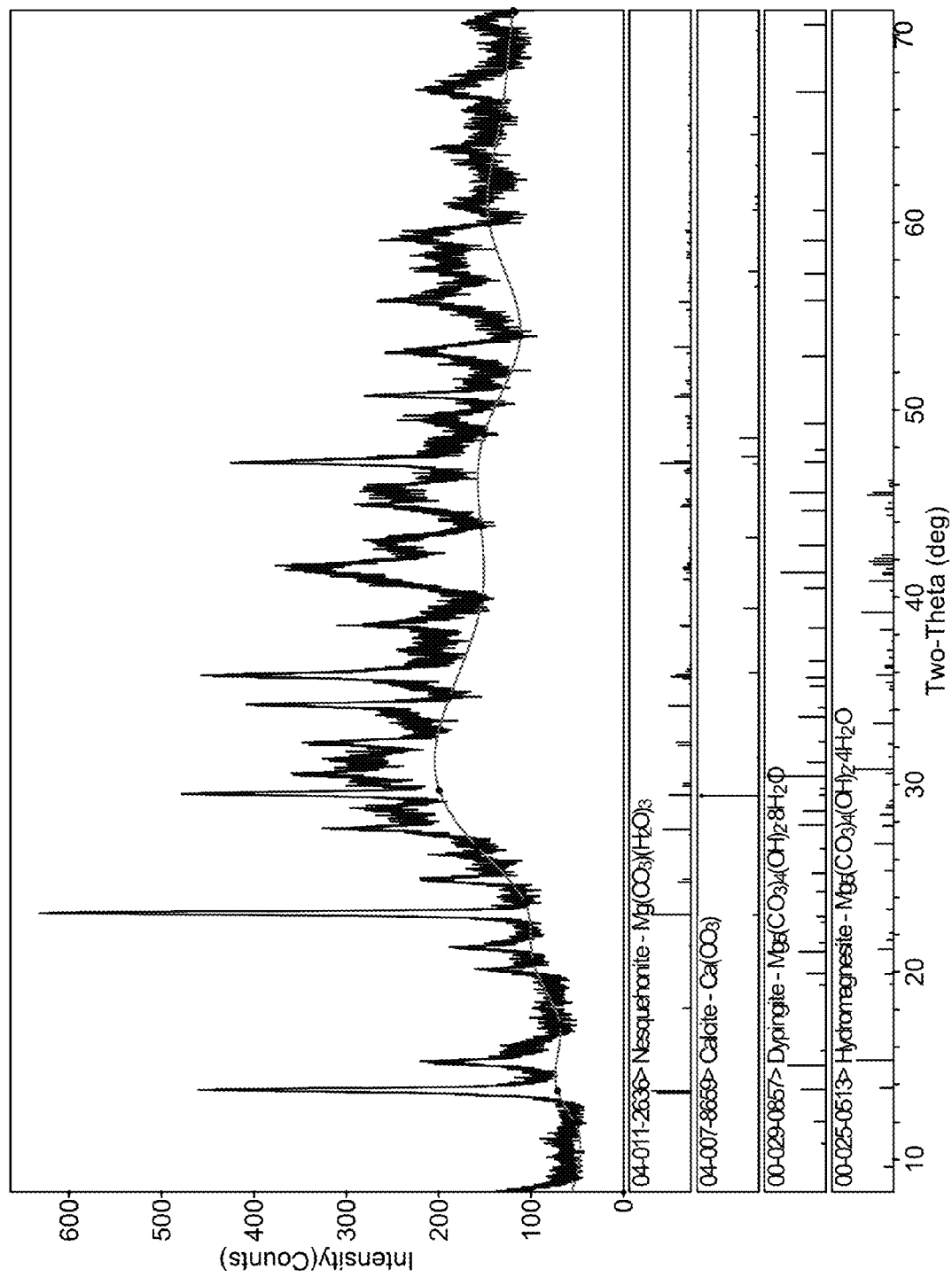
FIG. 4 provides an X-ray diffraction (XRD) spectrum for the precipitation material produced in Example 1.

X-ray diffraction (XRD) analysis (FIG. 4) of the precipitation material indicates the presence of dypingite ($Mg_5(CO_3)_4(OH)_2.5(H_2O)$) as a major phase, nesquehonite ($MgCO_3.3H_2O$) as another phase, some hydromagnesite ($Mg_5(CO_3)_4(OH)_2.4(H_2O)$), and calcite as a minor component. Some halite (NaCl) was also detected.

Figure 7:
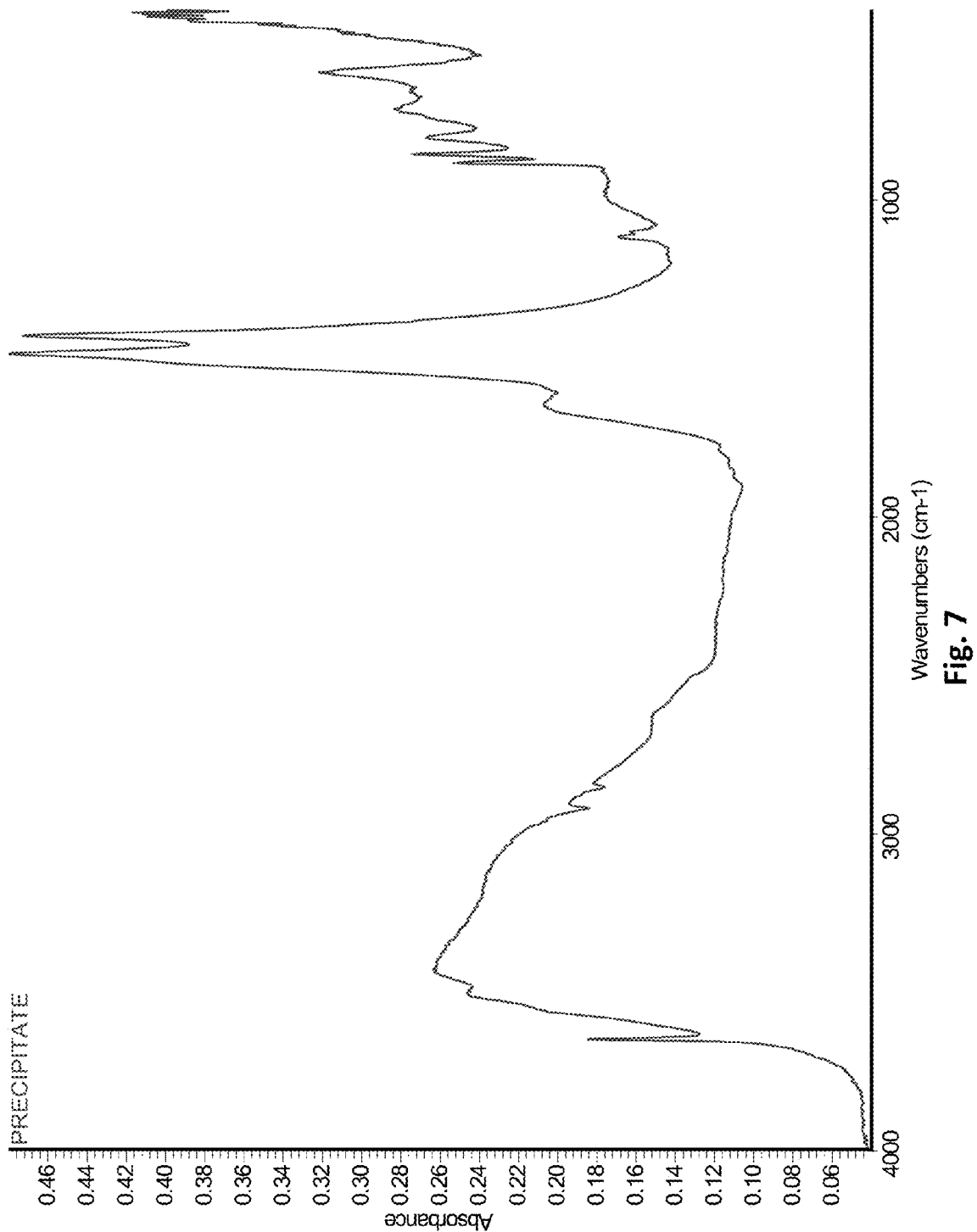
FIG. 7 provides a Fourier transform-infrared (FT-IR) spectrum for the precipitation material produced in Example 1.

A Fourier transform-infrared (FT-IR) spectrum of the precipitation material is also provided (FIG. 7). Scanning electron microscope (SEM) images of the precipitation material at 1000× (left) and 4000× (right) magnifications are provided as well (FIG. 8).

Example 2

Preparation of Aggregate from Precipitation Material

The steel molds of a Wabash hydraulic press (Model No.: 75-24-2TRM; ca. 1974) were cleaned and the platens were preheated such that the platen surfaces (including mold cavity and punch) were at 90° C. for a minimum of 1 hour.

Some of the precipitation material filter cake from Example 1 was oven-dried in sheet pans at 40° C. for 48 hours and subsequently crushed and ground in a blender such that the ground material passed a No. 8 sieve. The ground material was then mixed with water resulting in a mixture that was 90-95% solids with the remainder being the added water (5-10%).

A 4"×8" mold in the Wabash press was filled with the wet mixture of ground precipitation material and a pressure of 64 tons (4000 psi) was applied to the precipitation material for about 10 seconds. The pressure was then released and the mold was reopened. Precipitation material that stuck to the sides of the mold was scraped and moved toward the center of the mold. The mold was then closed again and a pressure of 64 tons was applied for a total of 5 minutes. The pressure was subsequently released, the mold was reopened, and the pressed precipitation material (now aggregate) was removed from the mold and cooled under ambient conditions. Optionally, the aggregate may be transferred from the mold to a drying rack in a 110° C. oven and dried for 16 hours before cooling under ambient conditions.

Once cooled to room temperature, the aggregate had the appearance of a slightly tan to white limestone. The surface of the aggregate could not be scratched with a coin, indicating a Mohs hardness of 3 or greater, which is the hardness of most natural limestone. A laminar structure was observed when the aggregate was broken in half. When natural limestone from the Calera formation in Northern California was fractured, the same laminar structure was observed as for the aggregate. Flakes of the natural limestone broke with only a slightly greater force than that needed to break the aggregate. Rubbing samples of the natural limestone and the aggregate between one's palms for 5 seconds indicated that the aggregate was only slightly more friable than the limestone.

Figure 9:
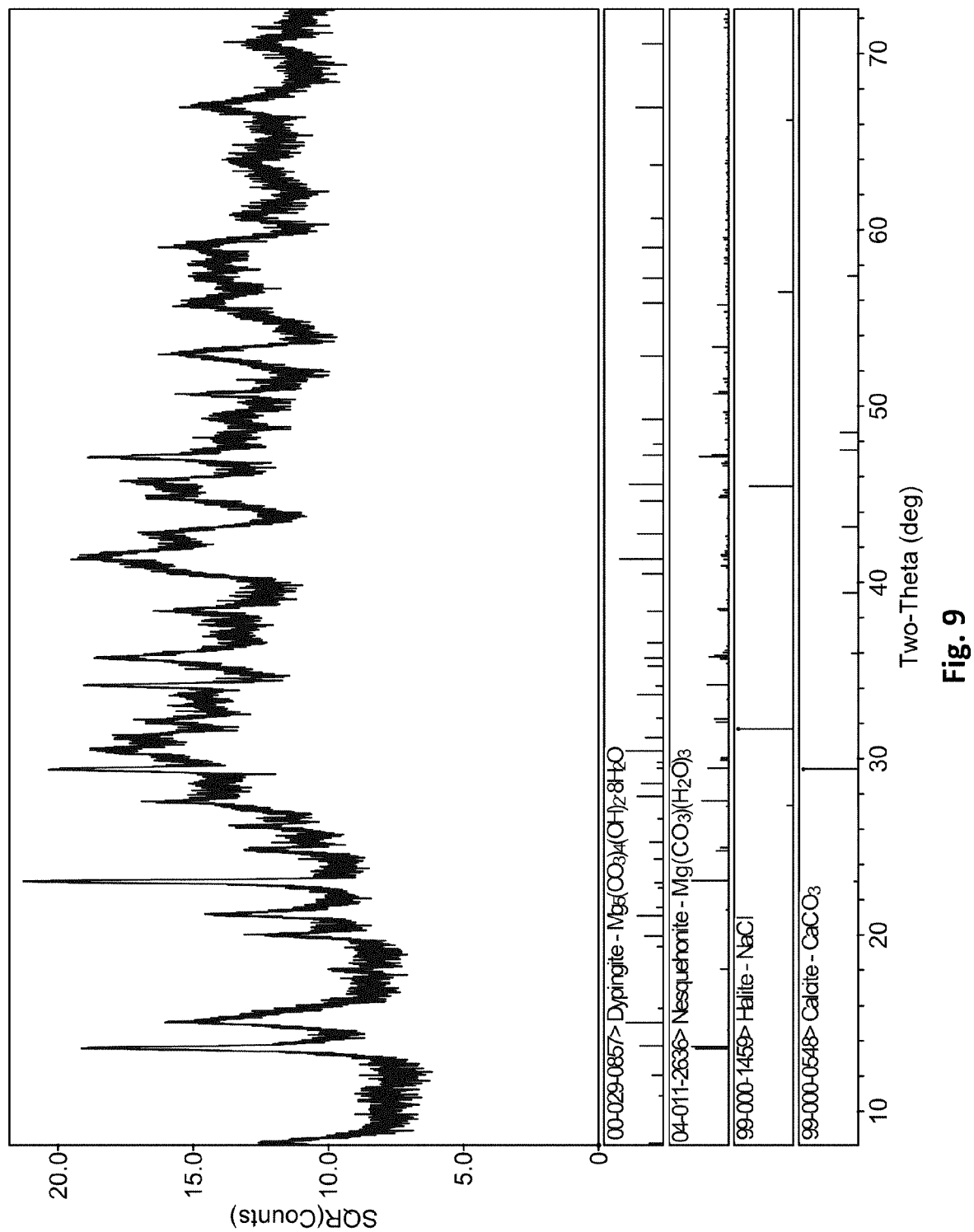
FIG. 9 provides an XRD spectrum for the aggregate produced in Example 2.
Figure 10:
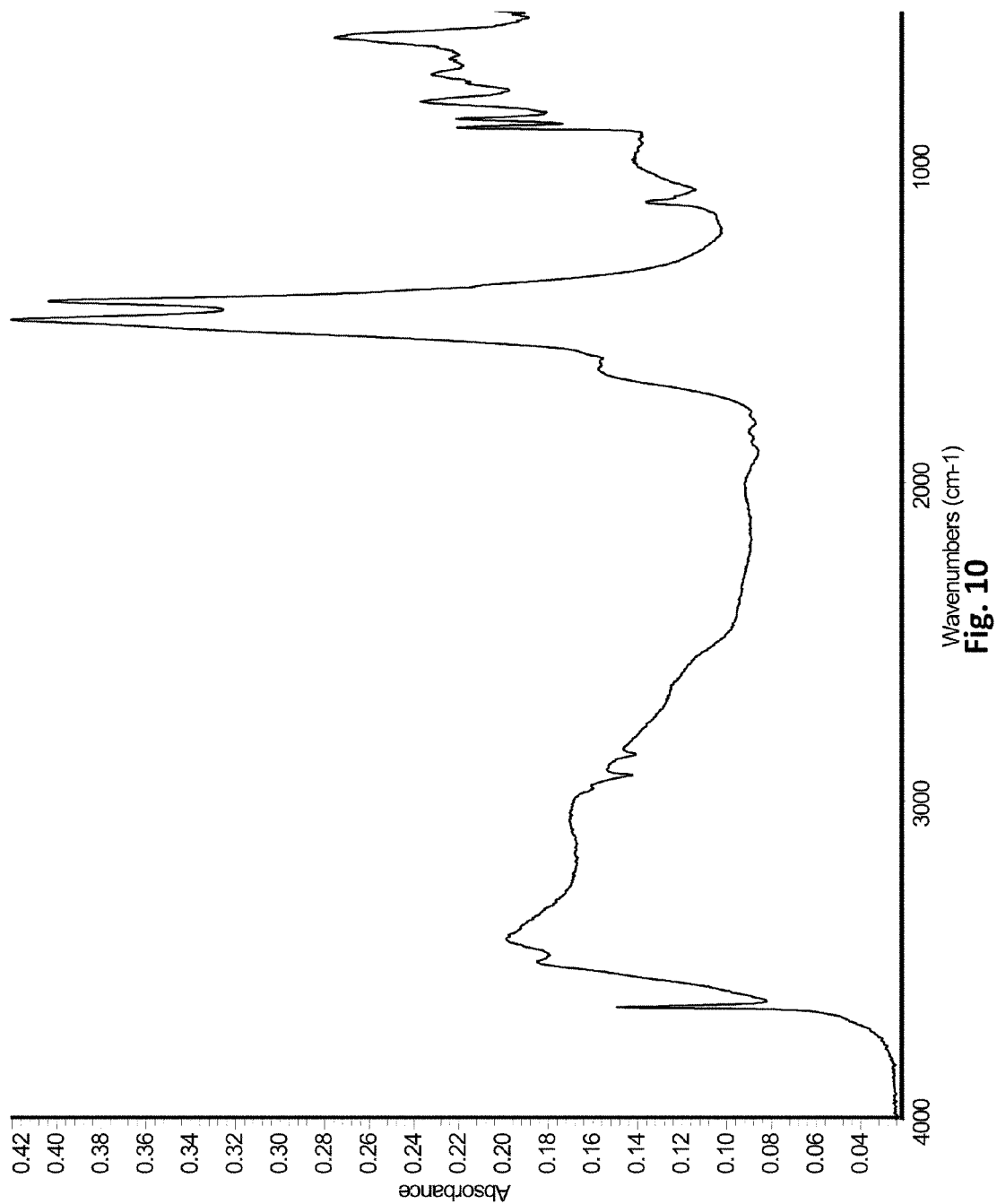
FIG. 10 provides an FT-IR spectrum for the aggregate produced in Example 2.
Figure 11:
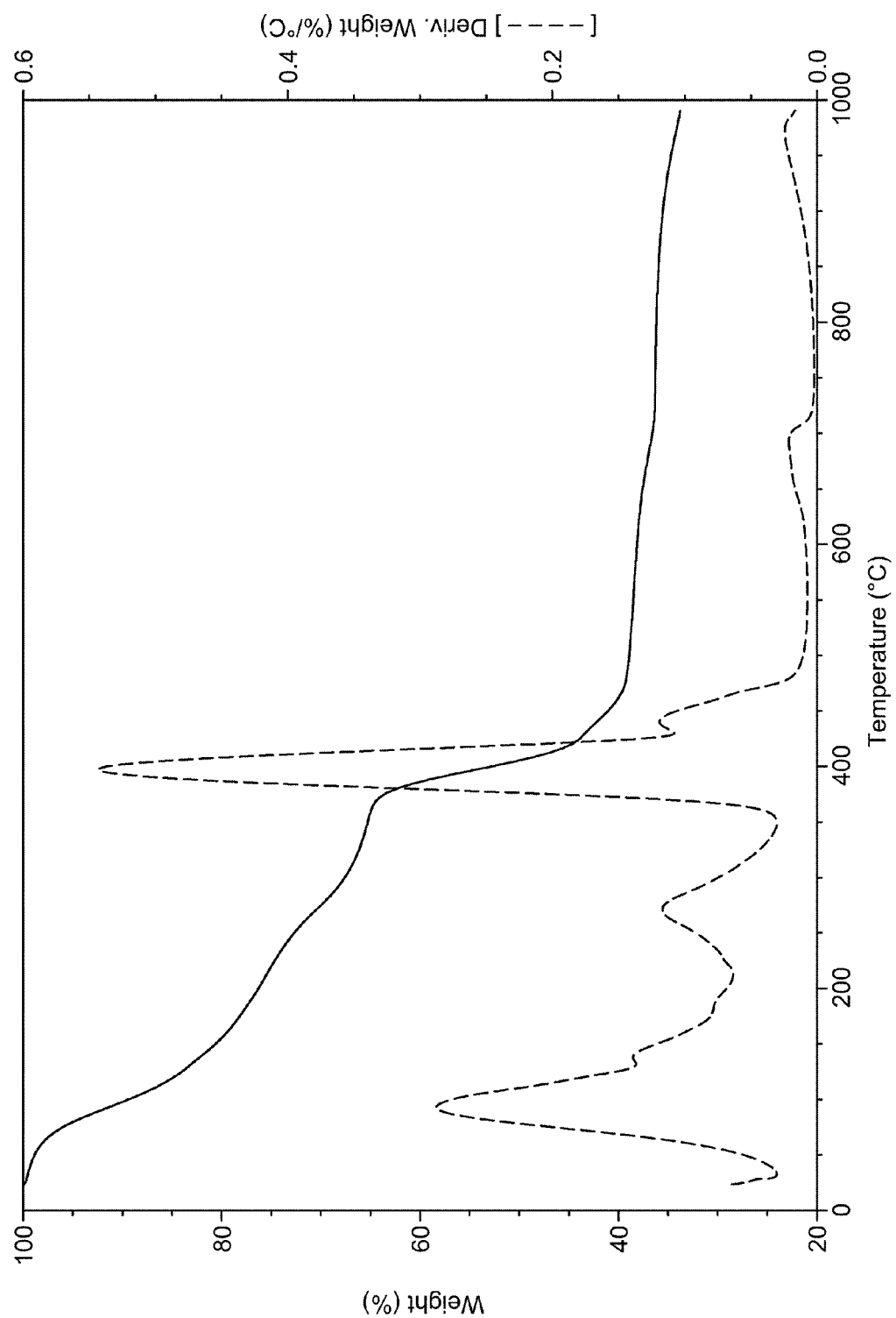
FIG. 11 provides a TGA for the aggregate produced in Example 2.

FIGS. 9-12 provide spectra and images of the experiment: FIG. 9 provides an XRD spectrum of the aggregate; FIG. 10 provides an FT-IR spectrum of the aggregate; FIG. 11 provides TGA data for the aggregate; and FIG. 12 provides SEM images of the aggregate at 1000× (left) and 4000× (right) magnifications.

Example 3

Aggregate from Mixture of Wollastonite and Precipitation Material

Some of the precipitation material prepared in Example 1 (primarily nesquehonite rods from an unwashed filter cake of precipitation material) was dried in an oven to a consistent weight. The dried starting precipitation material (5 kg) was subsequently added to a reaction vessel followed by 1 kg of commercial grade wollastonite (calcium silicate) and 500 mL of 50% (w/w) sodium hydroxide (with stirring). With continued stirring, 12 kg of water was added to the reaction mixture. The reaction mixture was subsequently heated at 70° C. overnight.

The resulting product material was filtered, spray dried, and used to prepare aggregate as described in Example 2, including the optional step of drying the aggregate on an drying rack in a 110° C. oven for 16 hours.

TABLE 5

| XRF elemental analysis of wollastonite starting material | | | | | | | | |
|---|---|---|---|---|---|---|---|---|
| | Na | Mg | Al | Si | S | Cl | K | Ca | Fe |
| Weight % | 0.00 | 0.48 | 0.27 | 22.12 | 0.00 | 0.19 | 0.00 | 36.18 | 0.30 |

TABLE 6

| XRF elemental analysis of spray-dried material | | | | | | | | |
|---|---|---|---|---|---|---|---|---|
| | Na | Mg | Al | Si | S | Cl | K | Ca | Fe |
| Weight % | 12.14 | 13.09 | 0.12 | 4.48 | 0.36 | 2.47 | 0.06 | 7.19 | 0.07 |

TABLE 7

| Percent $CO_2$ content (coulometry) and calculated % $H_2O$ from TGA for spray-dried material | | |
|---|---|---|
| | % $H_2O$ | % $CO_2$ |
| Weight % | 14.67 | 23.77 |

Figure 13:
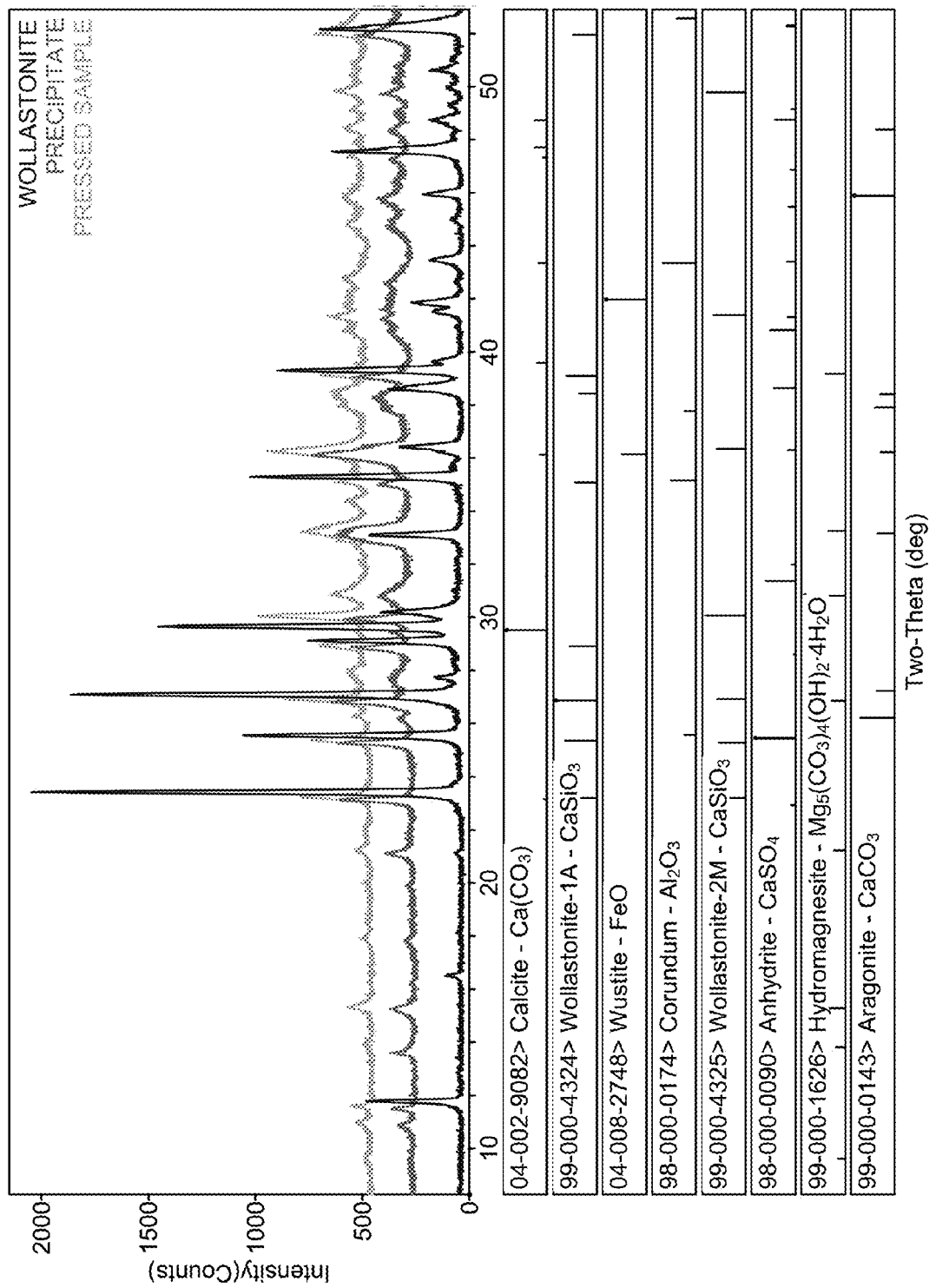
FIG. 13 provides XRD spectra for the aggregate and related materials in Example 3.

FIG. 13 provides XRD spectra of aggregate (top spectrum), spray-dried material (middle spectrum), and wolloastonite starting material (bottom spectrum). The XRD spectrum for the wollastonite starting material (top spectrum) indicates that the wollastonite starting material comprises wollastonite-1A and possibly wollastonite-2M (two wollastonite polymorphs), wustite (FeO), and corundum ($Al_2O_3$) phases. The spray-dried material (middle spectrum) shows phases of hydromagnesite ($Mg_5(CO_3)_4(OH).4H_2O$) and aragonite ($CaCO_3$). (Coulometry indicates that the spray-dried material has a % $CO_2$ of 24 wt %, supporting the presence of the observed carbonate phases.) Most of the peaks associated with the wollastonite starting material are still visible; however, several peaks show broadening, indicating that some reactions are occurring between the starting precipitation material and the wollastonite during the above procedure. XRD analysis of the aggregate (top spectrum) indicates that there is little change in the crystalline phases between the spray-dried material and the aggregate.

Figure 14:
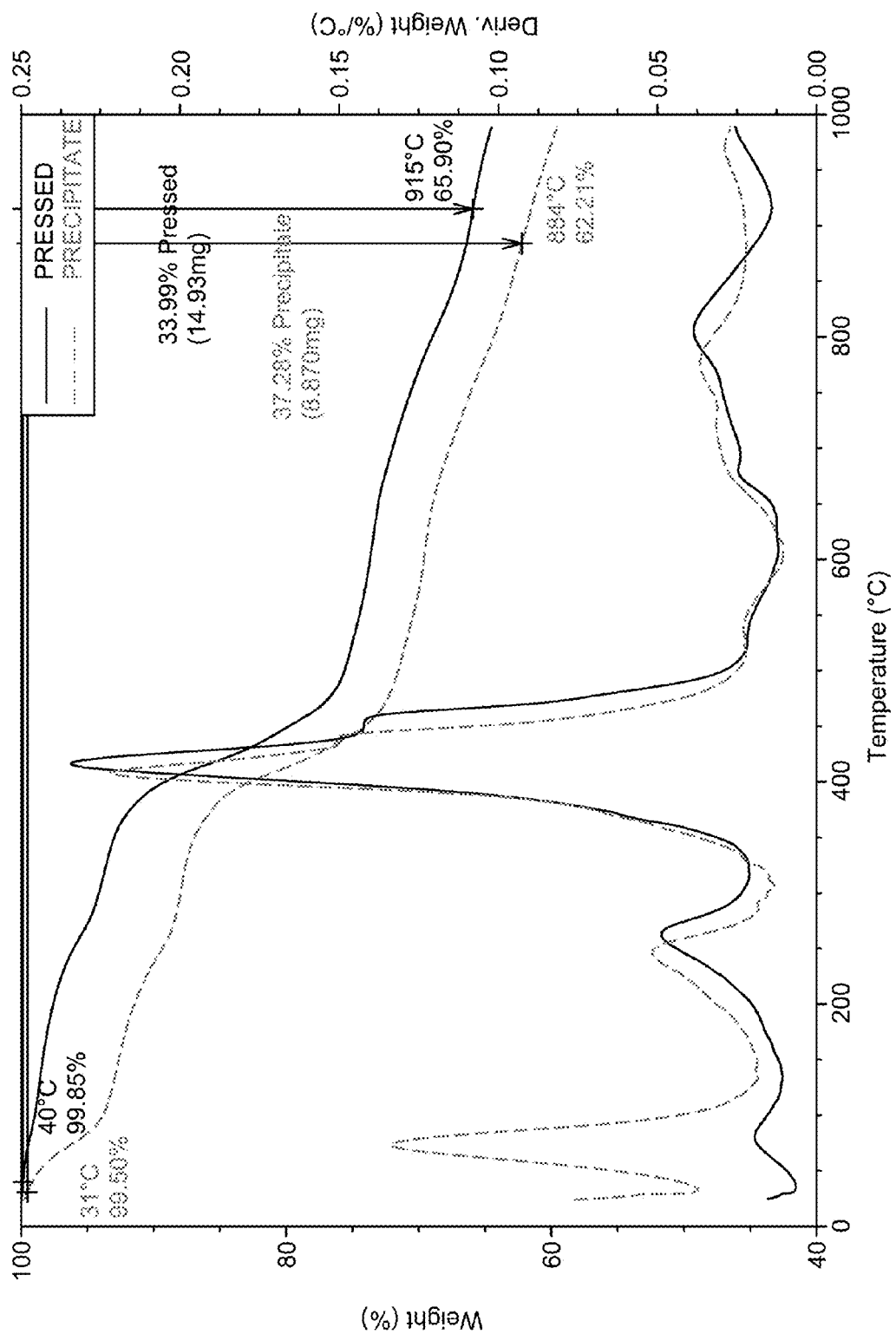
FIG. 14 provides a TGA for the aggregate produced in Example 3.

FIG. 14, which provides a TGA analysis of the aggregate (solid line) and the spray-dried material (dashed line), indicates that water is lost during pressing (first peak below 100° C.), but little other change occurs as a result of pressing. The peaks around 400° C. are indicative of the magnesium carbonate hydrates, and the peaks around 650-680° C. are indicative of calcium carbonates.

Figure 15:
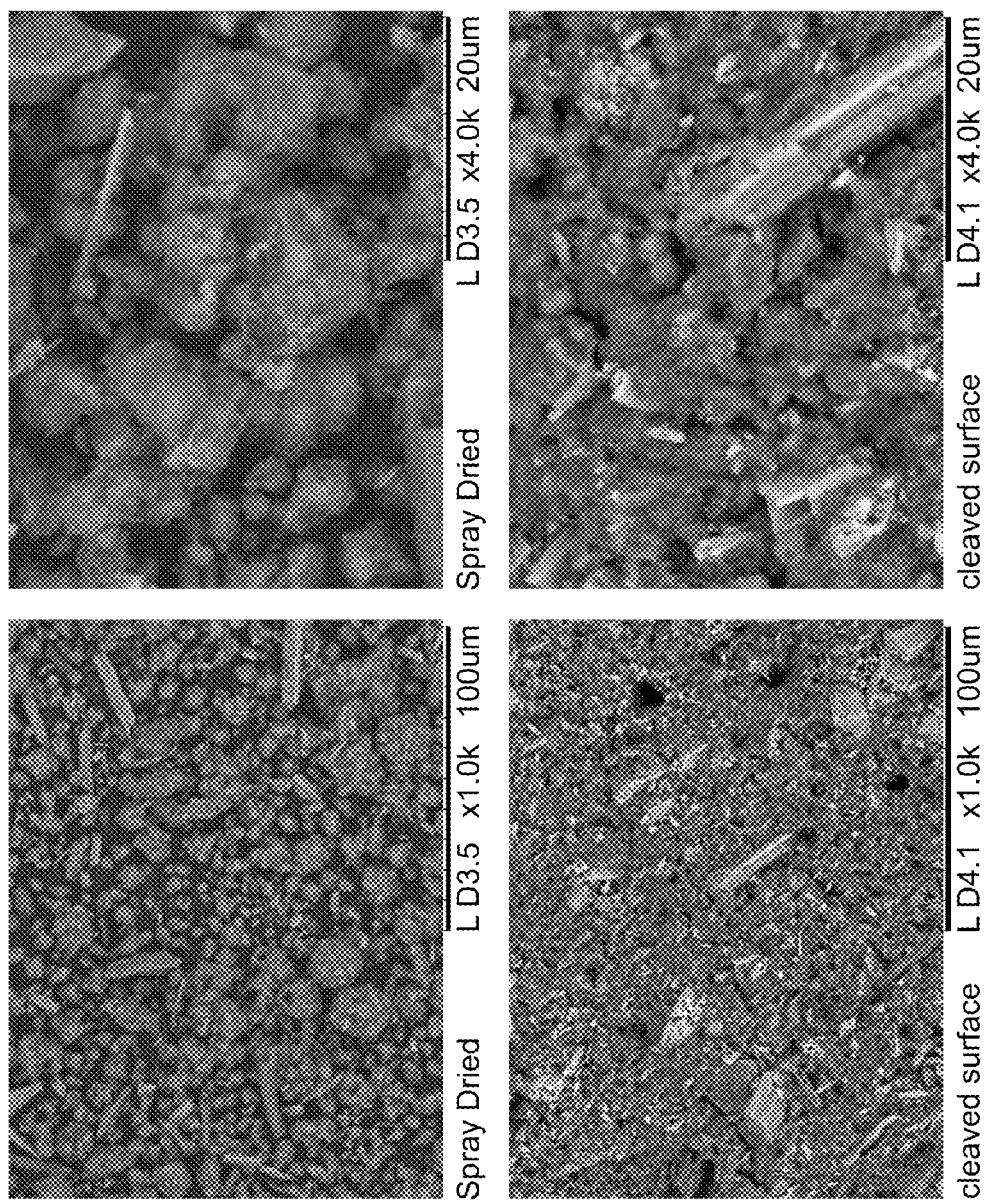
FIG. 15 provides SEM images for the aggregate and related materials in Example 3.

FIG. 15 provides SEM images of the spray-dried material (top) and the aggregate (bottom). In the aggregate, left over crystals of wollastonite (determined by energy-dispersive X-ray spectroscopy (EDS)) appear to be surrounded by a matrix of leftover starting precipitation material. Based on the XRD and the SEM images, it is unclear whether the matrix has additional networking or if it is a packing/densification of the starting precipitation material.

Example 4

Aggregate from Precipitation Material Produced from Fly Ash

Seawater (900 gallons) in a suitably sized reaction vessel was sparged with a gaseous $CO_2$ mixture (comprising 20% $CO_2$ and 80% compressed air) until the pH was consistent at about pH 5.8. With continued sparging, 10 kg of NaOH solution (50% (w/w) NaOH (aq)) was added while the pH was maintained at pH 8.5 or below. To a separate mixing vessel was added Indian River fly ash (25 kg) and water (25 kg) to form a 1:1 mixture of fly ash:water. To the resulting fly ash-water mixture was then added 60 kg of NaOH solution (50% (w/w) NaOH (aq)) with thorough stirring. With continued $CO_2$ sparging, the fly ash-water mixture was added to the reaction mixture in the reaction vessel while the pH of the reaction mixture was maintained at about pH 10.0. Any remaining fly ash-water mixture was flushed from the separate mixing vessel with 10 L of water, after which $CO_2$ sparging was stopped. The reaction mixture was stirred for an additional 10 minutes, and the reaction mixture was transferred to a settling tank and allowed to settle under the action of gravity.

The reaction product was filtered, spray dried, and used to prepare aggregate as described in Example 2, including the optional step of drying the aggregate on an drying rack in a 110° C. oven for 16 hours.

The XRF data for the fly ash starting material and the resulting spray-dried material are given below:

TABLE 8

XRF elemental analysis of fly ash starting material.

| | Na | Mg | Al | Si | S | Cl | K | Ca | Fe |
|---|---|---|---|---|---|---|---|---|---|
| Weight % | 0.00 | 1.12 | 14.63 | 23.68 | 0.24 | 0.48 | 1.95 | 1.17 | 3.69 |

TABLE 9

XRF elemental analysis of spray-dried material.

| | Na | Mg | Al | Si | S | Cl | K | Ca | Fe |
|---|---|---|---|---|---|---|---|---|---|
| Weight % | 15.23 | 6.88 | 4.76 | 6.84 | 0.45 | 11.91 | 1.05 | 3.44 | 1.17 |

TABLE 10

% $CO_2$ (coulometry) and calculated % $H_2O$ from TGA (FIG. 17) for spray-dried material.

| | % $H_2O$ | % $CO_2$ |
|---|---|---|
| Weight % | 10.21 | 12.64 |

Figure 16:
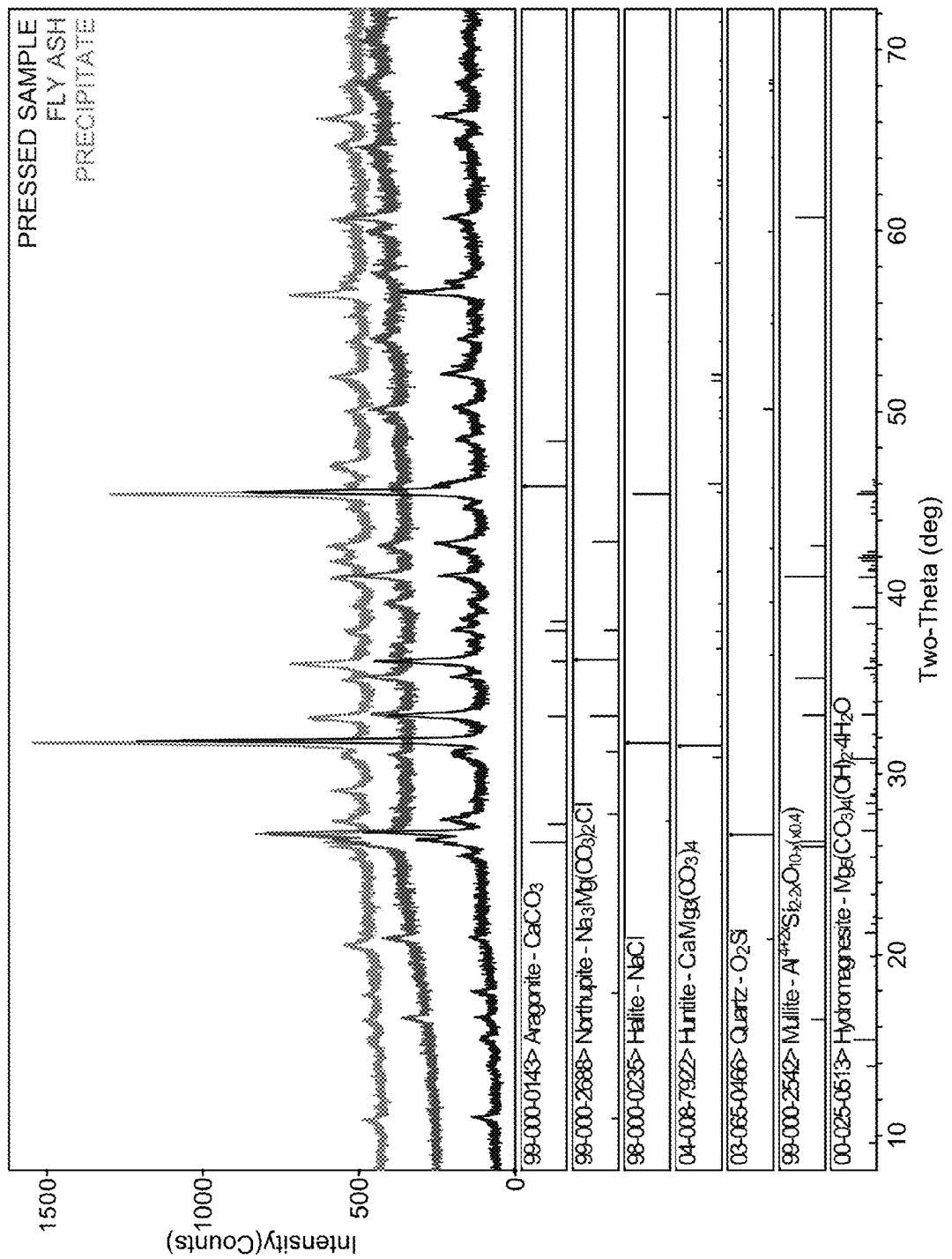
FIG. 16 provides XRD spectra for the aggregate and related materials in Example 4.

FIG. 16 provides XRD spectra for the fly ash starting material (top spectrum), the spray-dried material (middle spectrum), and the aggregate (bottom spectrum). FIG. 16 also provides corresponding phase analysis. The XRD spectrum for the fly ash starting material indicates standard fly ash crystalline phases such as quartz ($SiO_2$) and mullite. The XRD spectrum for the spray-dried material indicates primarily the crystalline fly ash phases (i.e., quartz and mullite), as well as shallow peaks that may be associated with northupite ($Na_2Mg(CO_3)_2Cl$), hydromagnesite ($Mg_5(CO_3)_4(OH)$ .$4H_2O$), halite (NaCl), and aragonite ($CaCO3$). The XRD spectrum for the aggregate shows crystalline phases (e.g., hydromagnesite, halite, northupite, and aragonite) present in the spray-dried material as well as the fly ash phases indicated above. The spray-dried material has a % $CO_2$ of 13 wt %, indicating that there is carbonated material, even if not in crystalline form.

Figure 18:
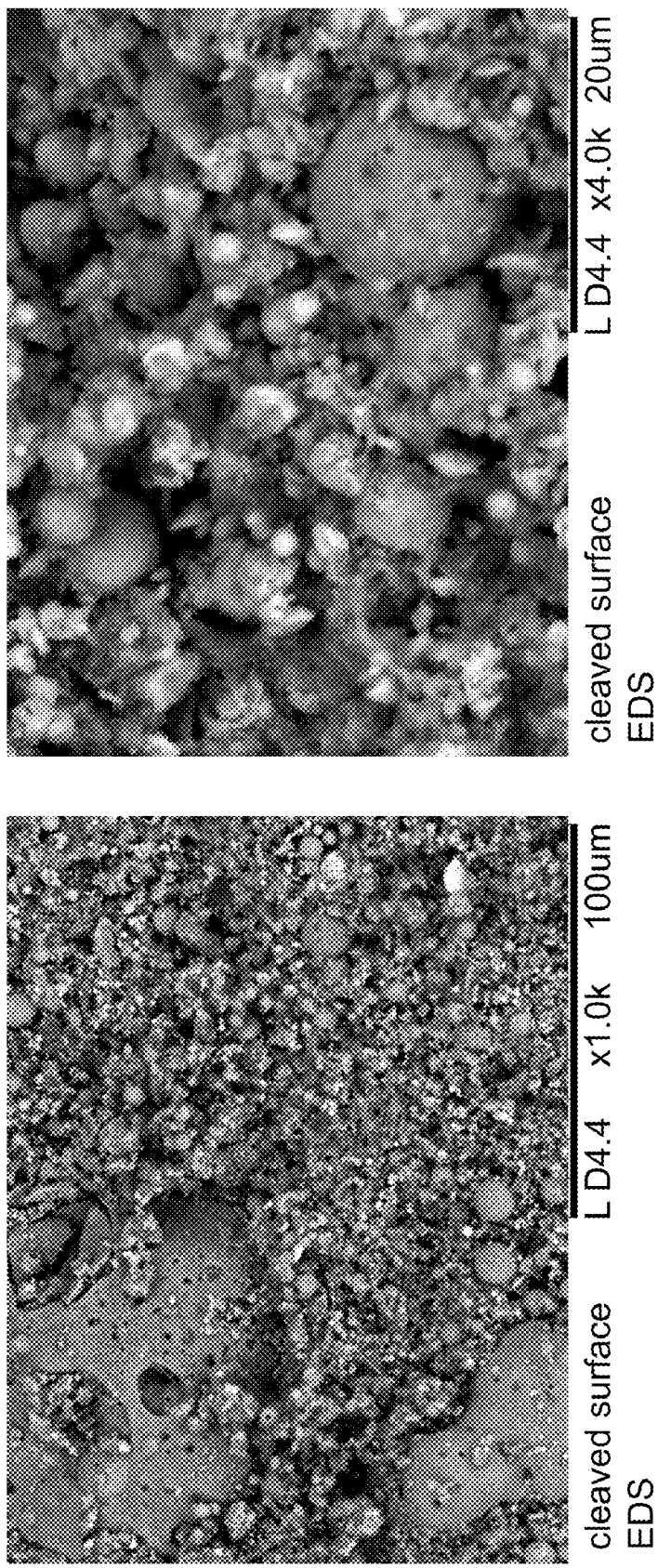
FIG. 18 provides SEM images for the aggregate of Example 4.

FIG. 18 provides SEM images at 1000× (left) 4000× (right) showing a cleaved surface of a sample of aggregate made from fly ash. SEM observations of the aggregate confirm the presence of fly ash starting material in the aggregate; however, a matrix appears around the fly ash, in addition to some crystallites in the matrix. The sample was easy to grind indicating that the matrix may not be well formed, or that it might be a friable material. With the amount of fine fly ash particles dispersed within the matrix, it was inconclusive by SEM-EDS as to whether or not there was silica in the matrix or if the silica contribution was from these fine fly ash particles.

Figure 17:
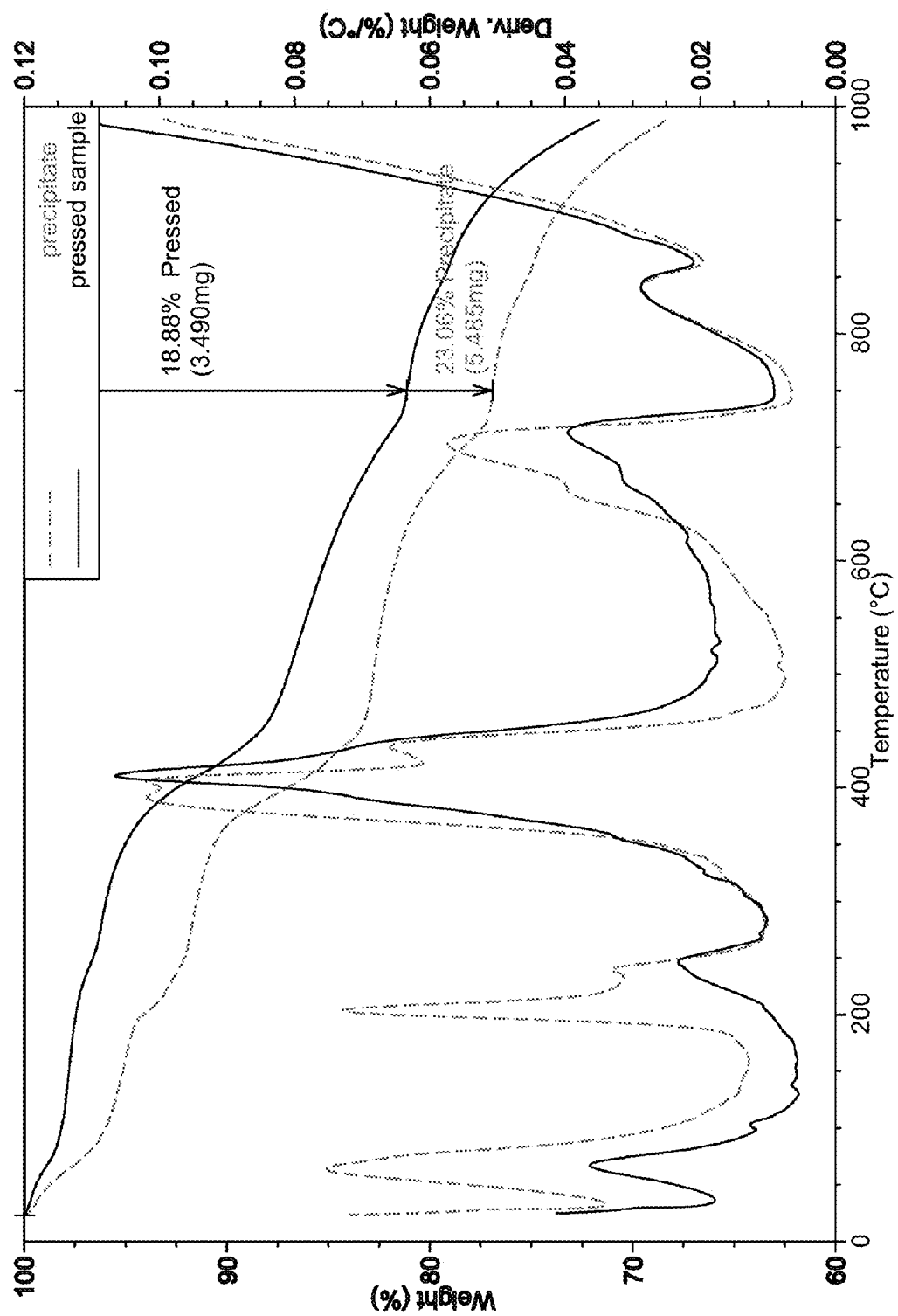
FIG. 17 provides a TGA for the aggregate and related materials in Example 4.

FIG. 17 provides TGA analyses of the spray-dried material and the aggregate. As evidenced by the TGA graphs, water is lost (peaks below 250° C.) during aggregate formation, but there is no notable change in the nature of the phases present from the spray-dried material to the aggregate.

Example 5

Aggregate in Mortars

In general, aggregate from Example 2 was broken into pieces and the pieces of aggregate were sieved to give a #2 sized aggregate, a #4 sized aggregate, #16 sized aggregate, and a fine sand aggregate (as below).

Aggregate Sizes:
Size 1: Retained on a sieve #4 (4.75 mm) [+4]
Size 2: Passing sieve #4 (4.76 mm) but retained on sieve #16 (1.19 mm) [−4/+16]
Size 3: Passing sieve #16 (1.19 mm) but retained on sieve #35 (0.5 mm) [−16/+35]
Rejected: Passing sieve #35 [−35]

Portland cement and water were mixed in a water:cement ratio of 0.50 (1:2) for 1 minute. Aggregate was subsequently added until the mortar reached the correct consistency (i.e., paste covering all the aggregate, but remaining fluid enough to be cast in mortar cubes and finished).

In a first mortar example, the size 3 fraction of aggregate was used to make a sample comprising 5 g of Portland cement, 2.5 g water, and 7.5 g of the size 3 aggregate. The resulting mortar sample became warm after 20 min, reaching a temperature of 31.8° C.

In a second mortar example, the aggregate was used to make 2" cubes comprising 309 g of Portland cement, 155 g of water, and 338 g of aggregate (179 g of the size 1 (coarse) fraction and 159 g of the size 2 (intermediate) fraction). The cubes were then cast and allowed to age for about 60 hours in a 98% relative humidity room at 23° C.

Example 6

Aggregate Containing Aragonite

A suitably sized reaction vessel was charged with 900 gallons of seawater collected from Moss Landing, Calif. on Oct. 10, 2008, and stirred with an overhead stirrer. A gaseous mixture of carbon dioxide (20% $CO_2$ and 80% compressed air) was sparged into the seawater at a flow rate of 5 scfm for the $CO_2$ and 20 scfm for the compressed air. With continued sparging, 3.4 kg (dry weight) magnesium hydroxide (waste from a seawater magnesia plant, the magnesium hydroxide comprising 85% $Mg(OH)_2$, 12% $CaCO_3$, and about 3% $SiO_2$) was slowly added.

When the pH dropped to about pH 7.0 (±0.1), 50% NaOH solution (50% (w/w) NaOH (aq)) was added. The pH of the reaction mixture was adjusted to about pH 7.9, after which the pH was maintained at about pH 7.9 (±0.2) by manually controlling the addition of NaOH while continuously sparging the reaction mixture with the gas mixture. If the pH was less than pH 7.9, 50% NaOH solution was added. If the pH was greater than or equal to 7.9, the addition of 50% NaOH was stopped. After 43 kg of the 50% NaOH solution had been added, no further 50% NaOH solution was added; however, the reaction mixture was continuously sparged until the pH was about pH 7.4 (±0.1). At this point, sparging was stopped.

Additional 50% NaOH was then added to the reaction mixture until the reaction mixture was pH 8.5 (that of the initial seawater). The overhead stirrer was subsequently stopped and the contents of the reaction vessel were transferred to a settling tank. The reaction mixture (a slurry) was then allowed to sit for more than 1.5 hours, allowing for the precipitation material to settle under the action of gravity.

TABLE [[#]]

Detailed data for reaction.

| Elapsed Time | pH | Gas Flow Status | CO2 Flow Rate (scfm) | Air Flow Rate (scfm) | Base Weight (kg) | Temperature (C.) |
|---|---|---|---|---|---|---|
| 0:00 | 8.47 | On | 5 | 20 | 0 | 15.1 |
| 1:05 | 7.88 | On | 5 | 20 | 17.5 | 16.6 |
| 1:27 | 7.94 | On | 5 | 20 | 25 | 17.2 |
| 1:32 | 8.04 | On | 5 | 20 | 27.5 | 17.3 |
| 1:43 | 7.95 | On | 5 | 20 | 30.5 | 17.6 |
| 1:53 | 7.94 | On | 5 | 20 | 33.5 | 17.8 |
| 2:00 | 7.00 | On | 5 | 20 | 0 | 15.1 |
| 2:00 | 8.22 | On | 5 | 20 | 40.5 | 18.2 |
| 2:16 | 8.00 | On | 5 | 20 | 43 | 18.4 |
| 2:20 | 7.90 | On | 5 | 20 | 43 | 18.5 |
| 2:28 | 8.00 | Off | 5 | 20 | 45 | 18.5 |
| 2:30 | 8.44 | Off | 5 | 20 | 48.5 | 18.8 |

After settling, the precipitation material was separated from the supernatant and dewatered by filtration (filter press). A portion of the precipitation material was subsequently oven-dried in sheet pans at 110° C. for 48 hours, crushed by hand, and ground in a blender.

As evidenced in Table 1 below, the precipitation material produced by the above method had a Mg:Ca weight ratio of about 1:7.

TABLE 1

XRF elemental analysis of MLD6P00006-204 sample

| | Na | Mg | Al | Si | S | Cl | K | Ca | Fe |
|---|---|---|---|---|---|---|---|---|---|
| Weight % | 1.30 | 4.17 | 0.46 | 0.87 | 0.09 | 1.26 | 0.09 | 28.43 | 0.26 |

Figure 19:
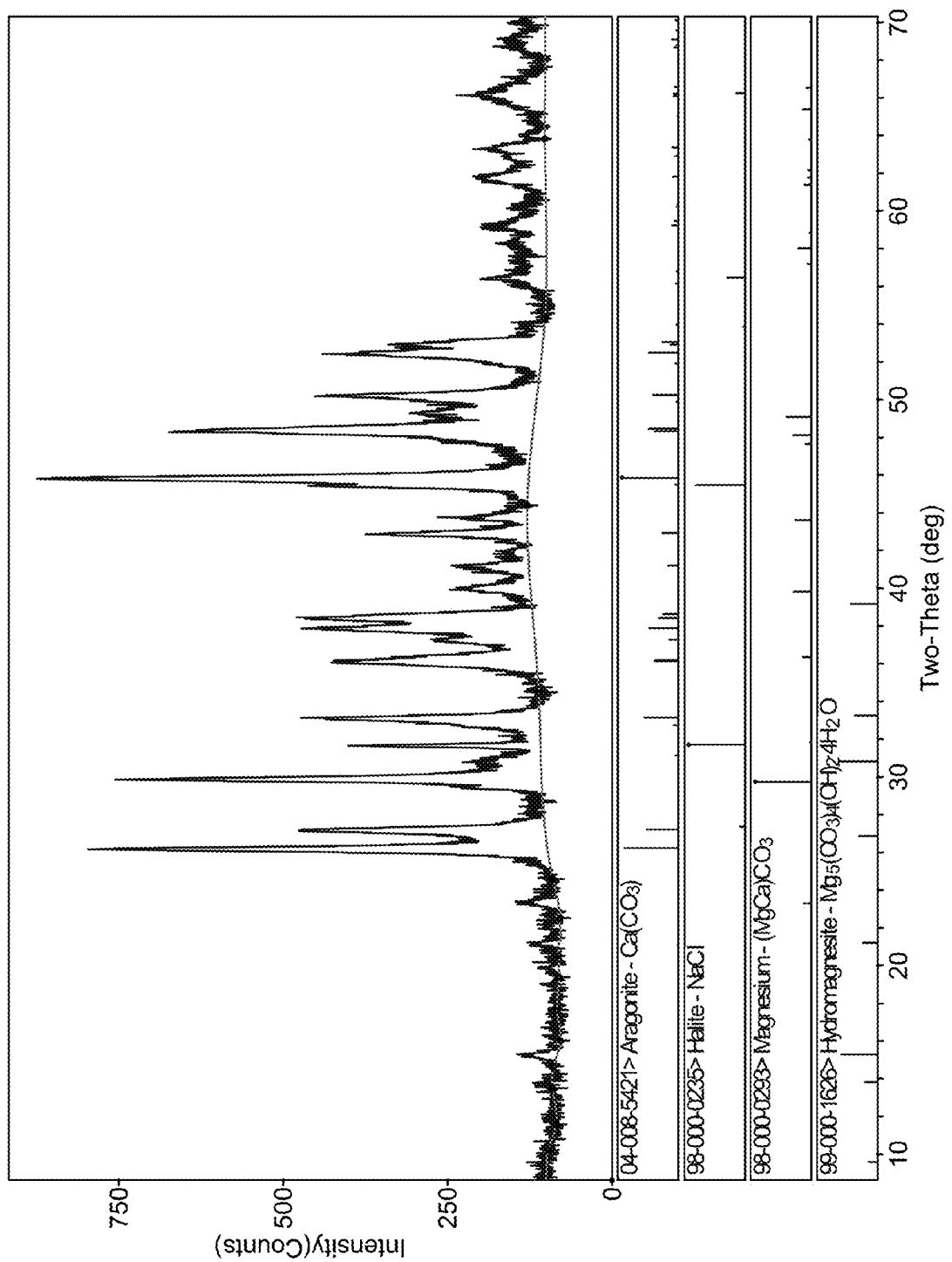
FIG. 19 provides an XRD spectrum for the precipitation material produced in Example 6.

The XRD analysis (FIG. 19) of the oven-dried precipitation material indicated the presence of aragonite ($CaCO_3$) as a major phase, halite (NaCl), and some magnesium calcite ($Mg_xCa_{(1-x)}CO_3$ with x~4% molar) and hydromagnesite ($Mg_5(CO_3)_4(OH)_2 \cdot 4H_2O$) as minor components.

TABLE 2

% $CO_2$ content (coulometry) and calculated % $H_2O$ from TGA

| | % $H_2O$ | % $CO_2$ |
|---|---|---|
| Weight % | 5.58 | 38.46 |

Figure 20:
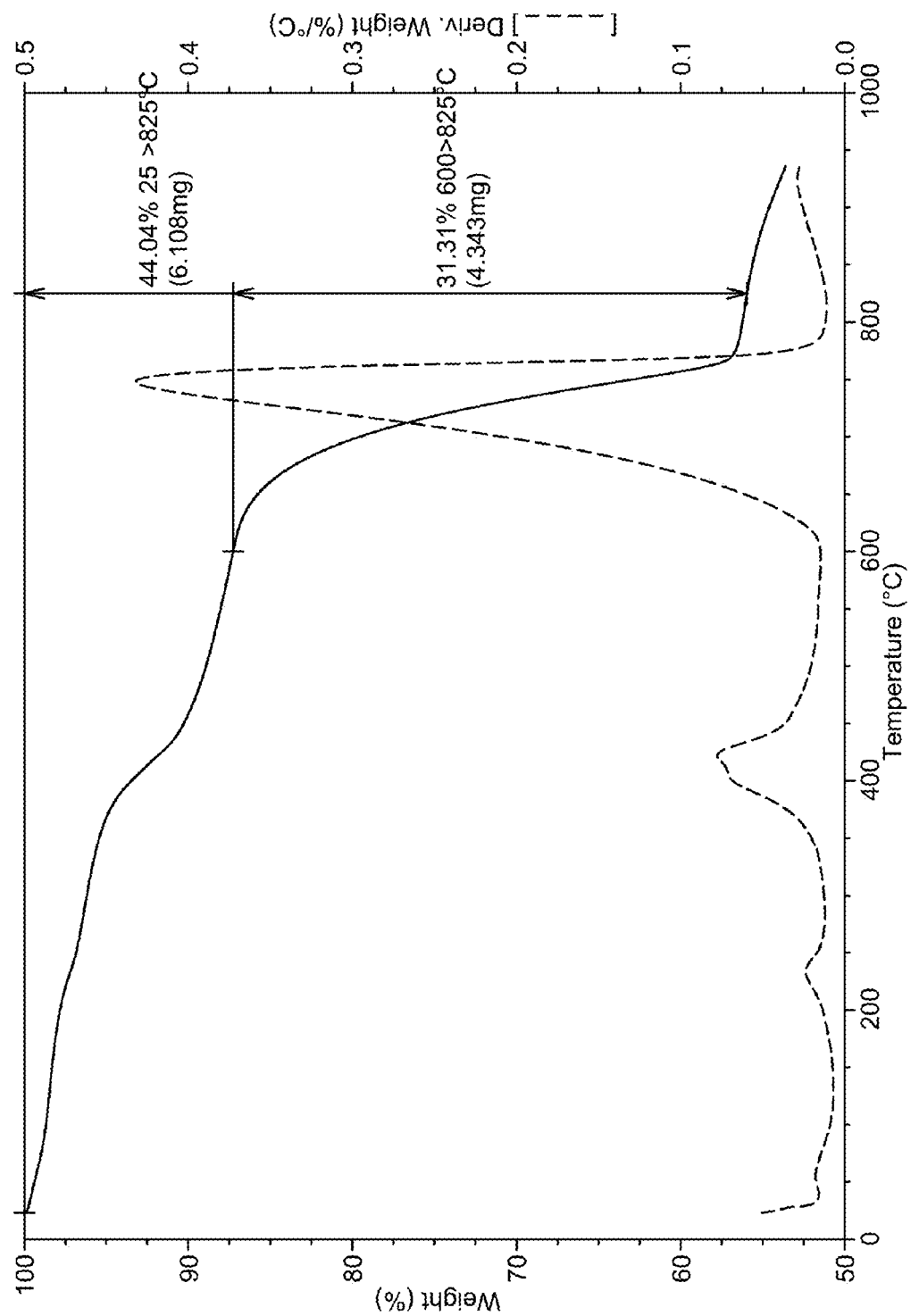
FIG. 20 provides a TGA for the precipitation material produced in Example 6.
Figure 21:
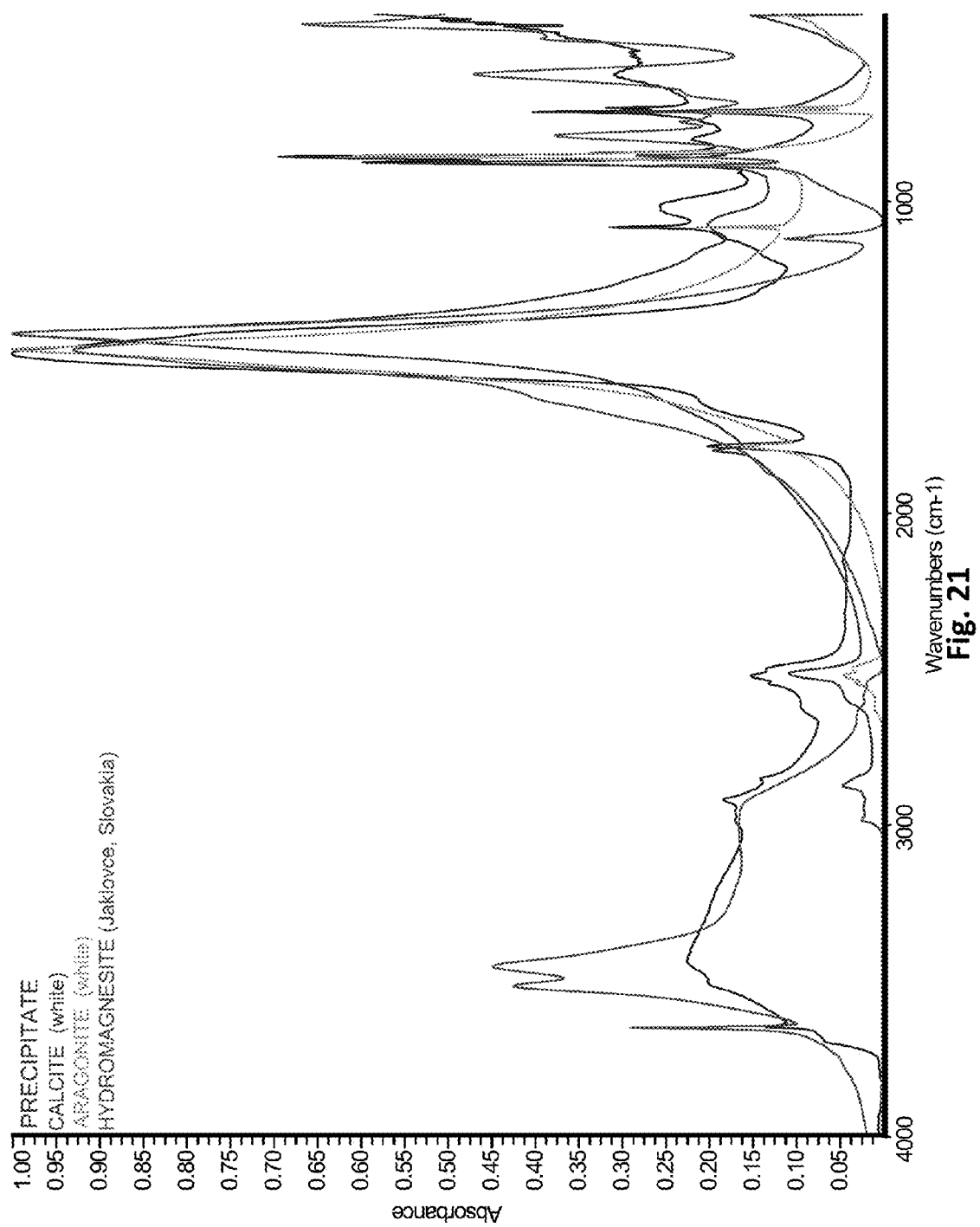
FIG. 21 provides an FT-IR spectrum for the precipitation material produced in Example 6.

FIGS. 20-22 provide spectra and images of the precipitation material: FIG. 20 provides a TGA of the precipitation material; FIG. 21 provides an FT-IR of the precipitation material; and FIG. 22 provides SEM images of the precipitation material at 250× (left) and 4000× (right).

As described for Example 2 above, the steel molds of the Wabash hydraulic press were cleaned and the platens were preheated such that the platen surfaces were at 90° C. for a minimum of 2 hours.

The oven-dried precipitation material was then crushed and ground in a blender such that the ground material passed a No. 8 sieve. The ground material was then mixed with water resulting in a mixture that was 90% solids with the remainder being the added water.

A 4"×8" mold in the Wabash press was filled with the wet mixture of ground precipitation material and a pressure of 60 tons was applied to the precipitation material for about 10 seconds. The pressure was then released and the mold was reopened. Precipitation material that stuck to the sides of the mold was scraped and moved toward the center of the mold. The mold was then closed again and a pressure of 60 tons was applied for a total of 5 minutes. The pressure was subsequently released, the mold was reopened, and the pressed precipitation material (now aggregate) was removed from the mold and cooled under ambient conditions. Optionally, the aggregate may be transferred from the mold to a drying rack in a 110° C. oven and dried for 16 hours before cooling under ambient conditions.

The aggregate was moderately easy to break and grind for analytical preparation.

Figure 23:
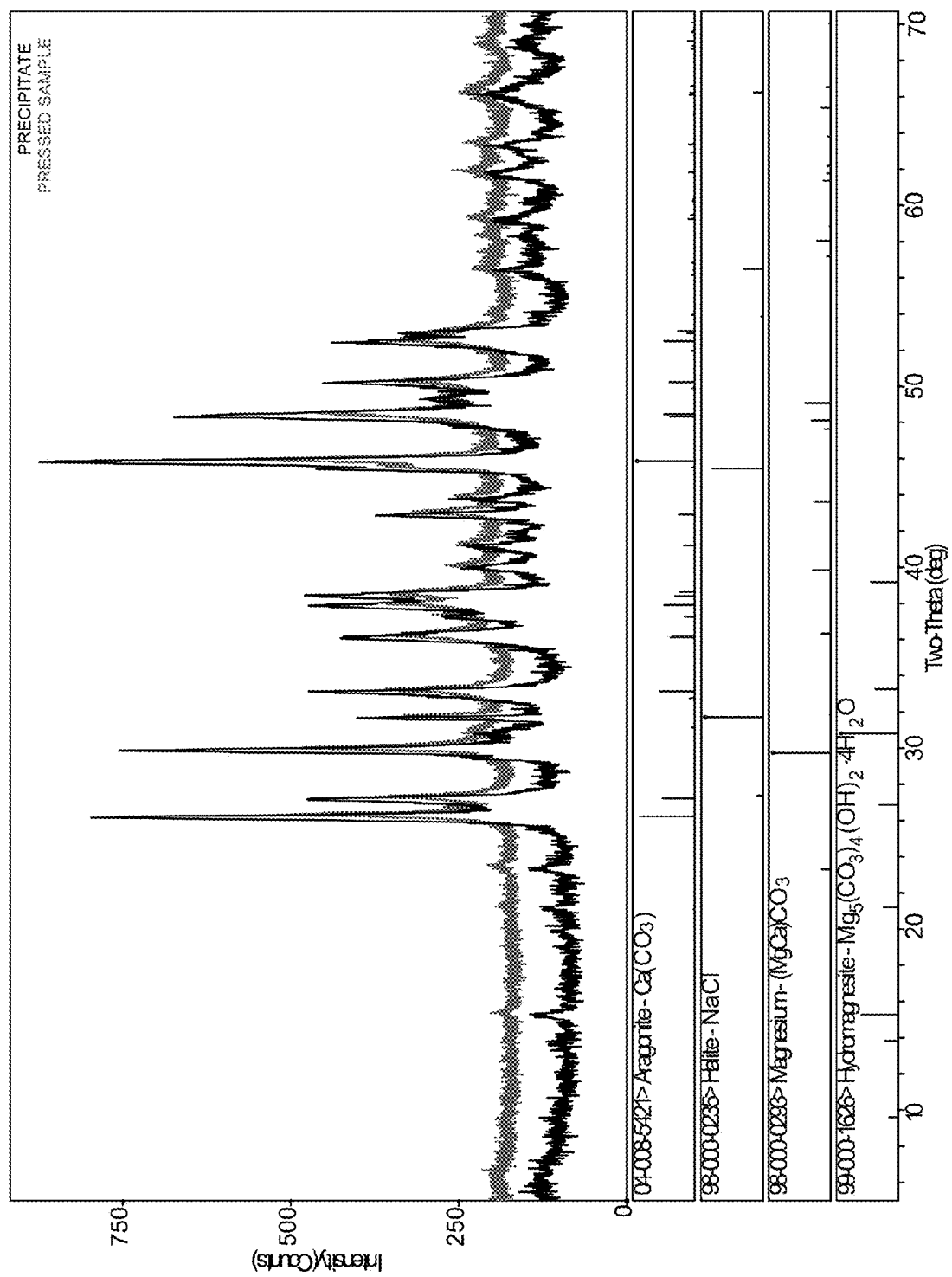
FIG. 23 provides XRD spectra for the aggregate and a related material in Example 6.
Figure 24:
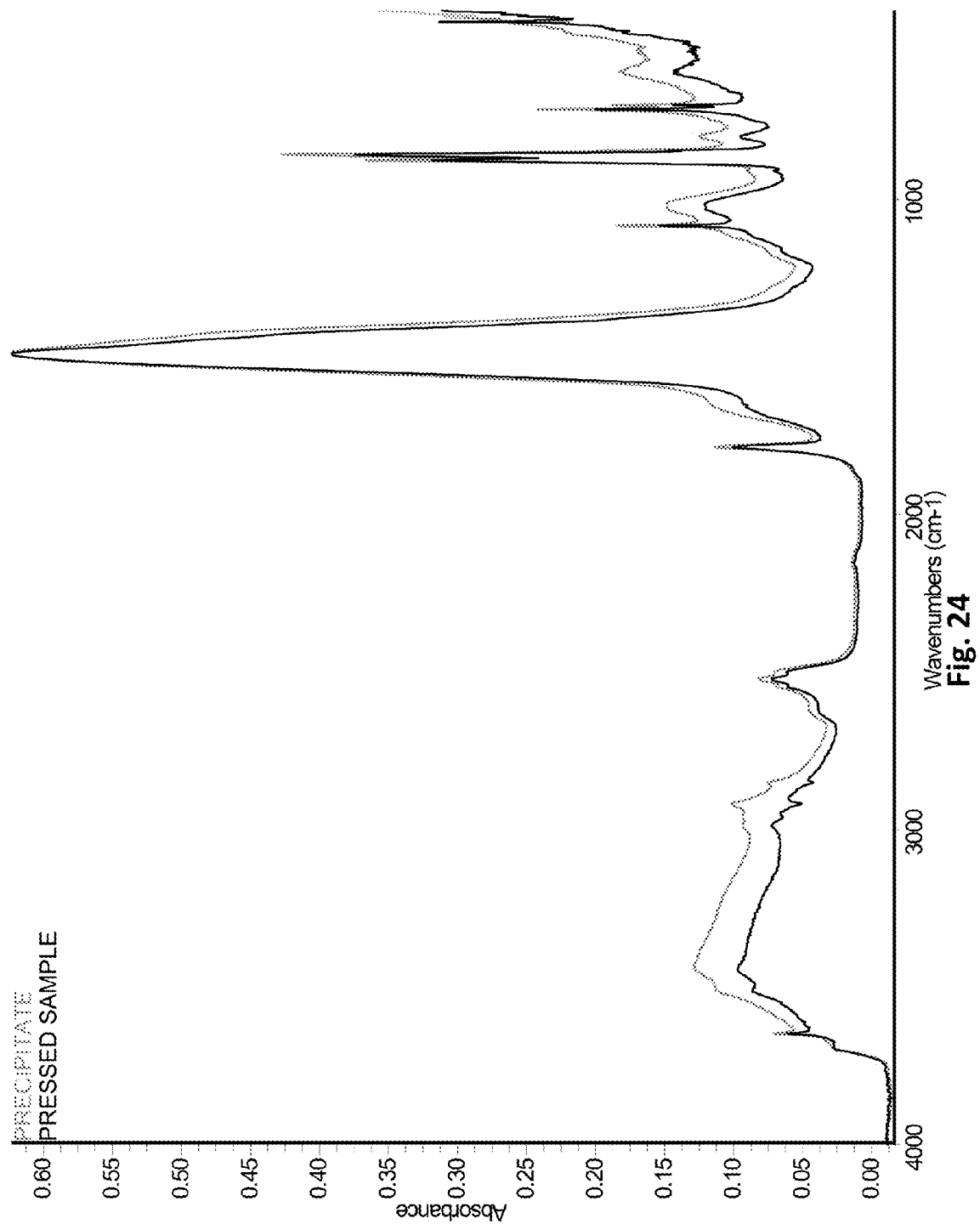
FIG. 24 provides an FT-IR spectra for the aggregate and a related material in Example 6.
Figure 25:
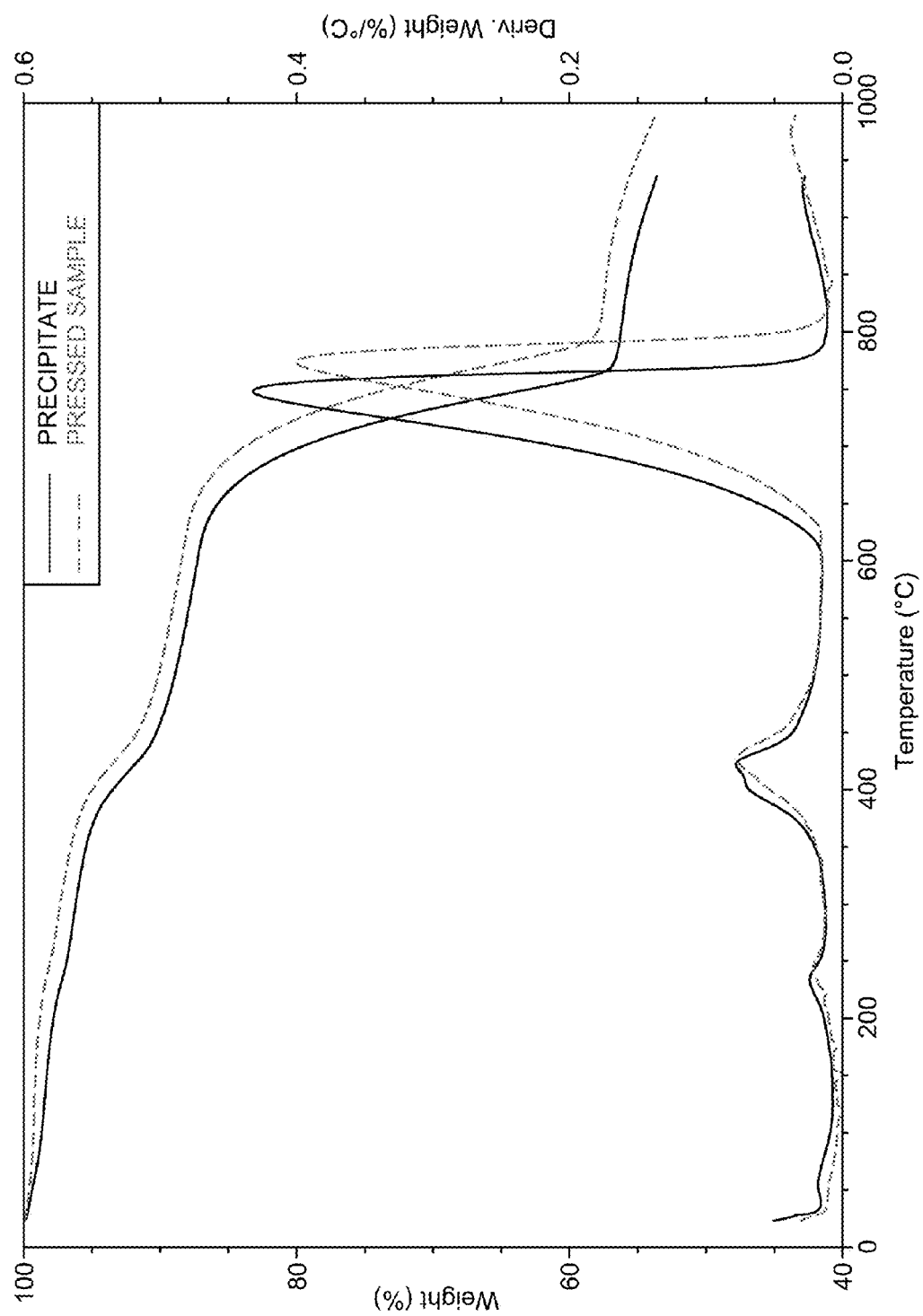
FIG. 25 provides a TGA for the aggregate and a related material in Example 6.

FIGS. 23-26 provide spectra and images of the aggregate: FIG. 23 provides XRD spectra for the aggregate and the precipitation material from which the aggregate was prepared; FIG. 24 provides an FT-IR of the aggregate; FIG. 25 provides a TGA of the aggregate; and FIG. 25 provides SEM images of the aggregate at 1000× (left) and 4000× (right).

As evidenced by FIGS. 23-25, a compositional change did not result from pressing and subsequent drying of the precipitation material. The SEM images appear to indicate a packing of the particles in the aggregate, but limited to absence of formation of a matrix.

Example 7

Aggregate Formed by Extruding the Precipitate

In this example, a sample of precipitated carbonates prepared essentially as described in Example 1 and comprising nesquehonite and aragonite and containing approximately 60% by weight water was placed into a heated, vented 1.5 inch diameter barrel extruder. The extruder was heated to approximately 220° C., and the material was placed in the extruder for approximately five seconds. The opening of the extruder exit die was 0.375 inch. Material was obtained from the extruder comprising hydromagnesite and calcite as well as the starting minerals with a water content of less than 10%. However, much of the material lithified prematurely within the extruder to produce a cake mass. This caked mass was subsequently oven-dried at 60 degrees ° C. to produce a hard, friable mass that was broken into fine aggregate particles.

Example 8

Aggregate Formed by Wet Milling the Precipitate with Ethanol

In this example an aggregate was prepared by wet-milling the precipitate with ethanol. In preparing this example, a sample of precipitated carbonate prepared essentially as described in Example 1 above was filtered on a standard industrial filter press to produce a filter cake that was approximately 50% solids. A 10% ethanol w/w solution was added to the precipitate and the mixture was ball milled for 2-24 hours. The milled precipitate was then dried in a fume hood in ambient air overnight. The resultant product obtained was a dense, self-consolidated sheet that was broken up into fragments suitable for coarse or fine aggregates. The Mohs hardness of the product was at least 2.

Example 9

Fine Synthetic Aggregate from Carbonate Precipitate

Fine Synthetic Aggregate (FSA) is a synthetic aggregate similar to sand particles and is prepared from the present precipitated carbonate using methods as described herein.

FSA is intended to be blended into concrete mixes and can replace a portion or all of the fine aggregate (sand) in concrete mixes to balance with its sequestered carbon content the emitted carbon content of the Portland cement. Usages are expected to be several hundred pounds per cubic yard, as each 100 pounds of portland cement will require about 200 pounds of FSA to make carbon neutral concrete. A 6 sack mix with 50% fly ash will require 564 pounds of FSA to be carbon neutral; at 25% flyash 846 pounds; with 100% OPC 1128 pounds will be required. Typical sand contents of concrete are 1100-1600 pounds.

Use of FSA to produce carbon-reduced or carbon-neutral concrete will assist the concrete industry in meeting burgeoning greenhouse gases reduction legislation. Use of FSA could provide innovation carbon credits as well as the recycled materials credit. Because FSA is a filler replacing another filler, acceptance is expected be much quicker and easier than a product that replaces a portion of the cementitious material. FSA can be used in concrete, stucco, gunnite, etc. as a replacement for sand, in order to reduce or eliminate the carbon footprint of these products.

Key characteristics of FSA include:
Calcium and magnesium carbonate composition
Minimum 45% captured $CO_2$ content
Particle size range, based on cumulative % passing through the sieve:
  100% passing #4 screen (4,750 u)
  95-98% passing #8 screen (2,360 u)
  65-75% passing #16 screen (1,180 u)
  40-50% passing #30 screen (600 u)
  10-15% passing #50 screen (300 u)
  0-2% passing the #100 screen (150 u)
Particle size distribution consistent to within 10% lot-to-lot
Conforms to ASTM C-33
Flow properties in concrete at carbon-neutral level unchanged or improved versus sand at similar water contents
Strength properties in concrete at carbon-neutral level unchanged or improved versus sand at similar water contents
Durability properties (ASR, freeze-thaw, etc.) in concrete at carbon-neutral level unchanged or improved versus sand at similar water contents
Shrinkage properties in concrete at carbon-neutral level unchanged or improved versus sand at similar water contents
Finishability of concrete at carbon-neutral level unchanged or improved versus sand at similar water contents
Leachable NaCl content <0.1%
Be stable during storage and transport Example 10

Coarse Synthetic Aggregate from the Present Carbonate Precipitate

Coarse Synthetic Aggregate (CSA) designates an aggregate with a particle size range of ¼" to 1 ½". CSA prepared by methods as described herein and is intended to be used where natural coarse aggregate is currently used. Largest uses will be in road bases, asphalt and concrete. Use of CSA to produce carbon-reduced or carbon-neutral concrete assists the concrete industry in meeting green house gases reduction legislation such as CA AB32. Use of CSA could provide carbon credits as well as the recycled materials credit. Because CSA is a filler replacing another filler, acceptance is much quicker and easier than a product that replaces a portion of the cementitious material.

CSA can be used where similarly graded gravel or crushed stone are used. Silicaceous CSA produced at plants using flyash or mafic minerals as cation sources may be restricted to roadbase and asphalt usage. CSA is intended to be used in any way which natural coarse aggregate is currently used. Largest uses will be in road bases, asphalt and concrete.

Based on plant location and cation/base source, two grades of CSA are available. One is a 100% carbonate material (Carbonate CSA) that will be suitable for all uses. The other grade (Silaceous CSA) will only be used in asphalt and road base due to the potential for Alkali-Silica reactivity (ASR) if used in concrete.

Key characteristics of FSA include:
Meets industry standards (ASTM C033) for coarse limestone aggregate
Meets Caltrans specifications for coarse aggregate for concrete, asphalt and road base
Minimum 44% captured $CO_2$ content in all-carbonate CSA
Minimum 30% captured $CO_2$ content in silaceous CSA
Consistent gradation
Does not reduce workability, mechanical properties, shrinkage or durability of road base, asphalt or concrete versus conventional coarse aggregate.
Leachable NaCl content <0.1% for carbonate CSA used in concrete applications
Be stable during storage and transport in an uncovered, exposed to the elements setting Example 11

Measurement of $\delta^{13}C$ Value for a Solid Precipitate

A solid precipitate comprising carbonates was produced from seawater by bubbling commercially available $CO_2$ (Praxair) through the seawater followed by adjustment of the pH. Two precipitates were produced in two different procedures (P00361 and MLD13). Unlike atmospheric gases, air separation is not the primary source of carbon dioxide in the bottled gas. Though sometimes it is derived from directly combusting a fuel, the most economical way to produce carbon dioxide is to recover it as a byproduct from other companies' manufacturing processes or from natural wells. Then it is purified and liquefied and sold to customers worldwide. In general, $\delta^{13}C$=approx. −30‰ to −20‰ for bottled gas from fermentation, and $\delta^{13}C$=approx. −40‰ to −30‰ bottled gas from petroleum sources. Thus, the bottled gas was expected to be isotopically light (like flue gas) and in the range of −20‰ to −40‰. For comparison, the $\delta^{13}C$ value for $CO_2$ in seawater is about 0, that of air no more negative than −10‰, and for carbonates in natural limestone the $\delta^{13}C$ value is ±3‰. If the carbonates in the precipitate contained predominantly $CO_2$ from the bottled gas, their $\delta^{13}C$ values would be expected to be in the −20‰ to −40‰ range, as well, not closer to 0 as for $CO_2$ from seawater or air, or carbonates in natural limestone.

$\delta^{13}C$ values for the two precipitates were measured by mass spectrometry. Duplicate samples were run for each precipitate. $\delta^{13}C$ values that do not correspond with typical values for natural limestone and seawater, and that correspond to the isotopically light $CO_2$ expected to be found in the bottled gas, were measured in the precipitates, see table below ($\delta^{18}O$ values were also measured):

| Sample ID | d13C (‰) uncor | StDev | | d18O (‰) uncor | StDev | | d13C (‰) corr | d18O (‰) corr |
|---|---|---|---|---|---|---|---|---|
| P00361-001 | −29.42 | 0.01 | 0 | −11.51 | 0.01 | 1 | −31.44 | −12.44 |
| P00361-004 | −29.73 | 0.01 | 0 | −7.84 | 0.01 | 0 | −31.16 | −8.32 |
| MLD13P00001-105 | −27.75 | 0.01 | 0 | −7.25 | 0.01 | 0 | −28.40 | −7.54 |
| MLD13P00001-006 | −27.66 | 0.01 | 0 | −7.23 | 0.00 | 1 | −27.42 | −7.28 |

This example demonstrated that $\delta^{13}C$ values for carbonate-containing precipitates produced according to methods included in the invention can be measured with high precision, and that such $\delta^{13}C$ values are in the predicted negative range for $CO_2$ from industrial sources, which differentiates it from carbonates in natural limestones or $CO_2$ from air or seawater.

Example 12

Measurement of $\delta^{13}C$ Value for a Solid Precipitate and Starting Materials This Example demonstrates precipitation of carbonate material from saline solution using bottled carbon dioxide ($CO_2$) and a magnesium rich industrial waste material and determination of $\delta^{13}C$ values for materials and product. The procedure was conducted in a container open to the atmosphere.

The starting materials were commercially available bottled $CO_2$ gas, seawater, and brucite tailings from a magnesium hydroxide production site as the industrial waste source of base. The brucite tailings were approximately 85% $Mg(OH)_2$, 12% $CaCO_3$ and 3% $SiO_2$.

A container was filled with locally available seawater (around Santa Cruz, Calif.). Brucite tailings were added to the seawater, providing a pH (alkaline) and divalent cation concentration suitable for carbonate precipitation and $CO_2$ gas was sparged into the alkaline seawater solution. Sufficient time was allowed for interaction of the components of the reaction, after which the precipitate material was separated from the remaining seawater solution, also known as the supernatant solution. Elevated temperature or other special procedures were not used to dry the precipitate carbonate material. The carbonate material was characterized using $\delta^{13}C$ analysis, x-ray diffraction (XRD) analysis, and scanning electron microscopy (SEM).

Figure 27:
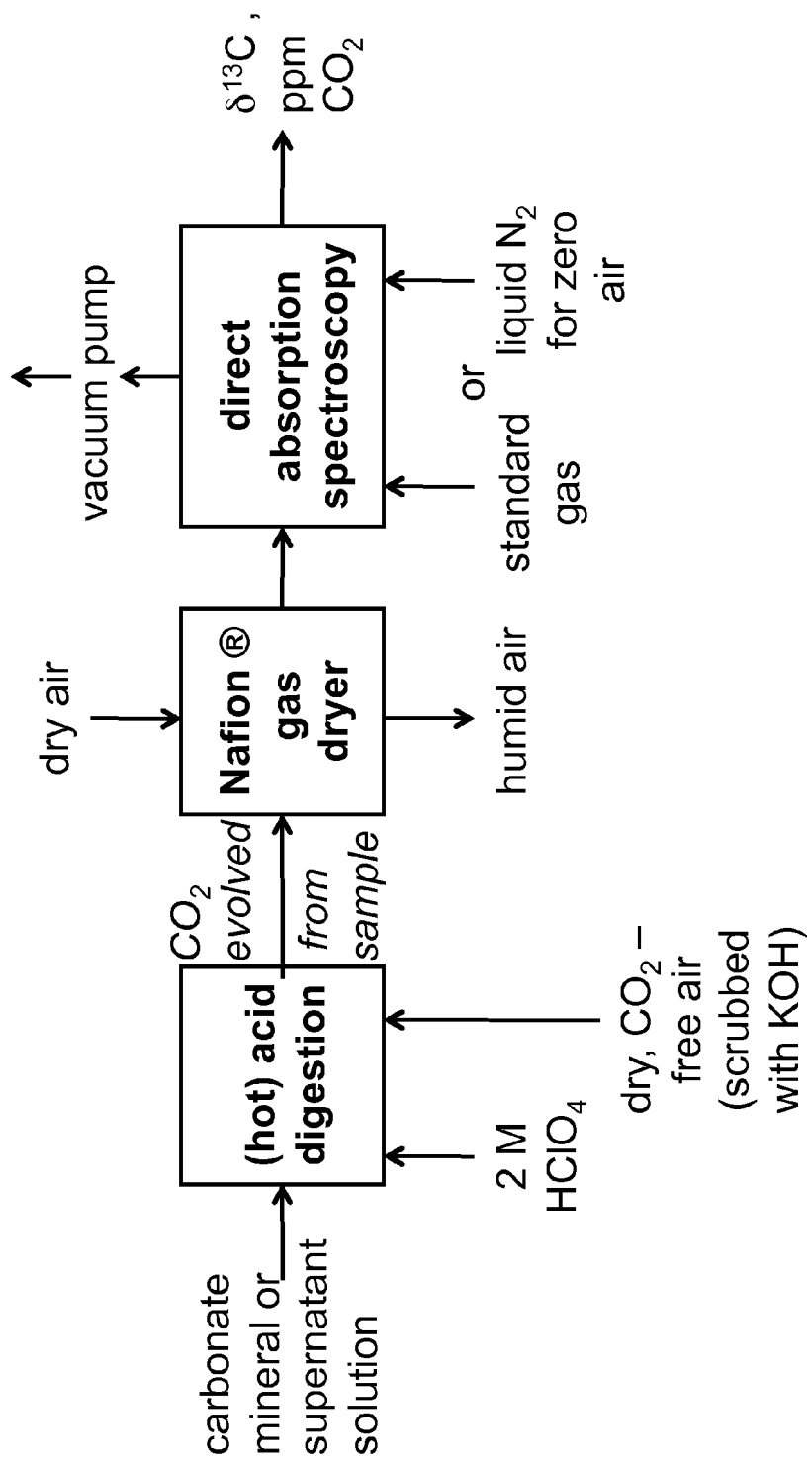
FIG. 27 presents a graphical illustration of the procedure for preparing a sample and measuring carbon isotope values in the sample

$\delta^{13}C$ values for the process starting materials, precipitate carbonate material and supernatant solution were measured. The $\delta^{13}C$ value for the atmospheric air was not measured, but a value from literature is given in Table 3. The analysis system used was manufactured by Los Gatos Research and uses direct absorption spectroscopy to provide $\delta^{13}C$ and concentration data for gases ranging from 2% to 20% $CO_2$. The instrument was calibrated using standard gases, and measurements of travertine and IAEA marble #20 yielded values that were within measurement error of the accepted values found in literature. The $CO_2$ source gas was sampled using a syringe. The $CO_2$ gas was passed through a gas dryer, then into the bench-top commercially available analysis system. Solid samples, such as the brucite tailings and precipitate, were first digested with perchloric acid (2M $HClO_4$). $CO_2$ gas was evolved from the digestion, and then passed into the gas dryer. From there, the gas passed into the analysis system, resulting in carbon isotopic fractionation data. This digestion process is shown in FIG. 27. Similarly, the supernatant solution was digested to evolve $CO_2$ gas that was then dried and passed to the analysis instrument resulting in $\delta^{13}C$ data.

Measurements from the analysis of the $CO_2$ source, industrial waste (brucite tailings), carbonate precipitate, and supernatant solution are listed in Table 3. The $\delta^{13}C$ values for the precipitate and supernatant solution were −31.98‰ and −38.59‰, respectively. The $\delta^{13}C$ values of both products of the reaction reflect the incorporation of the $CO_2$ source ($\delta^{13}C$=−41.39‰) and the influence of the brucite tailings that included some calcium carbonate ($\delta^{13}C$=−6.73‰). This Example illustrates that $\delta^{13}C$ values may be used to confirm the primary source of carbon in a carbonate composition.

TABLE 3

EXPERIMENTAL SOURCE MATERIALS AND VALUES MEASURED FOR ISOTOPIC FRACTIONATION CHARACTERIZATION

| EXAMPLE | ATMOSPHERE $\delta^{13}C$ VALUE [‰][1] | $CO_2$ SOURCE | $CO_2$ SOURCE $\delta^{13}C$ VALUE [‰] | BASE SOURCE | BASE $\delta^{13}C$ VALUE [‰] | SUPERNATANT SOLUTION $\delta^{13}C$ VALUE [‰] | PRECIPITATE $\delta^{13}C$ VALUE [‰] |
|---|---|---|---|---|---|---|---|
| 10 | −8 | bottled gas, source 1 | −41.39 | $Mg(OH)_2$ + $Ca(CO)_3$ tailings | −6.73 | −38.59 | −31.98 |
| 11 | −8 | bottled gas conforming to NIST RM8563[2] | −41.56 | $Mg(OH)_2$ + $Ca(CO)_3$ tailings | −6.73 | −34.16 | −30.04 |

TABLE 3-continued

EXPERIMENTAL SOURCE MATERIALS AND VALUES MEASURED
FOR ISOTOPIC FRACTIONATION CHARACTERIZATION

| EXAMPLE | ATMOSPHERE $\delta^{13}C$ VALUE [‰][1] | $CO_2$ SOURCE | $CO_2$ SOURCE $\delta^{13}C$ VALUE [‰] | BASE SOURCE | BASE $\delta^{13}C$ VALUE [‰] | SUPERNATANT SOLUTION $\delta^{13}C$ VALUE [‰] | PRECIPITATE $\delta^{13}C$ VALUE [‰] |
|---|---|---|---|---|---|---|---|
| 12 | −8 | flue gas from propane burner | −25.00 | $Mg(OH)_2$ + $Ca(CO)_3$ tailings | −6.73 | −24.8 | −19.92 |
| 13 | −8 | $SO_2/CO_2$ bottled gas mix | −12.45 | fly ash | −17.46 | −11.70 | −15.88 |

[1] Zeebe, R. E. and Wolf-Galdrow, E., $CO_2$ in Seawater: Equilibrium, Kinetics, Isotopes (2005) Elsevier, San Diego, g. 169.
[2] FROM NIST SPECIFICATION RM8563, $CO_2$ Light Isotopic Gas Standard Example 13

Measurement of $\delta^{13}C$ Value for a Solid Precipitate and Starting Materials This precipitation was conducted in a 250,000 gallon container. The starting materials were commercially available bottled $CO_2$ gas, seawater (from around Santa Cruz, Calif.), and brucite tailings as the industrial waste. The brucite tailings were approximately 85% $Mg(OH)_2$, 12% $CaCO_3$ and 3% $SiO_2$. The 250,000 gallon container was partially filled with locally available seawater. Brucite tailings were added to the seawater, providing a pH (alkaline) and divalent cation concentration suitable for carbonate precipitation without releasing $CO_2$ into the atmosphere. $CO_2$ gas was sparged at a rate and time suitable to precipitate carbonate material from the alkaline seawater solution. Sufficient time was allowed for interaction of the components of the reaction, after which the precipitate material was separated from the remaining seawater solution, also known as the supernatant solution. The carbonate material was characterized using $\delta^{13}C$ analysis, x-ray diffraction (XRD) analysis, and scanning electron microscopy (SEM).

$\delta^{13}C$ values for the process starting materials, resulting materials and supernatant solution were measured. The $\delta^{13}C$ value for the atmospheric air was not measured, but a value from literature is given in Table 3. The analysis system used was manufactured by Los Gatos Research as described in Example 12.

Measurements from the analysis of the $CO_2$ source, industrial waste (brucite tailings), carbonate precipitate, and supernatant solution are listed in Table 3. The $\delta^{13}C$ values for the precipitate and supernatant solution are −30.04‰ and −34.16‰, respectively. The $\delta^{13}C$ values of both products of the reaction reflect the incorporation of the $CO_2$ source ($\delta^{13}C$=−41.56‰) and the influence of the brucite tailings that included some calcium carbonate ($\delta^{13}C$=−6.73‰). The precipitated carbonate material was more likely to incorporate calcium carbonate from the brucite tailings than the supernatant solution, so the $\delta^{13}C$ value of the precipitate reflects that by being less negative than that of the supernatant solution. This Example illustrates that $\delta^{13}C$ values may be used to confirm the primary source of carbon in a carbonate composition.

Example 14

Measurement of $\delta^{13}C$ Value for a Solid Precipitate and Starting Materials This experiment was performed using flue gas resulting from burning propane and a magnesium rich industrial waste material. The procedure was conducted in a container open to the atmosphere.

The starting materials were flue gas from a propane burner, seawater (from around Santa Cruz, Calif.), and brucite tailings as the industrial waste. The brucite tailings were approximately 85% $Mg(OH)_2$, 12% $CaCO_3$ and 3% $SiO_2$.

A container was filled with locally available seawater. Brucite tailings were added to the seawater, providing a pH (alkaline) and divalent cation concentration suitable for carbonate precipitation without releasing $CO_2$ into the atmosphere. Flue gas was sparged at a rate and time suitable to precipitate carbonate material from the alkaline seawater solution. Sufficient time was allowed for interaction of the components of the reaction, after which the precipitate material was separated from the remaining seawater solution, also known as the supernatant solution.

$\delta^{13}C$ values for the process starting materials, resulting precipitate carbonate material and supernatant solution were measured. The $\delta^{13}C$ value for the atmospheric air was not measured, but a value from literature is given in Table 3. The analysis system used was manufactured by Los Gatos Research and uses direct absorption spectroscopy to provide $\delta^{13}C$ and concentration data for gases ranging from 2% to 20% $CO_2$, as detailed in Example 12.

Measurements from the analysis of the flue gas, industrial waste (brucite tailings), carbonate precipitate, and supernatant solution are listed in Table 3. The $\delta^{13}C$ values for the precipitate and supernatant solution are −19.92‰ and −24.8‰, respectively. The $\delta^{13}C$ values of both products of the reaction reflect the incorporation of the flue gas, $CO_2$ source, ($\delta^{13}C$=−25.00‰) and the influence of the brucite tailings that included some calcium carbonate ($\delta^{13}C$=−6.73‰). This Example illustrates that $\delta^{13}C$ values may be used to confirm the primary source of carbon in a carbonate composition.

Example 15

Measurement of $\delta^{13}C$ Value for a Solid Precipitate and Starting Materials This experiment precipitated carbonated material from saline solution using a mixture of bottled $SO_2$ and bottled carbon dioxide ($CO_2$) gases and a fly ash as an industrial waste material. The procedure was conducted in a container open to the atmosphere.

The starting materials were a mixture of commercially available bottled $SO_2$ and $CO_2$ gas ($SO_2/CO_2$ gas), seawater (from around Santa Cruz, Calif.), and fly ash as the industrial waste.

A container was filled with locally available seawater. Fly ash was added to the seawater after slaking, providing a pH (alkaline) and divalent cation concentration suitable for carbonate precipitation without releasing $CO_2$ into the atmosphere. $SO_2/CO_2$ gas was sparged at a rate and time suitable to precipitate carbonate material from the alkaline seawater solution. Sufficient time was allowed for interaction of the components of the reaction, after which the precipitate material was separated from the remaining seawater solution, also known as the supernatant solution.

$\delta^{13}C$ values for the process starting materials, precipitate carbonate material and supernatant solution were measured as detailed in Example 12.

Measurements from the analysis of the $SO_2/CO_2$ gas, industrial waste (fly ash), carbonate precipitate, and supernatant solution are listed in Table 3. The $\delta^{13}C$ values for the precipitate and supernatant solution are −15.88‰ and −11.70‰, respectively. The $\delta^{13}C$ values of both products of the reaction reflect the incorporation of the $SO_2/CO_2$ gas ($\delta^{13}C=-12.45‰$) and the fly ash that included some carbon that was not fully combusted to a gas ($\delta^{13}C=-17.46‰$). Because the fly ash, itself a product of fossil fuel combustion, had a more negative $\delta^{13}C$ than the $CO_2$ used, the overall $\delta^{13}C$ value of the precipitate reflects that by being more negative than that of the $CO_2$ itself. This Example illustrates that $\delta^{13}C$ values may be used to confirm the primary source of carbon in a carbonate composition.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. A method of sequestering $CO_2$ comprising:
   (i) precipitating a $CO_2$-sequestering carbonate compound composition from a divalent cation-containing water that has contacted or is contacting a $CO_2$ source comprising at least one of:
       an industrial waste stream;
       a flue gas from a power plant;
       a flue gas from a cement plant;
       $CO_2$ from the combustion of a fossil fuel; or
       $CO_2$ dissolved in a liquid
   to form a precipitate; and
   (ii) producing aggregate comprising 80% or more by weight of the $CO_2$-sequestering carbonate compound composition wherein the aggregate has a hardness of at least 3 on the Mohs hardness scale and wherein the aggregate is suitable for use in a building material.

2. The method of claim 1 wherein producing the aggregate comprises subjecting the precipitate of claim 1 to elevated temperature, elevated pressure, or a combination thereof.

3. The method of claim 1, wherein the divalent cation-containing water has contacted or is contacting $CO_2$ from an industrial waste gas stream.

4. The method of claim 1 wherein the divalent cation-containing has contacted or is contacting with $CO_2$ from the combustion of a fossil fuel.

5. The method of claim 1 wherein the divalent cation-containing has contacted or is contacting a flue gas from a power plant or a cement plant.

6. The method of claim 1 wherein the divalent cations of the divalent cation-containing water come at least partially from a saltwater.

7. The method of claim 6 wherein the saltwater comprises seawater or brine.

8. The method of claim 1 wherein the producing of the aggregate comprises producing aggregate of a predetermined size and shape.

9. The method of claim 1, wherein the divalent cation-containing water has contacted or is contacting a $CO_2$ source comprising $CO_2$ dissolved in a liquid.

10. The method of claim 1 wherein the precipitating comprises subjecting the divalent cation-containing water to carbonate and/or bicarbonate compound precipitation conditions.

11. The method of claim 1 wherein the precipitating comprises adjusting the magnesium to calcium ratio (Mg:Ca) of the divalent cation-containing water to be between 10/1 to 1/10.

12. The method of claim 1, further comprising adding siliceous materials during the precipitating.

13. The method of claim 12, wherein the siliceous materials comprise diatomaceous earth, fly ash, silica fume and metal silicates.

14. The method of claim 1, wherein the processing conditions comprise:
   a) separation of the precipitate from the water; and
   b) producing a set product, wherein the aggregate comprises the set product.

15. The method of claim 14, wherein the processing conditions further comprise adding fresh water with or without drying the precipitate first to produce the set product.

16. The method of claim 15, wherein the processing conditions further comprise washing the precipitate.

17. The method of any of claims 14 to 16, wherein the processing conditions further comprise mechanical processing of the set product.

18. The method of claim 1, wherein producing the aggregate comprises subjecting the precipitate to exposure to the open environment and mechanically processing.

19. The method of claim 1, wherein the temperature of the water is maintained between 5 to 70° C. during precipitation.

20. The method of claim 1, wherein the carbonate compound composition forms a settable composition upon combination with water and wherein producing the aggregate comprises:

a) generating a settable composition consisting essentially of the $CO_2$-sequestering carbonate compound composition and water;
b) allowing the settable composition to form a solid product having a hardness of at least 3 on the Mohs hardness scale; and
c) forming the aggregate from the solid product.

* * * * *